(12) United States Patent
Shimoyama et al.

(10) Patent No.: US 10,625,714 B2
(45) Date of Patent: Apr. 21, 2020

(54) WIPER DEVICE

(71) Applicants: Mitsuba Corporation, Gunma (JP); Honda Motor Co., Ltd., Tokyo (JP)

(72) Inventors: Masayuki Shimoyama, Gunma (JP); Tomoya Nishikawa, Gunma (JP); Atsuhiro Kuwabara, Gunma (JP); Yutaka Yamashita, Gunma (JP); Shin Fujiwara, Gunma (JP); Hideyuki Koizumi, Gunma (JP); Takeshi Sasaki, Saitama (JP); Taisuke Goto, Saitama (JP); Tatsuya Ohmaru, Saitama (JP); Yuki Takahashi, Saitama (JP)

(73) Assignees: MITSUBA CORPORATION, Gunma (JP); HONDA MOTOR CO., LTD, Tokyo (JP)

( * ) Notice: Subject to any disclaimer, the term of this patent is extended or adjusted under 35 U.S.C. 154(b) by 161 days.

(21) Appl. No.: 15/566,774

(22) PCT Filed: Mar. 23, 2016

(86) PCT No.: PCT/JP2016/059200
§ 371 (c)(1),
(2) Date: Oct. 16, 2017

(87) PCT Pub. No.: WO2016/167090
PCT Pub. Date: Oct. 20, 2016

(65) Prior Publication Data
US 2018/0118171 A1 May 3, 2018

(30) Foreign Application Priority Data

Apr. 17, 2015 (JP) .................................. 2015-085083
Apr. 17, 2015 (JP) .................................. 2015-085084

(51) Int. Cl.
*B60S 1/34* (2006.01)
*B60S 1/38* (2006.01)
(Continued)

(52) U.S. Cl.
CPC . *B60S 1/48* (2013.01); *B60S 1/04* (2013.01); *B60S 1/3415* (2013.01); *B60S 1/34* (2013.01); *B60S 1/522* (2013.01)

(58) Field of Classification Search
CPC ................. B60S 1/34; B60S 1/46; B60S 1/48
See application file for complete search history.

(56) References Cited

U.S. PATENT DOCUMENTS 3,827,101 A    8/1974 Wubbe
4,170,804 A *  10/1979 Scotcher .................. B60S 1/34
                                                    15/250.34

(Continued)

FOREIGN PATENT DOCUMENTS

EP    3138746 A1    3/2017
JP    H109512510 A  12/1997

(Continued)

OTHER PUBLICATIONS

Supplementary Partial European Search Report for Serial No. EP 16 77 9881 dated Nov. 13, 2018.

(Continued)

*Primary Examiner* — Michael D Jennings
(74) *Attorney, Agent, or Firm* — McCormick, Paulding & Huber, PLLC

(57) ABSTRACT

Base end sides of washer tubes 44, 45 are arranged in an axial direction of a swinging shaft PS at one end portion of an arm head 40, and they are drawn out from a head side pipe housing portion 41*a* so as to curve toward a side opposite to a shaft fixing portion 42 side. Each of the washer tubes 44, 45 is wound around the shaft fixing portion 42 during (Continued)

swinging of the arm head 40 without applying any load to the swinging shaft PS. No tension acts on each of the washer tubes 44, 45, and each of the washer tubes 44, 45 is not rubbed against the shaft fixing portion 42. Therefore, deterioration of the washer tubes 44, 45 can be suppressed. When the washer tubes 44, 45 are wound around the shaft fixing portion 42, a periphery of the shaft fixing portion 42 is suppressed from swelling outward in a radial direction thereof. This makes it possible to prevent the arm head 40 around the swinging shaft PS from increasing in size.

14 Claims, 32 Drawing Sheets

(51) Int. Cl.
*B60S 1/48* (2006.01)
*B60S 1/04* (2006.01)
*B60S 1/52* (2006.01)

(56) References Cited

U.S. PATENT DOCUMENTS

| | | | | |
|---|---|---|---|---|
| 4,704,761 | A * | 11/1987 | South | B60S 1/3413 |
| | | | | 15/250.19 |
| 4,856,137 | A * | 8/1989 | Palu | B60S 1/32 |
| | | | | 15/250.31 |
| 5,349,719 | A | 9/1994 | Egner-Walter | |
| 5,398,370 | A | 3/1995 | Gorner et al. | |
| 5,634,235 | A * | 6/1997 | Hultquist | B60S 1/34 |
| | | | | 15/250.34 |
| 5,680,669 | A * | 10/1997 | Egner-Walter | B60S 1/34 |
| | | | | 15/250.352 |
| 5,755,005 | A * | 5/1998 | Turbessi | B60S 1/34 |
| | | | | 15/250.34 |
| 5,894,626 | A | 4/1999 | Edele et al. | |
| 6,094,772 | A | 8/2000 | West | |
| 2002/0133893 | A1* | 9/2002 | Hasegawa | B60S 1/3415 |
| | | | | 15/250.04 |
| 2014/0026349 | A1 | 1/2014 | Schaeuble | |
| 2014/0345076 | A1 | 11/2014 | Banno et al. | |
| 2015/0113754 | A1* | 4/2015 | Umeno | B60S 1/482 |
| | | | | 15/250.04 |

FOREIGN PATENT DOCUMENTS

| | | |
|---|---|---|
| JP | 2001106034 A | 4/2001 |
| JP | 2002283972 A | 10/2002 |
| JP | 2003327090 A | 11/2003 |
| JP | 2006007971 A | 1/2006 |
| JP | 2010030373 A | 2/2010 |
| JP | 2014227078 A | 12/2014 |
| JP | 2015003716 A | 1/2015 |
| JP | 2015085725 A | 5/2015 |
| WO | 2014114334 A1 | 7/2014 |
| WO | 2015059979 A1 | 4/2015 |
| WO | 2016034817 A1 | 3/2016 |

OTHER PUBLICATIONS

International Search Report dated Jul. 26, 2016 for PCT/JP2016/059200.
European Search Report for Serial No. 16779881.8 dated Apr. 9, 2019.

* cited by examiner

FIG. 10
(a)
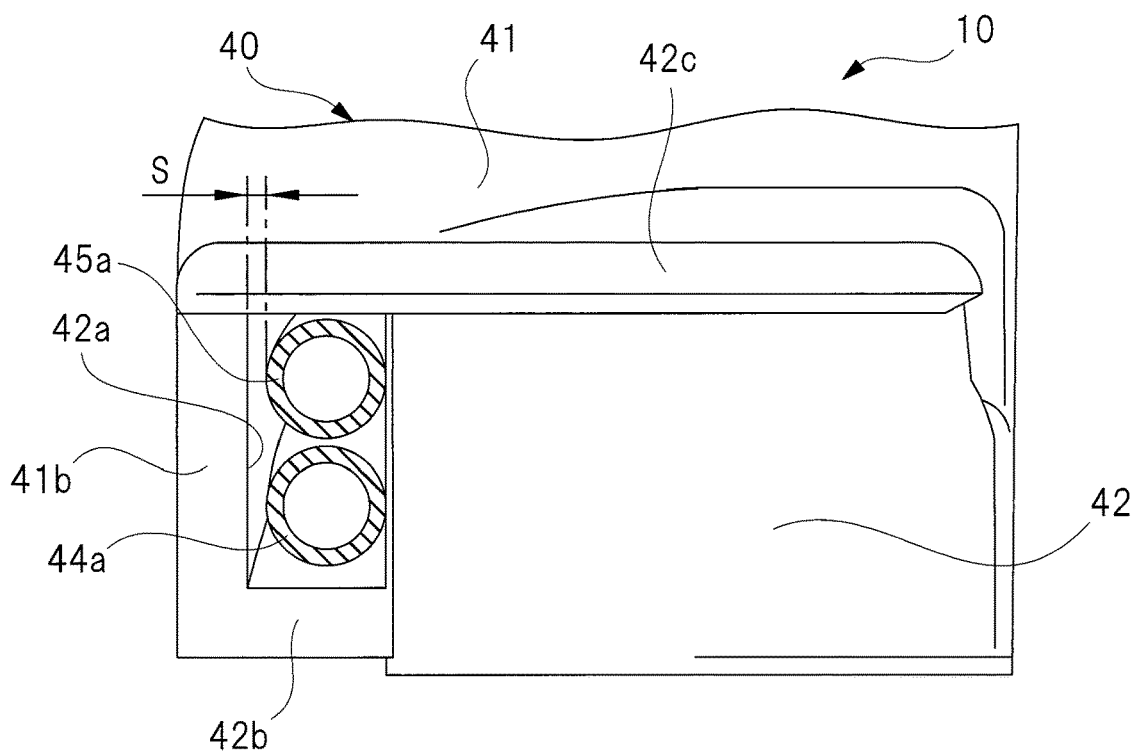
(b)
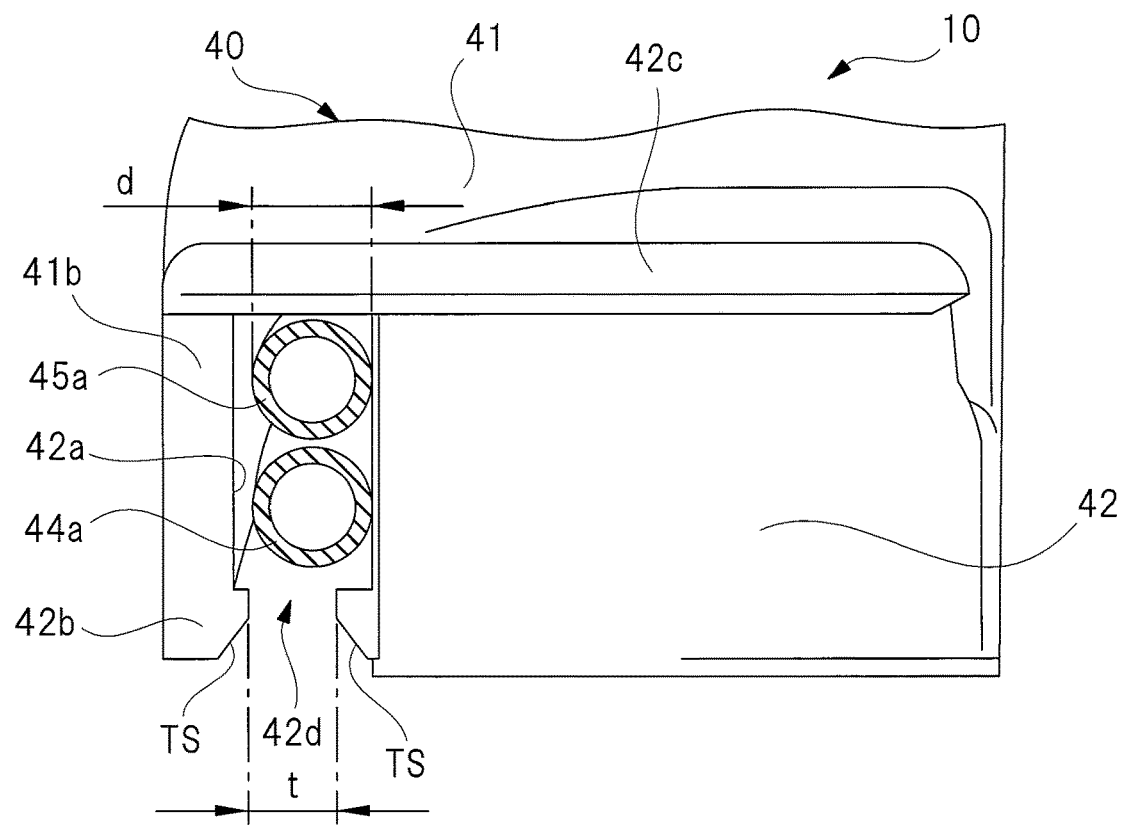

FIG. 11
(a)
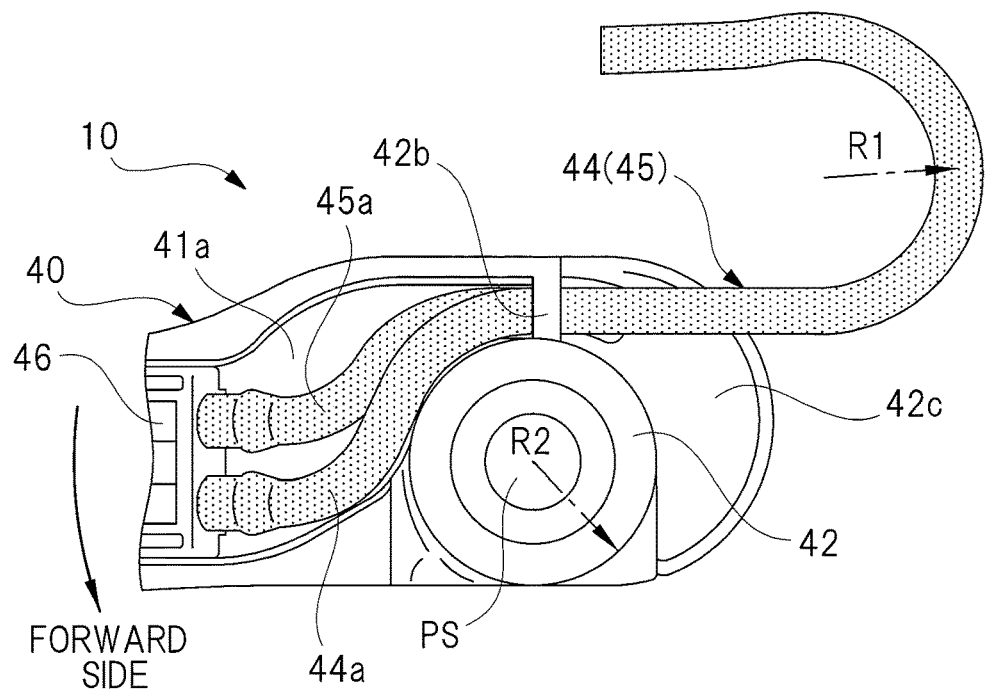
(b)
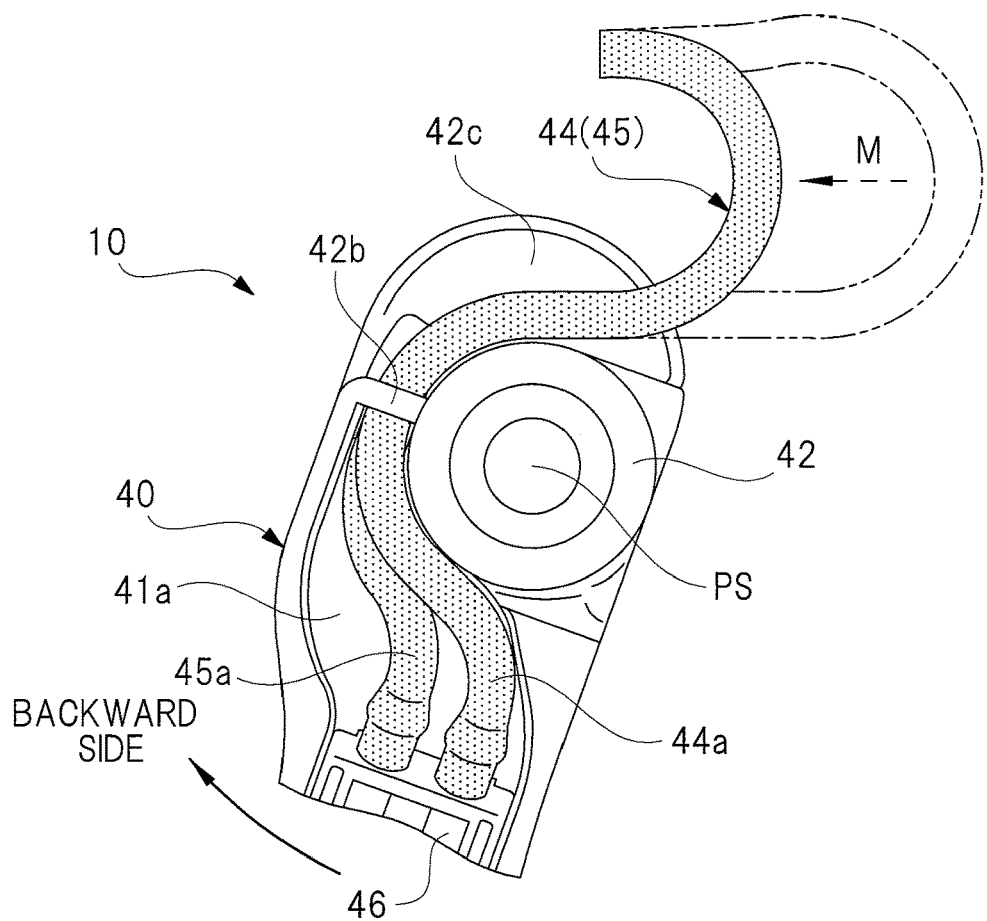

FIG. 22
(a)
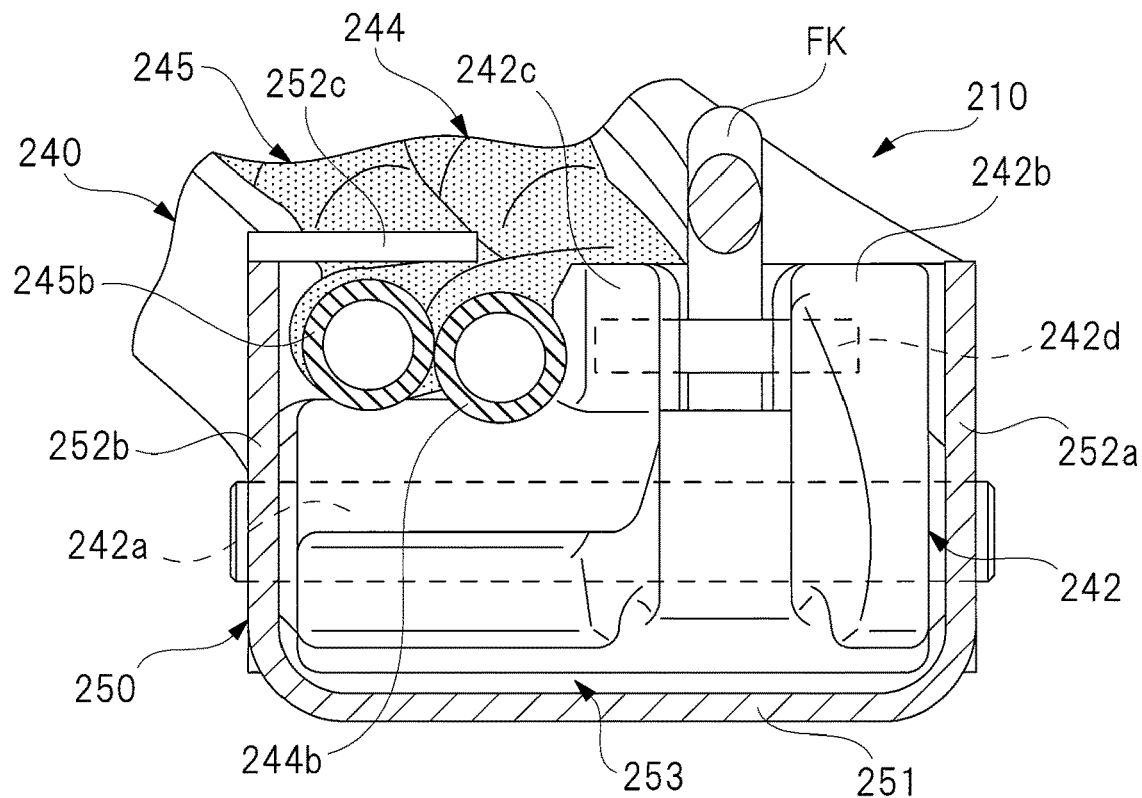
(b)
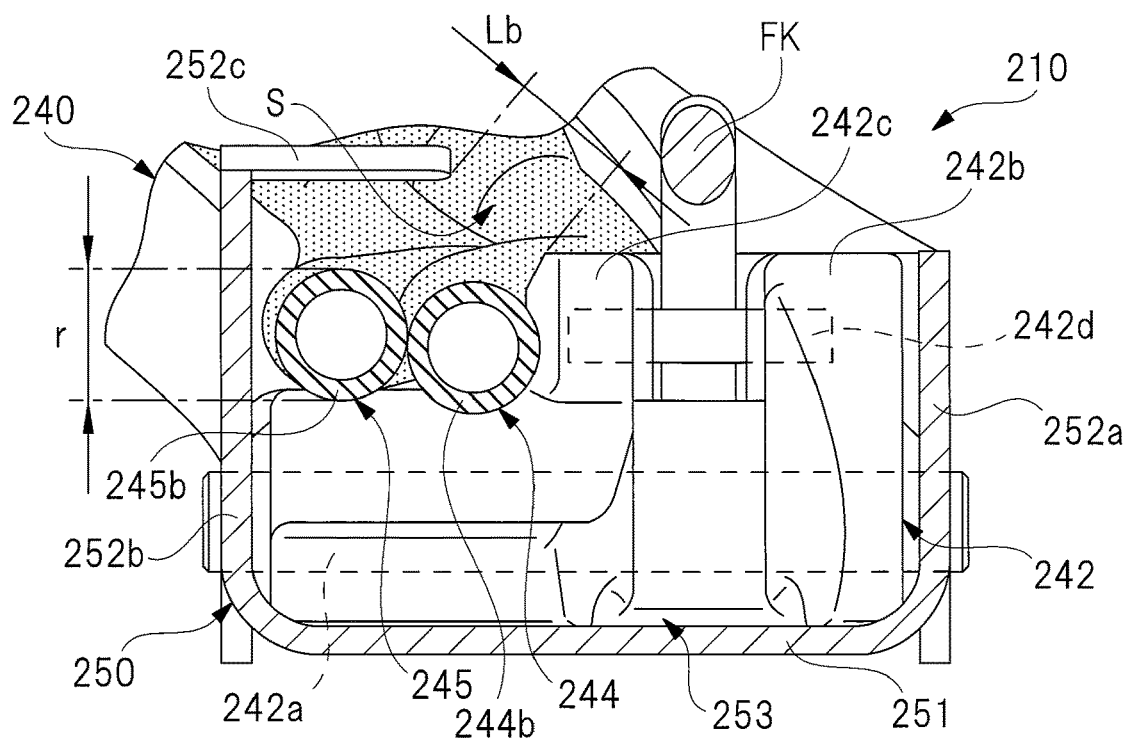

FIG. 29
(a)
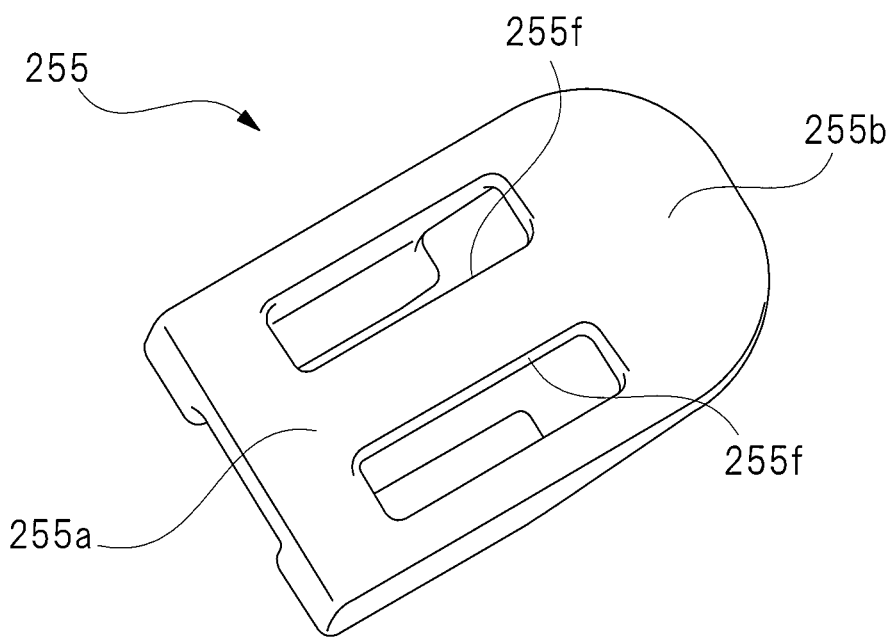
(b)
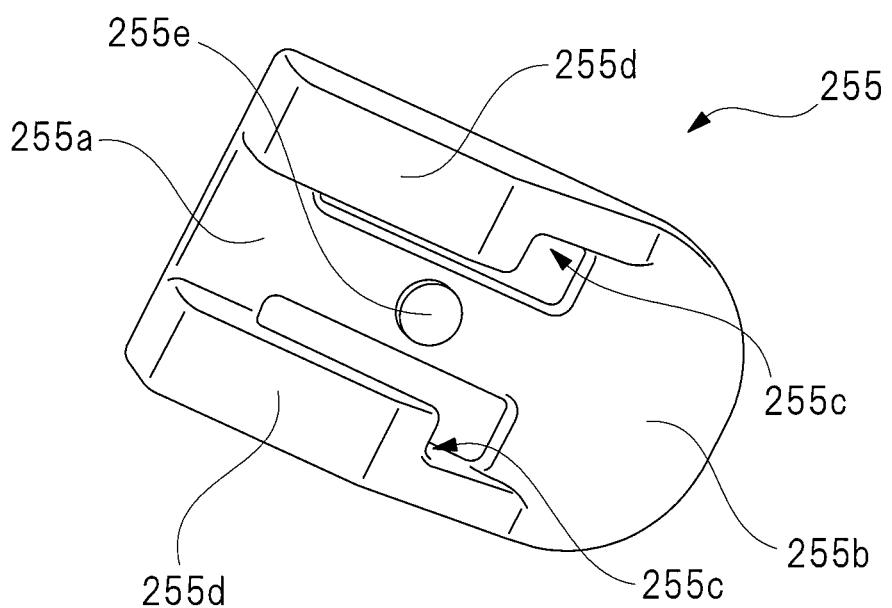

FIG. 31
(a)
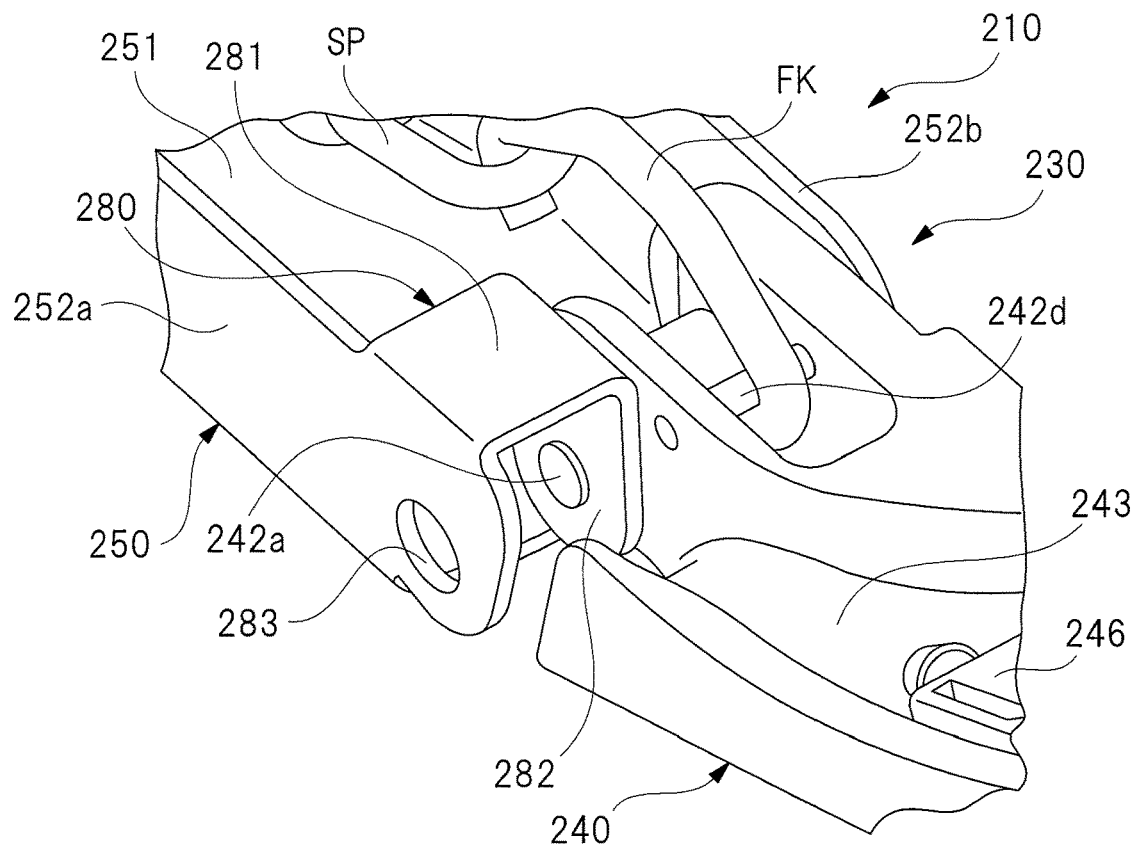
(b)
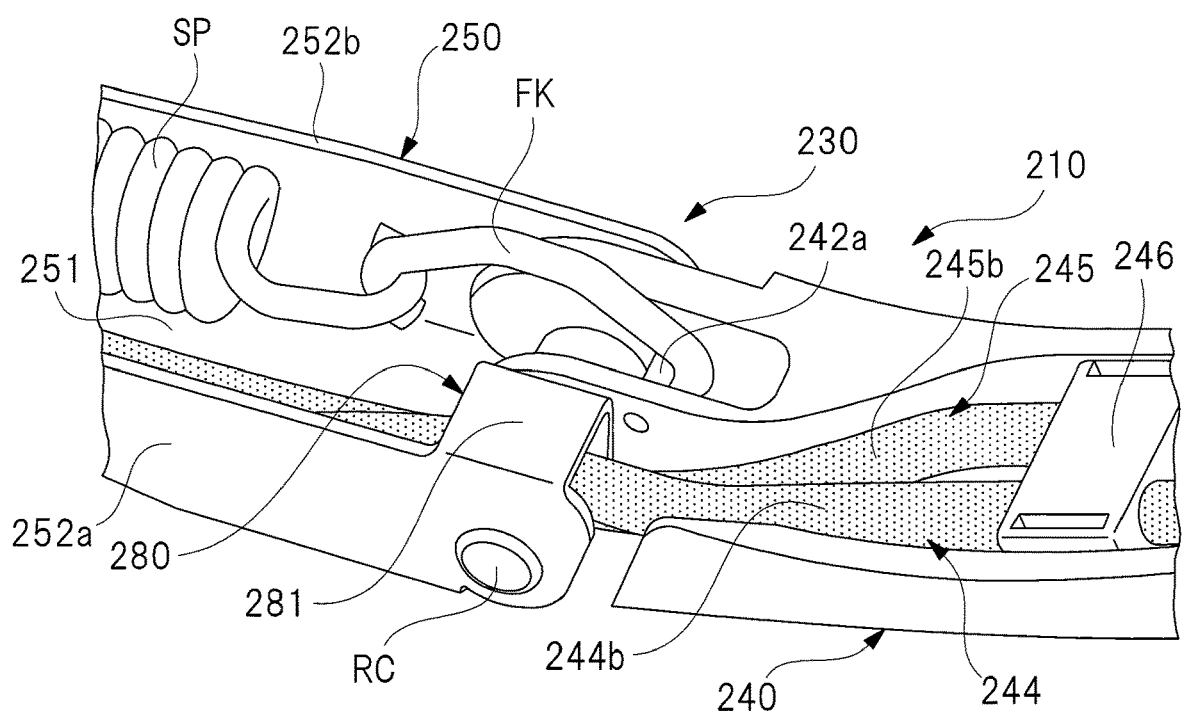

FIG. 33
(a)
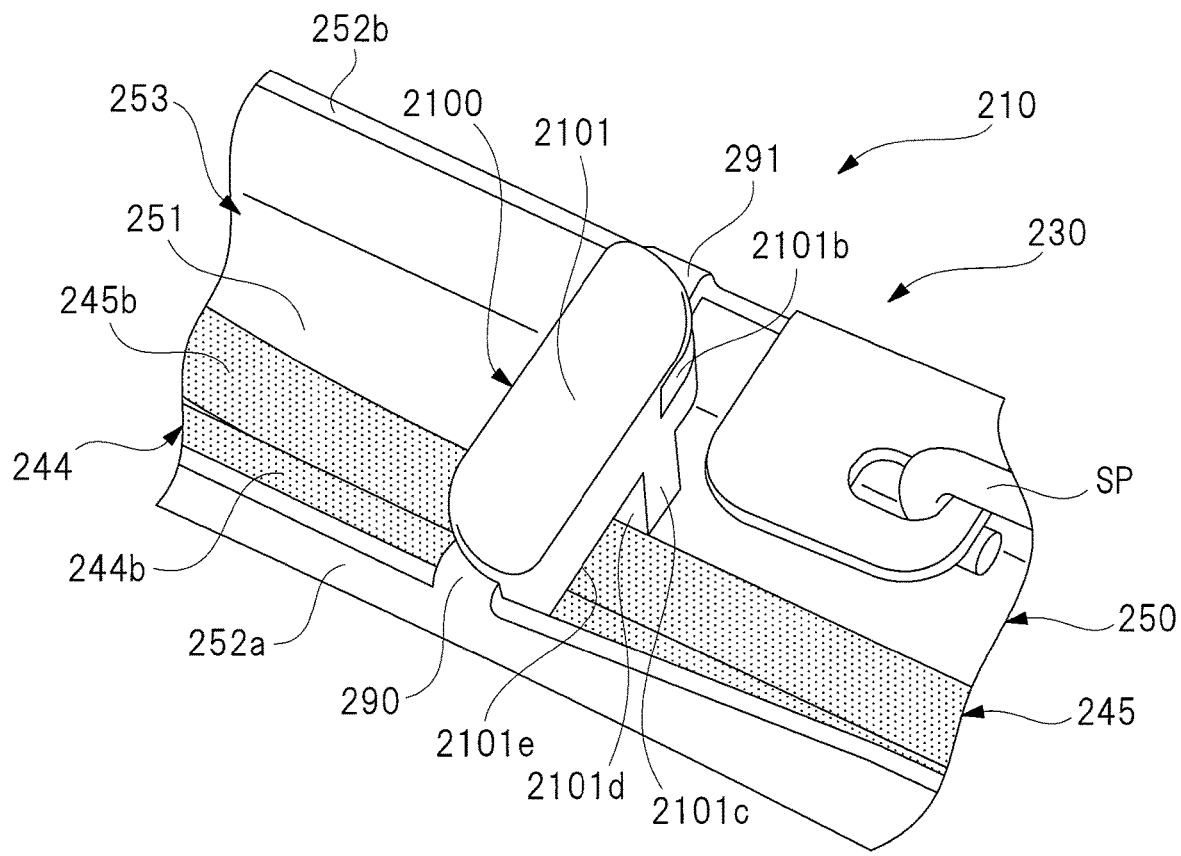
(b)
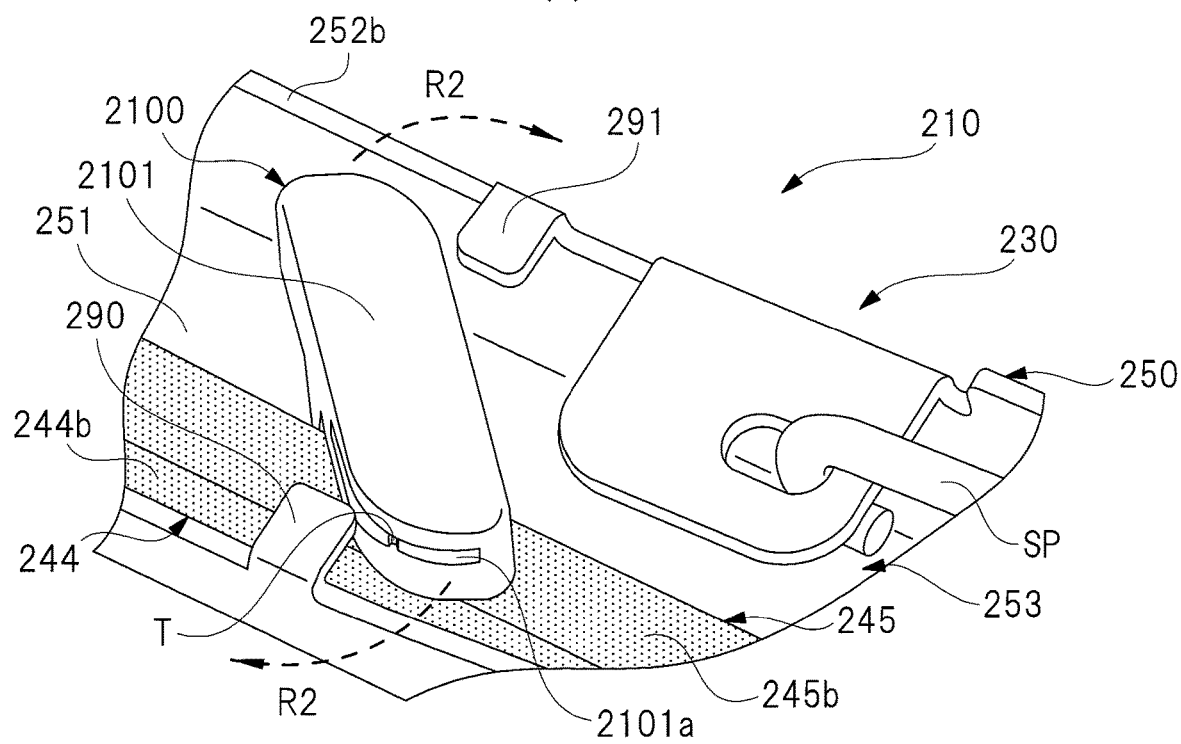

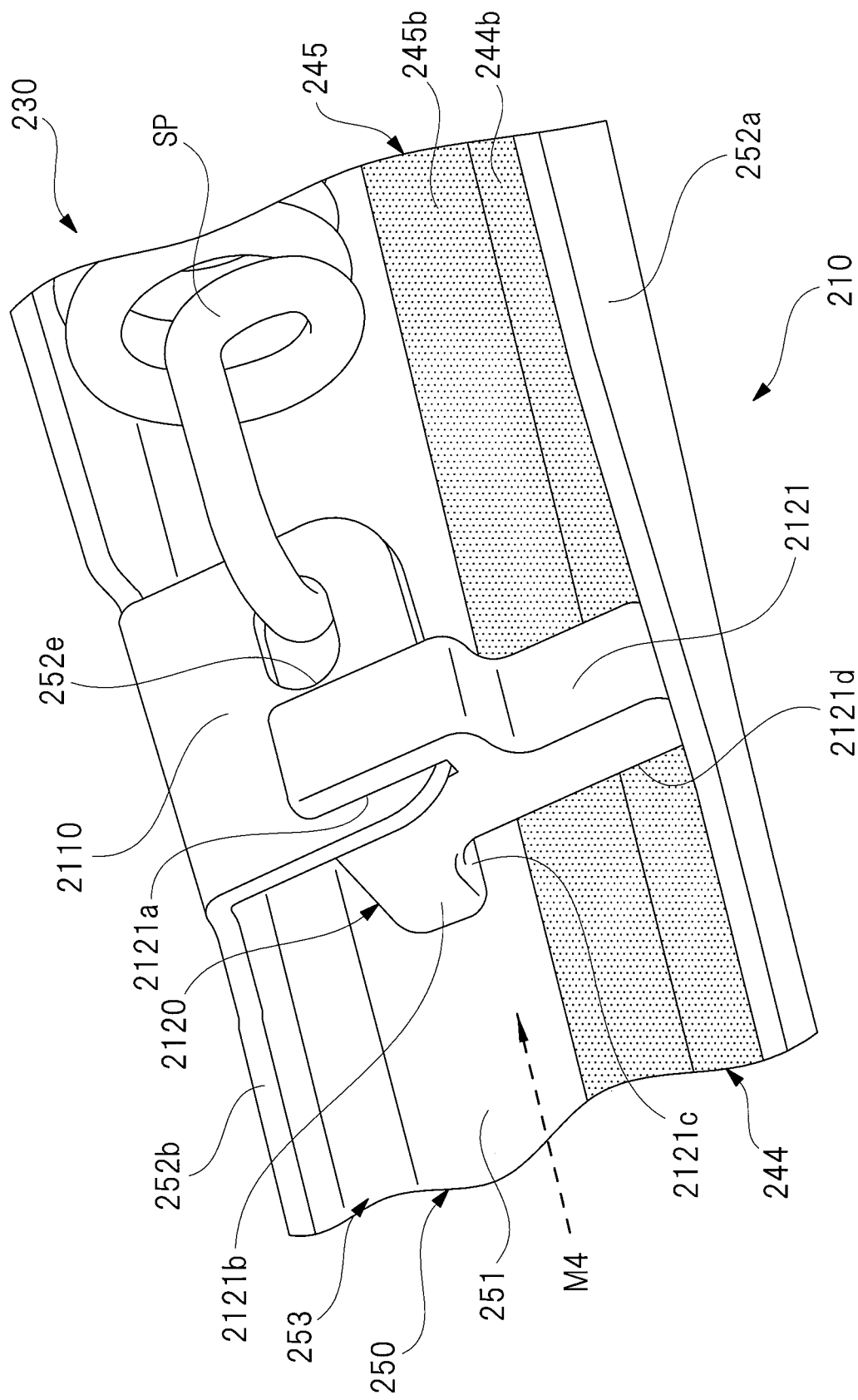

WIPER DEVICE

CROSS-REFERENCE TO RELATED APPLICATIONS

This application is a National Stage application of International Patent Application No. PCT/JP2016/059200, filed on Mar. 23, 2016, which claims priority to Japanese Patent Application No. 2015-085083, filed on Apr. 17, 2015, and Japanese Patent Application No. 2015-085084, filed on Apr. 17, 2015, each of which is hereby incorporated by reference in their entirety.

TECHNICAL FIELD

The present invention relates to a wiper device provided with a wiper blade for wiping a surface to be wiped.

BACKGROUND ART

A wiper device for ensuring a field of view of a driver and the like is provided with in a vehicle such as an automobile. The wiper device includes a wiper arm caused to swing by an electric motor, and a wiper blade fitted to the wiper arm. By turning on a wiper switch in a vehicle interior, the wiper arm is caused to swing, whereby a blade rubber reciprocates on a surface to be wiped so as to wipe off rainwater or the like attached onto the surface to be wiped.

Now, in a case where an adhesive substance such as dust is attached onto the surface to be wiped, the wiper blade is reciprocated while spraying a cleaning fluid on the surface to be wiped. This makes it possible to wet the adhesive substance such as dust and cleanly wipe the surface to be wiped without damaging the surface to be wiped. The cleaning fluid is usually sprayed onto the surface to be wiped from a nozzle unit installed in a hood or the like of the vehicle. In this case, there are defects including a case where the field of view of the driver is blocked because a sprayed position of the cleaning fluid is in front of eyes of the driver, a case where the sprayed position of the cleaning fluid is largely displaced due to a travelling wind or the like because a distance between the nozzle unit and the surface to be wiped is too long, and a case where a replenishing frequency of the cleaning fluid to a tank is increased because a relatively large amount of the cleaning fluid is used.

Thus, in order to solve such defects, a wiper device disclosed in Japanese Patent Application Publication No. 2010-030373 has been developed, for example. The wiper device disclosed in Japanese Patent Application Publication No. 2010-030373 includes: an arm support (arm head) fixed to a swinging shaft (output shaft); an arm shank rotatably coupled to the arm support; a washer nozzle (nozzle unit) provided at a tip end side of the arm shank; and a flexible hose (pipe) provided between a portion of the washer nozzle and a portion of the swinging shaft. Further, a swinging shaft side of the flexible hose is disposed around the swinging shaft so as not to come into contact with the swinging shaft and not to protrude from the arm support.

A cleaning fluid supplied to the flexible hose is sprayed from the washer nozzle and immediately reaches a surface to be wiped that is near the washer nozzle. Thus, a distance between the washer nozzle and the surface to be wiped is shortened, whereby it is possible to prevent a sprayed position of the cleaning fluid from being largely displaced due to a travelling wind or the like, and to wet the vicinity of a blade rubber. Therefore, it is possible to wipe the surface to be wiped using a small amount of the cleaning fluid.

Further, in order to solve the problems as described above, a wiper device disclosed in U.S. Pat. No. 5,398,370 has been developed, for example. The wiper device disclosed in U.S. Pat. No. 5,398,370 includes: an attachment piece fixed to a wiper shaft; a joint piece rotatably fitted to the attachment piece; a wiper rod crimped and fixed to the joint piece; a washer nozzle fixed to the wiper rod; and a flexible hose housed inside the joint piece.

A cleaning fluid that has been supplied from the wiper shaft to the flexible hose is sprayed from the washer nozzle and reaches a surface to be wiped. Thus, a distance between the washer nozzle and the surface to be wiped is shortened, whereby it is possible to prevent a sprayed position of the cleaning fluid from being largely displaced due to a travelling wind or the like, and to wet the vicinity of a blade rubber. Therefore, it is possible to wipe the surface to be wiped using a small amount of the cleaning fluid.

SUMMARY

However, in the wiper device disclosed in Japanese Patent Application Publication No. 2010-030373, a swinging shaft side of the pipe approaches the swinging shaft and goes away from the swinging shaft during a swinging motion of the arm head. In particular, when the pipe approaches the swinging shaft, tension acts on the pipe. This may cause problems such as early deterioration of the pipe and an increased load on an electric motor.

Further, in a case where the cleaning fluid is sprayed individually in each of wiping directions of a wiping operation toward a forward side and a wiping operation toward a backward side of the wiper device, it is possible to wipe the surface to be wiped using an even smaller amount of the cleaning fluid. In this case, a pipe is required for each of the forward side and the backward side. However, in a case where a pair of pipes for the forward side and the backward side is provided in the wiper device according to Japanese Patent Application Publication No. 2010-030373, problems may occur, such as a problem that the load on the electric motor further becomes larger and a problem that a fixing portion with respect to the swinging shaft of the arm head is increased in size.

Further, according to the wiper device disclosed in U.S. Pat. No. 5,398,370, a wiper shaft side of the flexible hose (pipe) is held by the attachment piece (arm head), and a washer nozzle side of the flexible hose is held by a crimped portion of the joint piece (arm shank) and the wiper rod.

Thus, a length dimension of a portion of the pipe, which is not held by anything, is substantially equal to a length dimension of the arm shank. Therefore, a case where the flexible hose becomes slack and protrudes from the arm shank may occur. In particular, in the summer season when an ambient temperature is high or the like, an amount of slack of the pipe may increase, and in some cases, a defect that the pipe is rubbed against the surface to be wiped occurs.

In order to prevent the slack of the pipe, it can be thought that a certain degree of tension is applied to the pipe. However, in this case, another problem as follows may arise. Namely, it becomes difficult to place the pipe along a side wall of the arm shank, and the pipe may come into contact with a pressure spring (spring) housed inside the arm shank, whereby a problem that the pipe is early deteriorated may occur.

It is an object of the present invention to provide a wiper device capable of suppressing a fixing portion of an arm head with respect to a swinging shaft from increasing in size while suppressing tension from acting on a forward side pipe and a backward side pipe.

It is also an object of the present invention to provide a wiper device capable of surely preventing a pipe from protruding from an arm shank and preventing the pipe from deteriorating early.

According to one aspect of the present invention, there is provided a wiper device provided with a wiper blade configured to wipe a surface to be wiped, the wiper device including: an arm head provided with a shaft fixing portion to be fixed to a swinging shaft, the shaft fixing portion being provided at one end portion of the arm head; an arm shank having one end portion and the other end portion, the one end portion being fitted to the other end portion of the arm head, the other end portion being fitted to the wiper blade; a nozzle unit provided on the arm shank or the wiper blade, the nozzle unit being configured to spray a cleaning fluid toward the surface to be wiped; a head side pipe housing portion provided in the arm head along a longitudinal direction thereof, the head side pipe housing portion being opened toward the surface to be wiped; and a forward side pipe and a backward side pipe housed in the head side pipe housing portion, a tip end side of each of the forward side pipe and the backward side pipe being connected to the nozzle unit, wherein base end sides of the forward side pipe and the backward side pipe are arranged in an axial direction of the swinging shaft at one end portion of the arm head, and the base end sides are drawn out from the head side pipe housing portion so as to curve toward a side opposite to a side of the shaft fixing portion.

According to another aspect of the present invention, a holding hole is provided at one end portion of the arm head, the holding hole being configured to hold the forward side pipe and the backward side pipe so as to be arranged side by side in the axial direction of the swinging shaft.

According to still another aspect of the present invention, a guide wall is provided at one end portion of the arm head, the guide wall being configured to place the forward side pipe and the backward side pipe along an outer periphery of the shaft fixing portion during swinging of the shaft fixing portion in one direction.

According to still another aspect of the present invention, each of the forward side pipe and the backward side pipe includes an upstream pipe and a downstream pipe, and a connecting member is provided in the head side pipe housing portion, the connecting member being configured to connect the upstream pipe to the corresponding downstream pipe.

According to still another aspect of the present invention, a shank side pipe housing portion is provided in the arm shank so as to extend along a longitudinal direction of the arm shank and be opened toward a side of the surface to be wiped, the shank side pipe housing portion being configured to house the forward side pipe and the backward side pipe therein.

According to still another aspect of the present invention, one end portion of the arm shank is provided rotatably via a rotary shaft with respect to the other end portion of the arm head, the rotary shaft extending in a direction intersecting the swinging shaft; and the forward side pipe and the backward side pipe are arranged in a wiping direction of the wiper blade in a portion of the rotary shaft.

According to still another aspect of the present invention, there is provided a wiper device provided with a wiper blade configured to wipe a surface to be wiped, the wiper device including: an arm head, one end portion of the arm head being fitted to a swinging shaft; an arm shank having one end portion and the other end portion, the one end portion being fitted to the other end portion of the arm head, the other end portion being fitted to the wiper blade; a nozzle unit provided on the arm shank or the wiper blade, the nozzle unit being configured to spray a cleaning fluid toward the surface to be wiped; a shank side pipe housing portion provided in the arm shank along a longitudinal direction thereof, the shank side pipe housing portion being opened toward the surface to be wiped; a pipe housed in the shank side pipe housing portion, the pipe being configured to feed the cleaning fluid to the nozzle unit; and a spring housed in the shank side pipe housing portion, the spring being configured to generate elastic force to press the wiper blade toward the surface to be wiped, wherein a first pipe holding portion and a second pipe holding portion are respectively provided at both end sides of the spring in the arm shank, each of the first and second pipe holding portions being configured to hold the pipe side by side with respect to the spring.

According to still another aspect of the present invention, the first pipe holding portion and the second pipe holding portion hold the pipe in a non-contact state with the spring.

According to still another aspect of the present invention, a head side pipe housing portion configured to house the pipe is provided in the arm head so as to extend along a longitudinal direction of the arm head, the head side pipe housing portion being opened toward the surface to be wiped.

According to still another aspect of the present invention, a pin fitting wall is provided at the other end portion of the arm head, a pin for supporting one end portion of the spring being fitted to the pin fitting wall; the first pipe holding portion provided at the one end portion of the spring is constituted of a projecting piece, the projecting piece projecting from a side wall of the arm shank in a wiping direction of the wiper blade, and the pipe is held by the pin fitting wall and the projecting piece.

According to still another aspect of the present invention, a dimension of a gap formed between the projecting piece and the pin fitting wall is larger than a diameter dimension of the pipe when the arm shank is rotated relative to the arm head in a direction opposite to a direction of locking back.

According to still another aspect of the present invention, the first pipe holding portion provided at a side of the one end portion of the spring is constituted of a first extending portion and a second extending portion, the first extending portion extending from a side wall of the arm shank in a wiping direction of the wiper blade, the second extending portion extending from the first extending portion toward a side opposite to a side of the surface to be wiped.

According to still another aspect of the present invention, the second pipe holding portion provided on a side of the other end portion of the spring is constituted of a supporting piece and a holding piece, the supporting piece extending from a side wall of the arm shank in a wiping direction of the wiper blade, the holding piece being fitted to the supporting piece.

According to still another aspect of the present invention, a third pipe holding portion configured to hold the pipe is provided in the arm shank between the second pipe holding portion provided at the other end portion side of the spring and the other end portion of the arm shank.

Effects of the Invention

According to the present invention, base end sides of the forward side pipe and the backward side pipe are arranged in an axial direction of the swinging shaft at one end portion of the arm head, and the base end sides are drawn out from the head side pipe housing portion so as to curve toward a side opposite to a side of the shaft fixing portion. Thus, during swinging of the arm head, the base end side of each of the forward side pipe and the backward side pipe is wound around a periphery of the shaft fixing portion without applying any load to the swinging shaft. At this time, no tension acts on each of the forward side pipe and the backward side pipe, and both the forward side pipe and the backward side pipe are not rubbed against the shaft fixing portion. For this reason, deterioration of the forward side pipe and the backward side pipe is suppressed.

Further, since the base end sides of the forward side pipe and the backward side pipe are arranged in the axial direction of the swinging shaft, it is possible to suppress the periphery of the shaft fixing portion from swelling outward in a radial direction thereof when the forward side pipe and the backward side pipe are wound around the periphery of the shaft fixing portion. Therefore, it is possible to prevent a fixing portion of the arm head with respect to the swinging shaft from increasing in size.

According to the present invention, since the first pipe holding portion and the second pipe holding portion, which are configured to hold the pipe side by side with respect to the spring, are respectively provided at both end sides of the spring in the arm shank, it is possible to shorten a length dimension between the first pipe holding portion and the second pipe holding portion to the degree of a length dimension of the spring. This makes it to prevent a defect that the pipe protrudes from the arm shank and is rubbed against the surface to be wiped from occurring. Further, since application of tension to the pipe can be avoided, it is possible to prevent the pipe from coming into contact with the spring, and this makes it possible to surely prevent early deterioration of the pipe.

BRIEF DESCRIPTIONS OF THE DRAWINGS

FIG. 10($a$) is a view when viewed in a direction of an arrow D in FIG. 9, and FIG. 10($b$) is a view illustrating a modified example of a holding hole, which corresponds to FIG. 10($a$).

FIGS. 11($a$) and 11($b$) are explanatory drawings for explaining a state of each of pipes wound around the shaft fixing portion.

Figure 12:
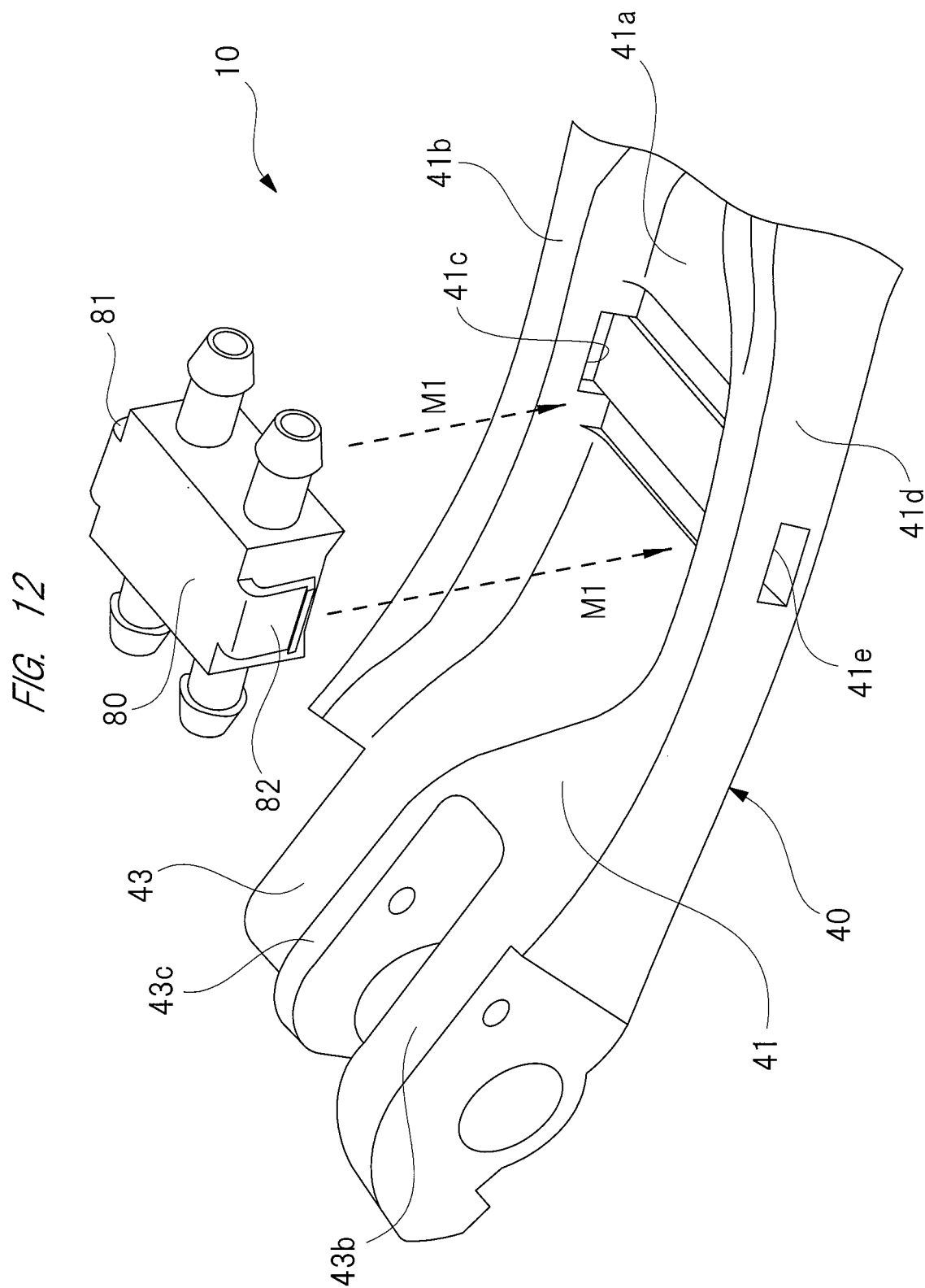

FIG. 12 is a perspective view illustrating a wiper side connecting member according to a second embodiment.

Figure 13:
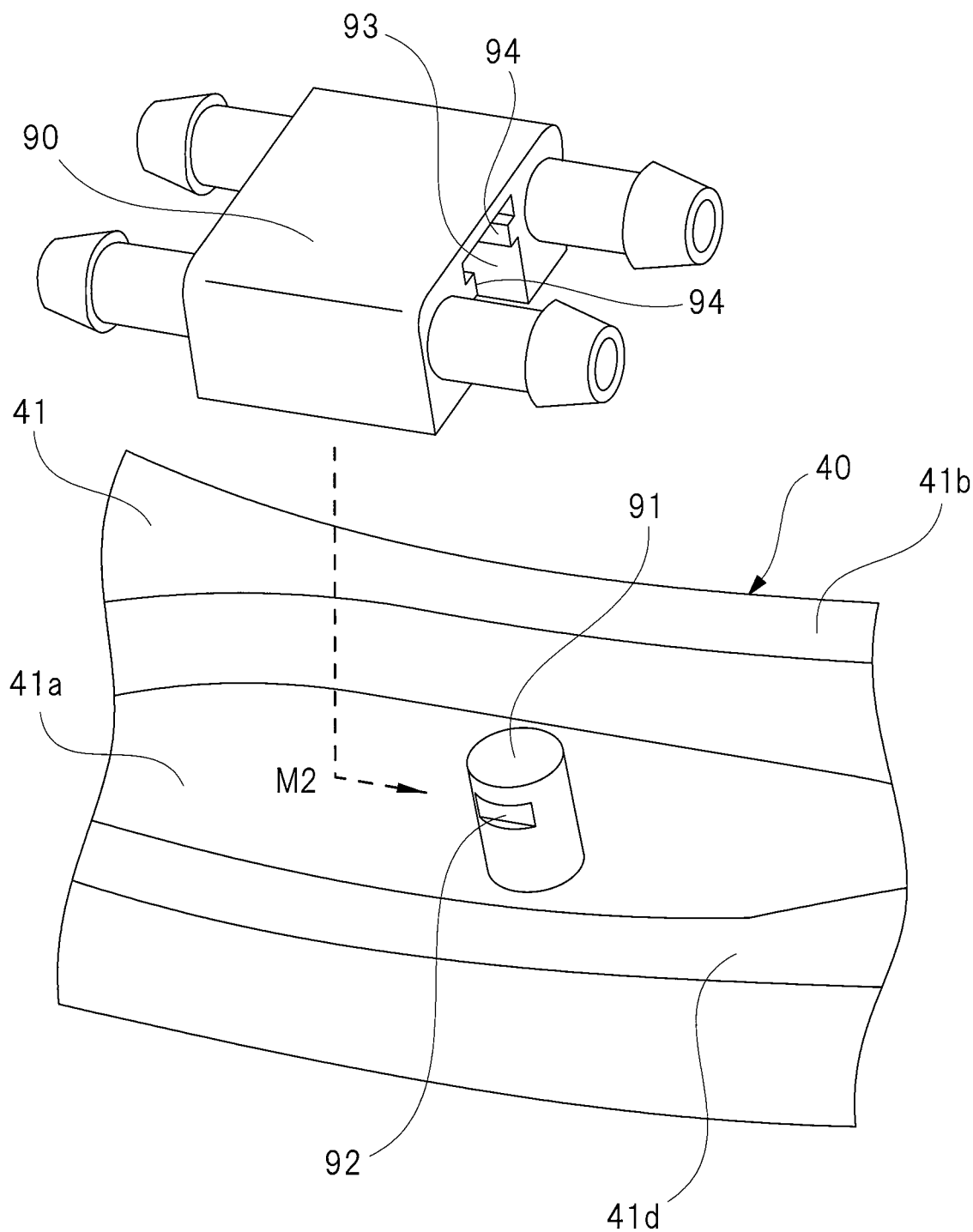

FIG. 13 is a perspective view illustrating a wiper side connecting member according to a third embodiment.

Figure 14:
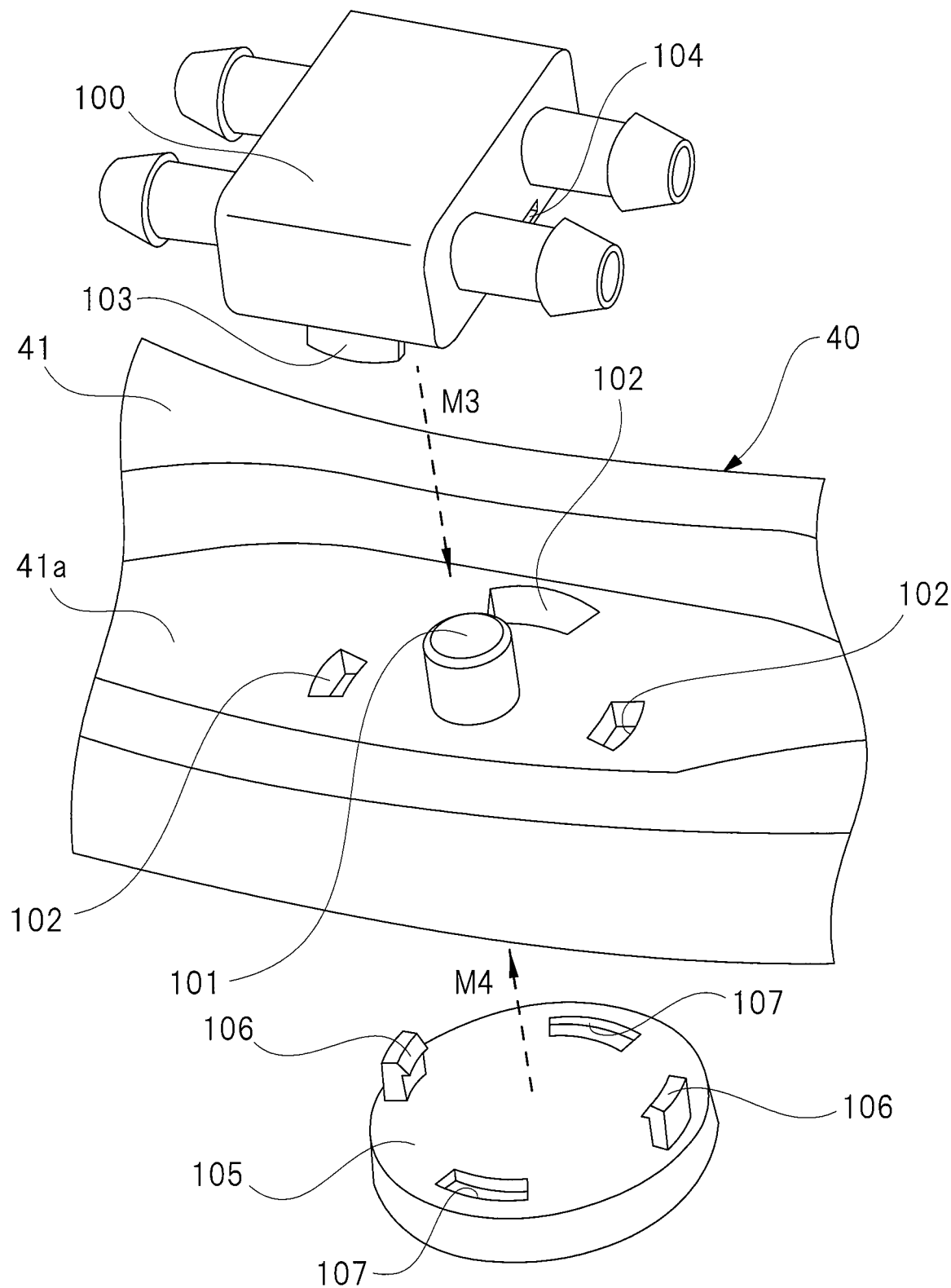

FIG. 14 is a perspective view illustrating a wiper side connecting member according to a fourth embodiment.

Figure 15:
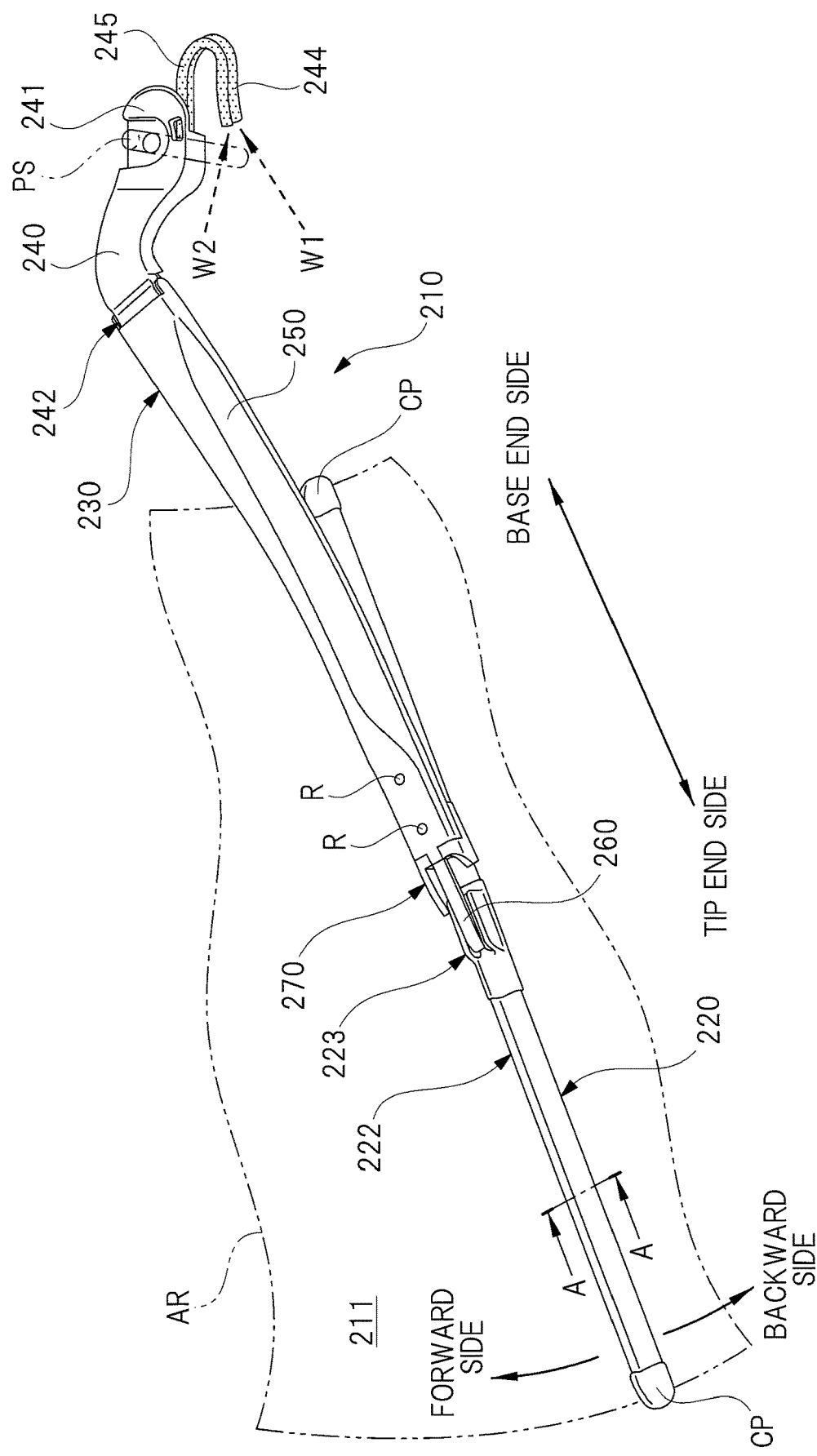

FIG. 15 is a perspective view illustrating a wiper device according to a fifth embodiment.

Figure 16:
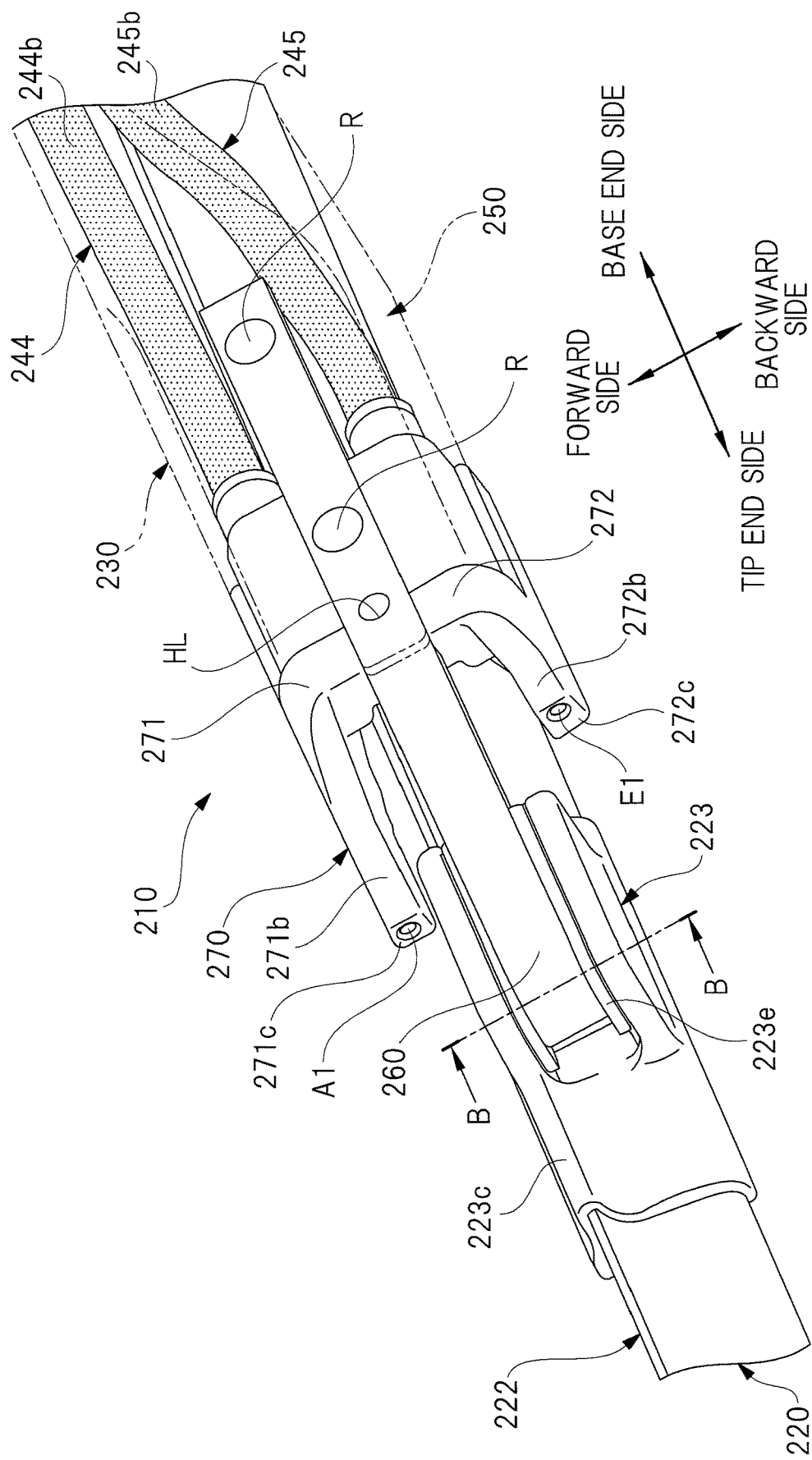

FIG. 16 is an enlarged perspective view illustrating a periphery of a nozzle unit when viewed from a front side thereof.

Figure 17:
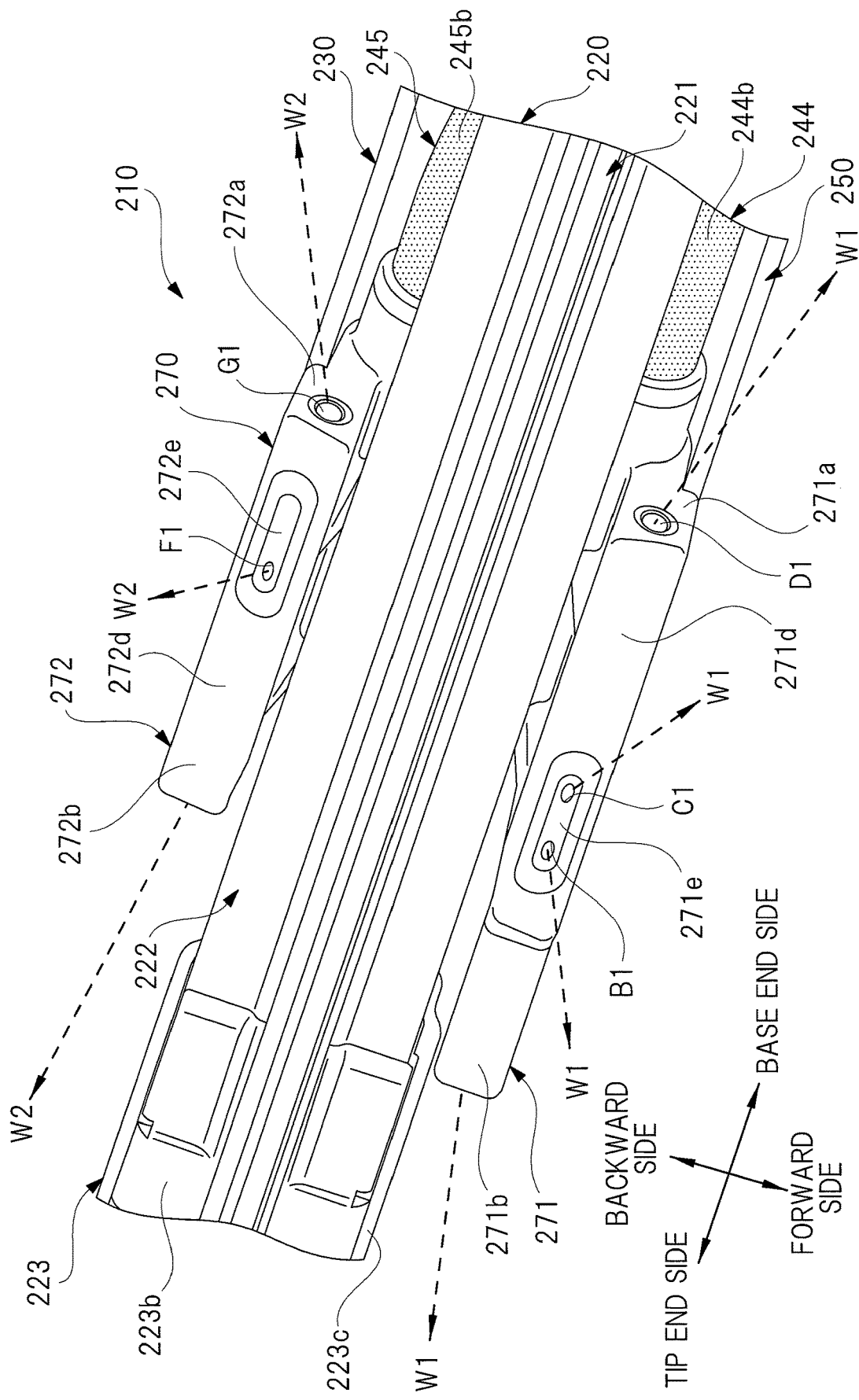

FIG. 17 is an enlarged perspective view illustrating the periphery of the nozzle unit when viewed from a back side thereof.

Figure 18:
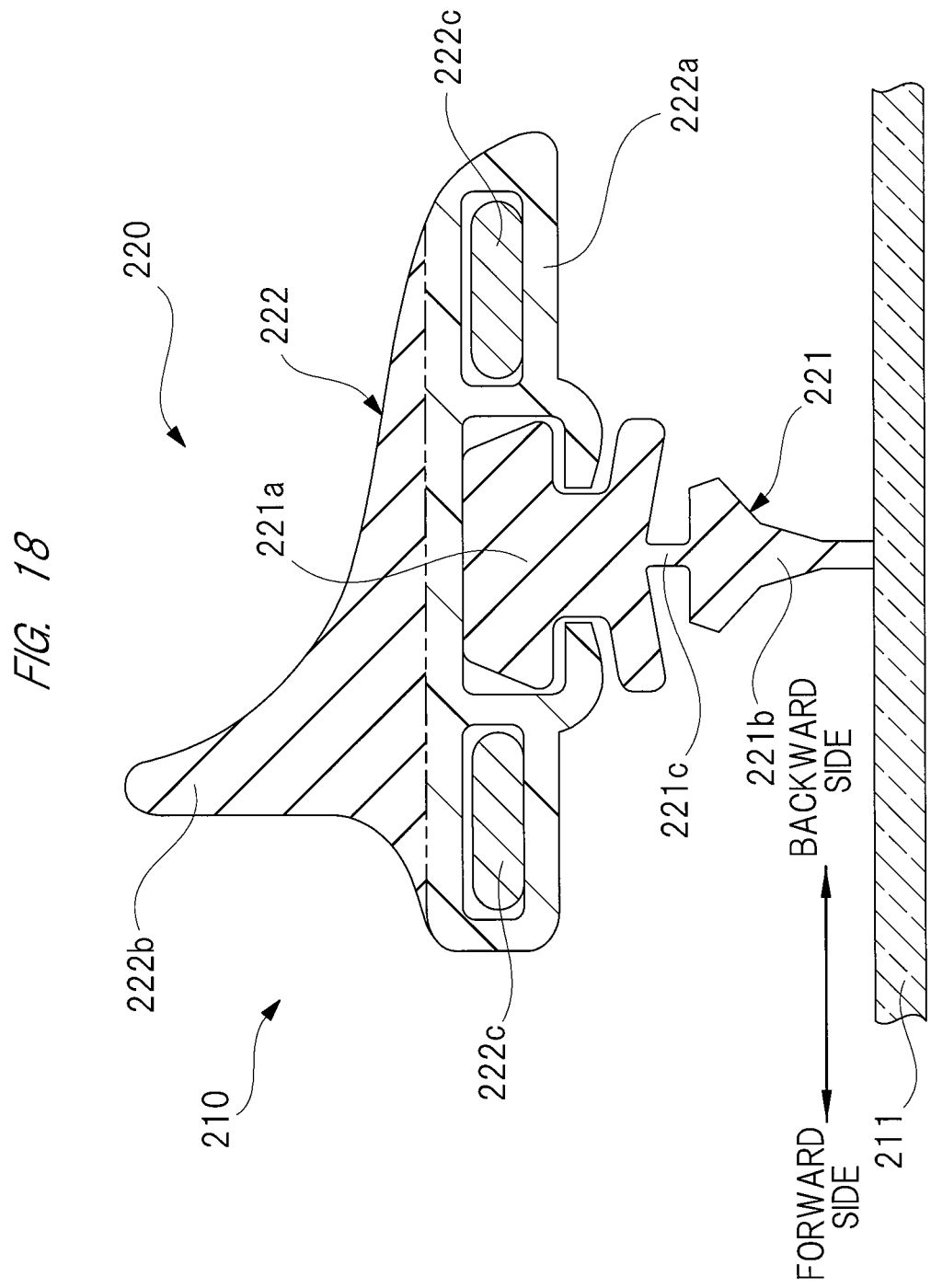

FIG. 18 is a cross-sectional view taken along the line A-A of FIG. 15.

Figure 19:
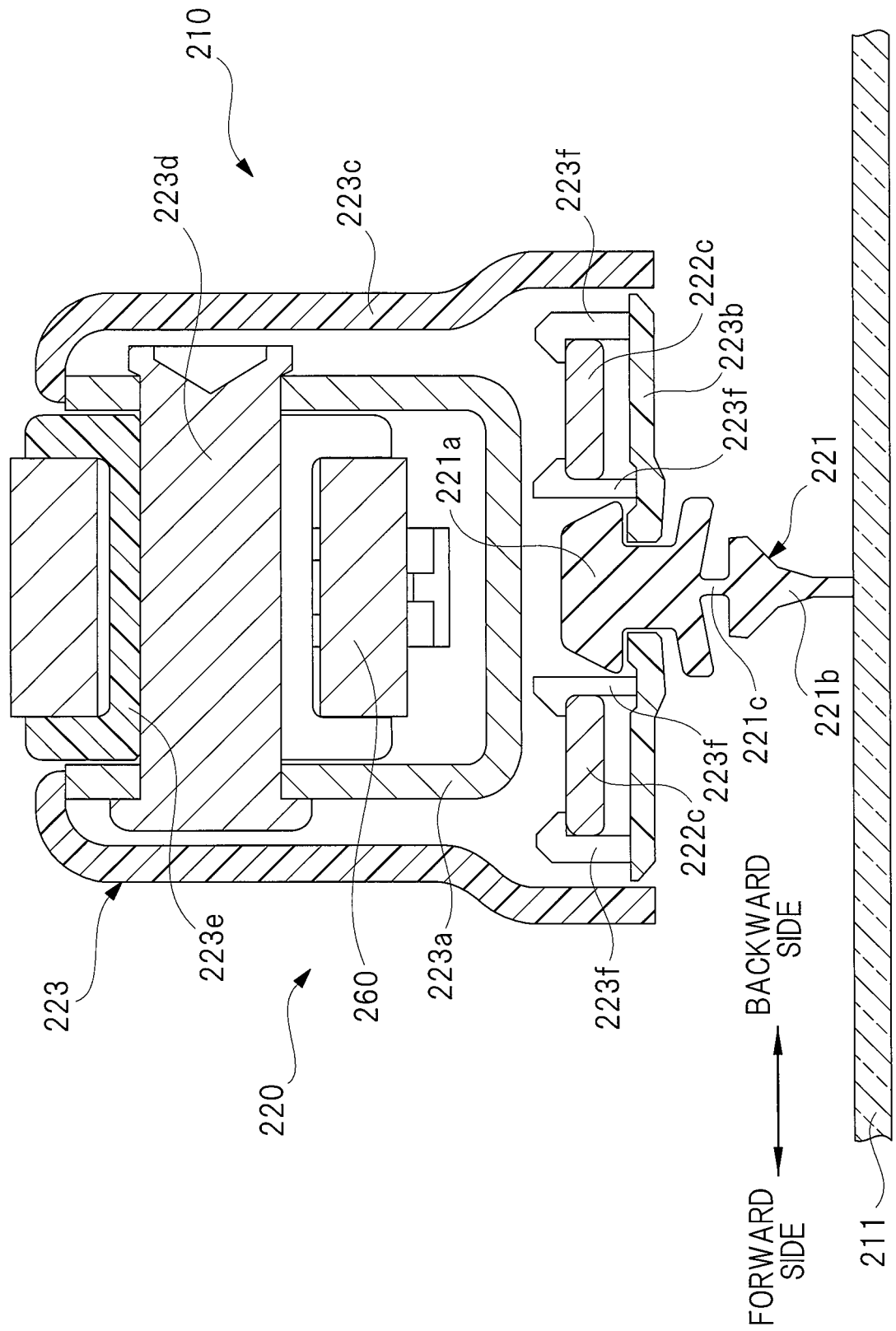

FIG. 19 is a cross-sectional view taken along the line B-B of FIG. 16.

Figure 20:
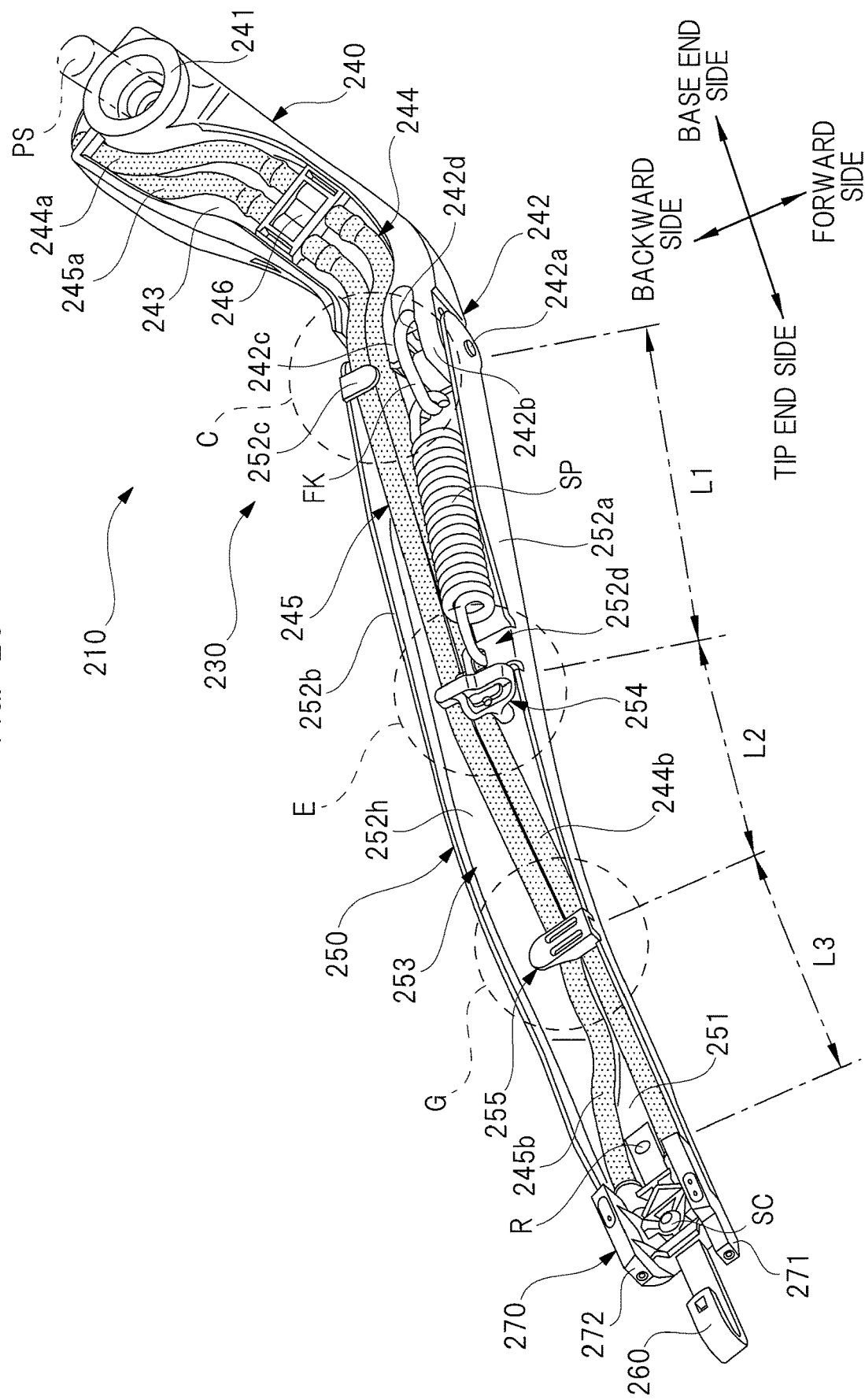

FIG. 20 is a perspective view illustrating a wiper arm when viewed from a back side thereof.

Figure 21:
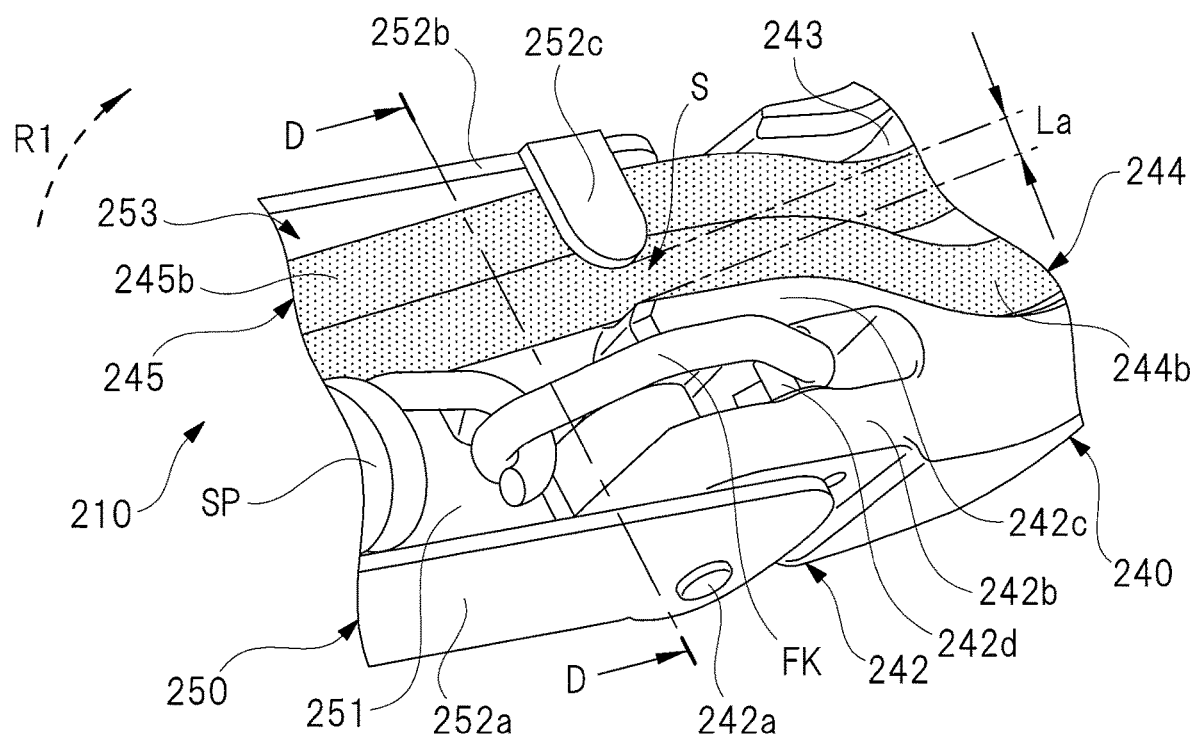

FIG. 21 is an enlarged view of a circle C indicated by a broken line in FIG. 20.

FIGS. 22($a$) and 22($b$) are cross-sectional views taken along the line D-D of FIG. 21.

Figure 23:
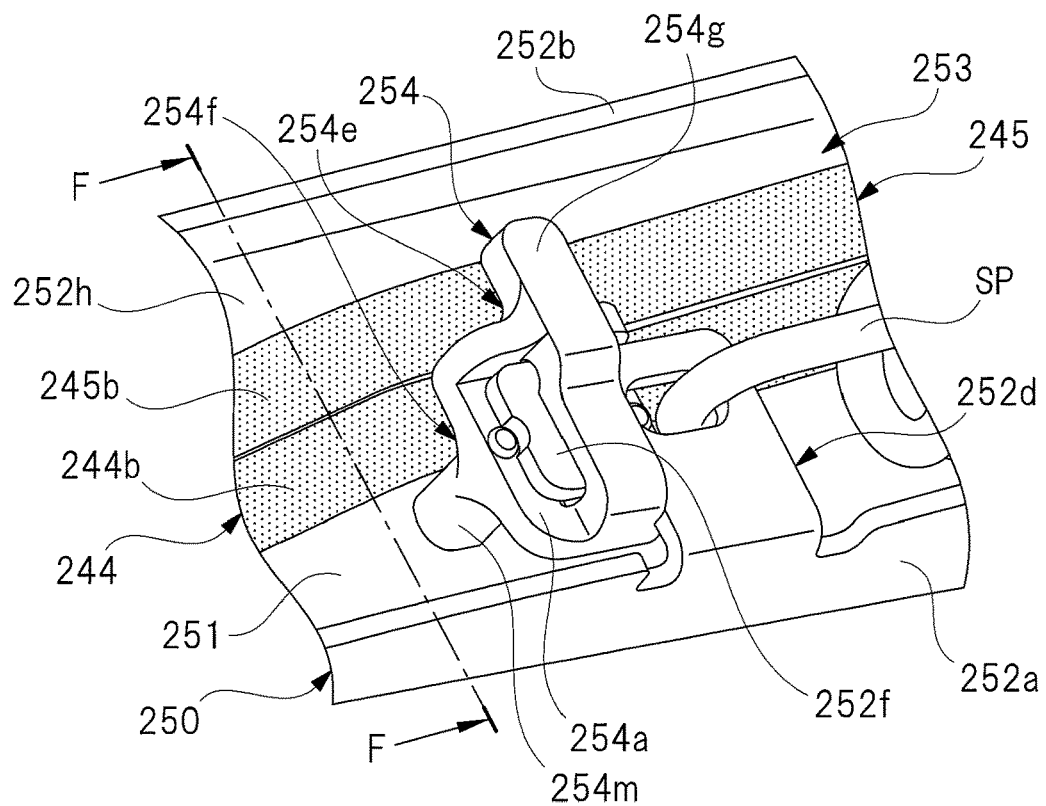

FIG. 23 is an enlarged view of a circle E indicated by a broken line in FIG. 20.

Figure 24:
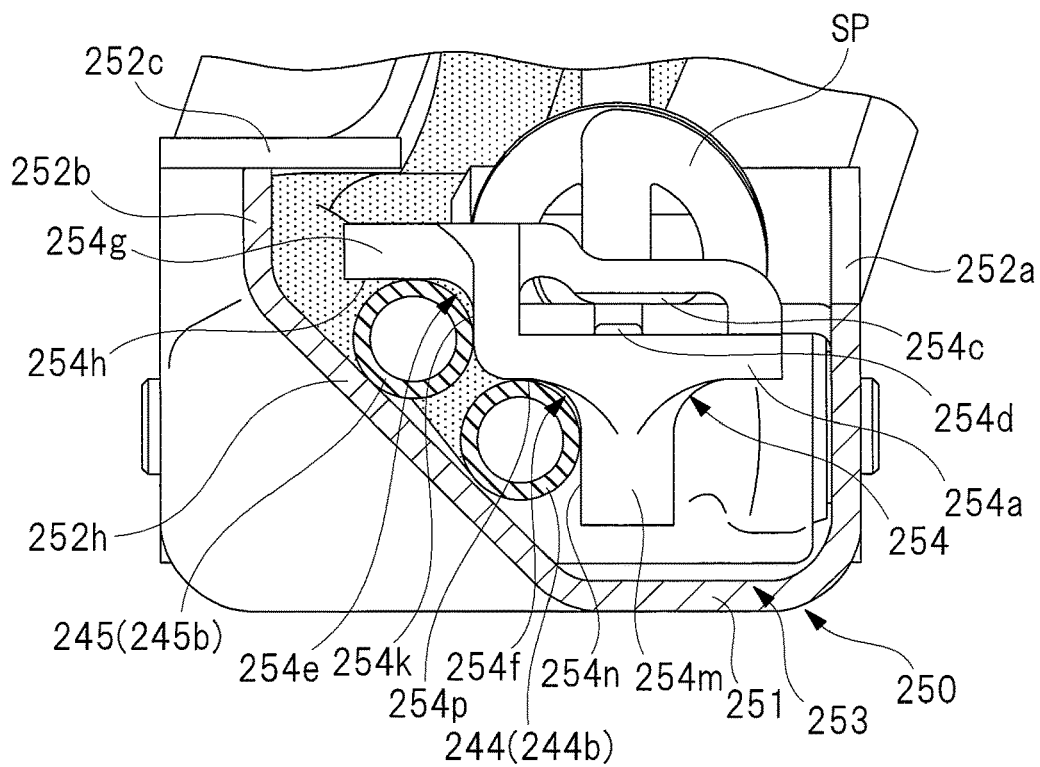

FIG. 24 is a cross-sectional view taken along the line F-F of FIG. 23.

Figure 25:
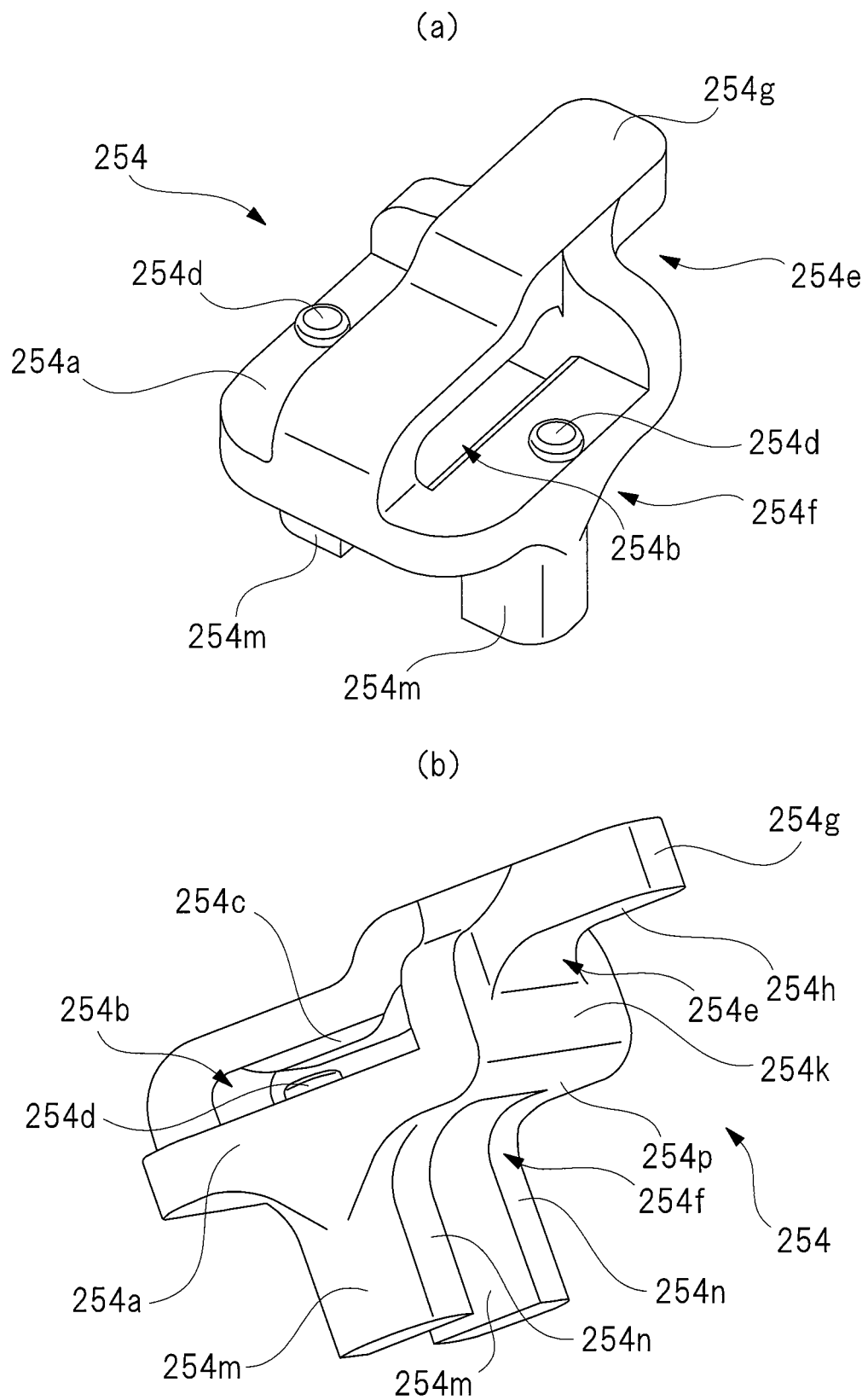

FIGS. 25($a$) and 25($b$) are perspective views illustrating a first holder.

Figure 26:
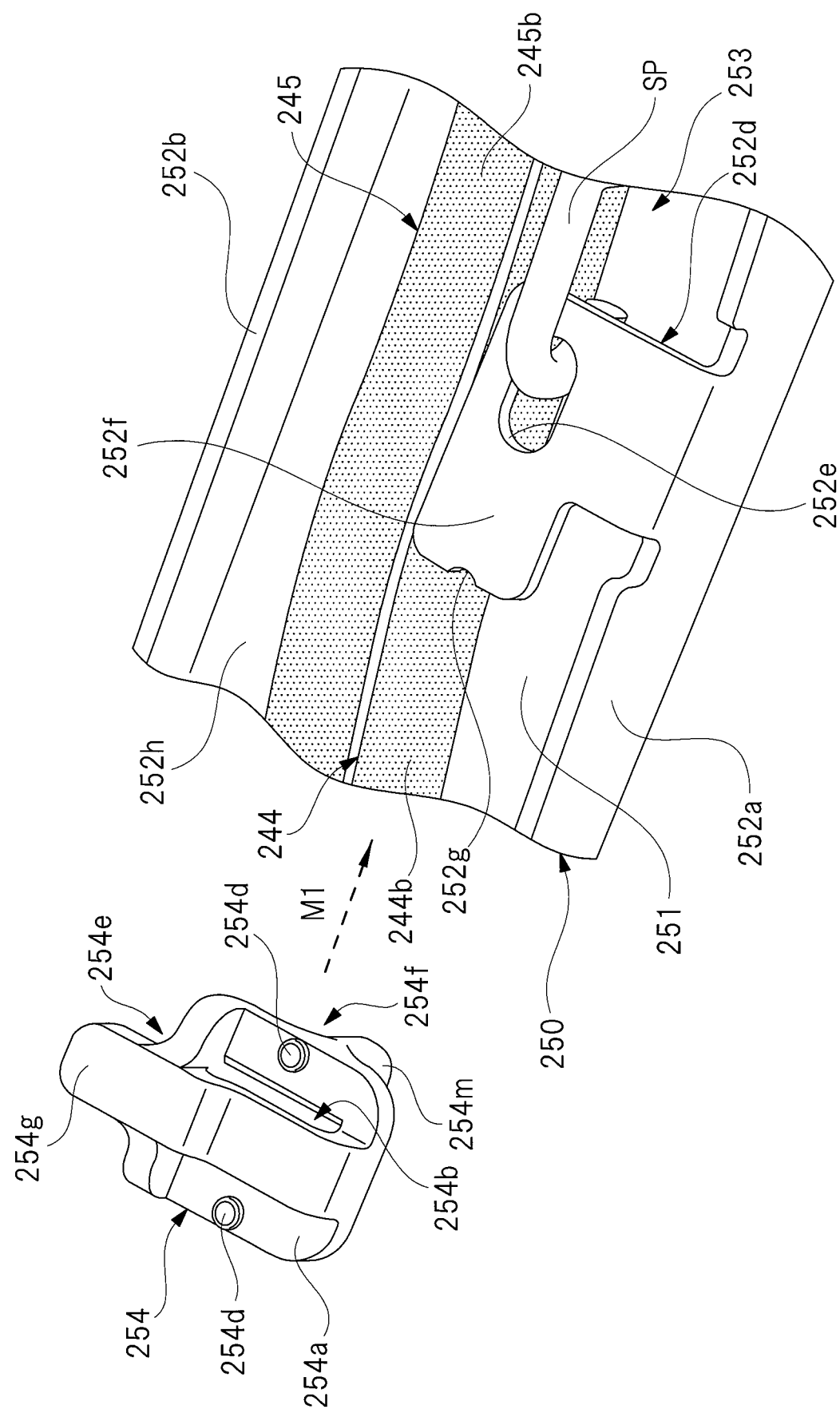

FIG. 26 is a view illustrating a fitting procedure of the first holder to an arm shank.

Figure 27:
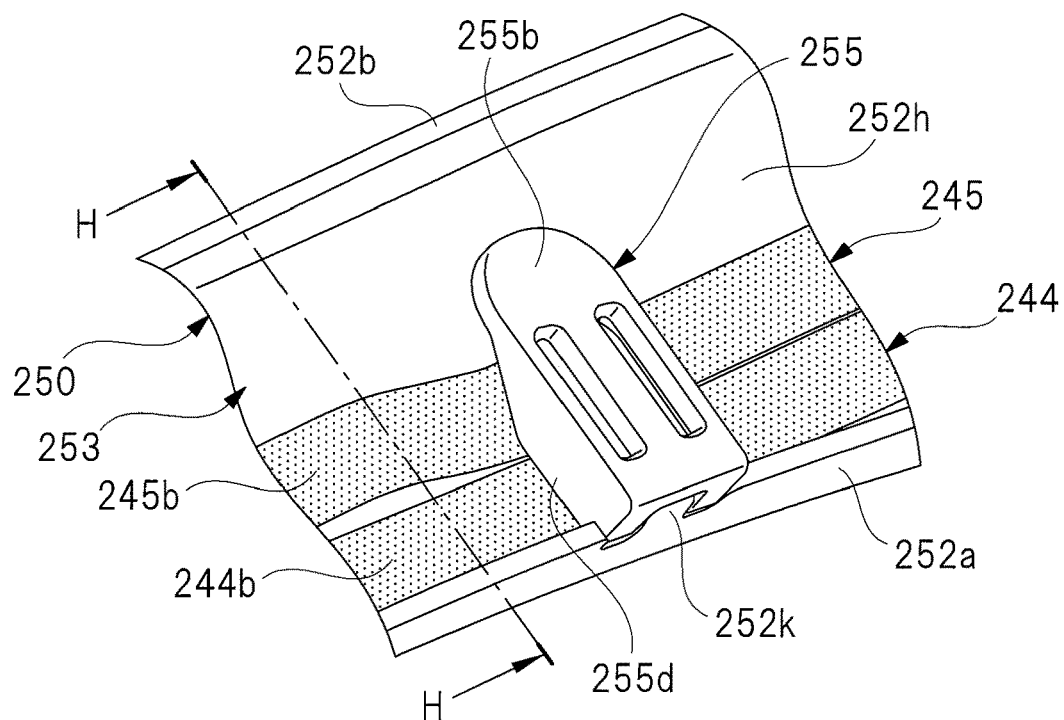

FIG. 27 is an enlarged view of a circle G indicated by a broken line in FIG. 20.

Figure 28:
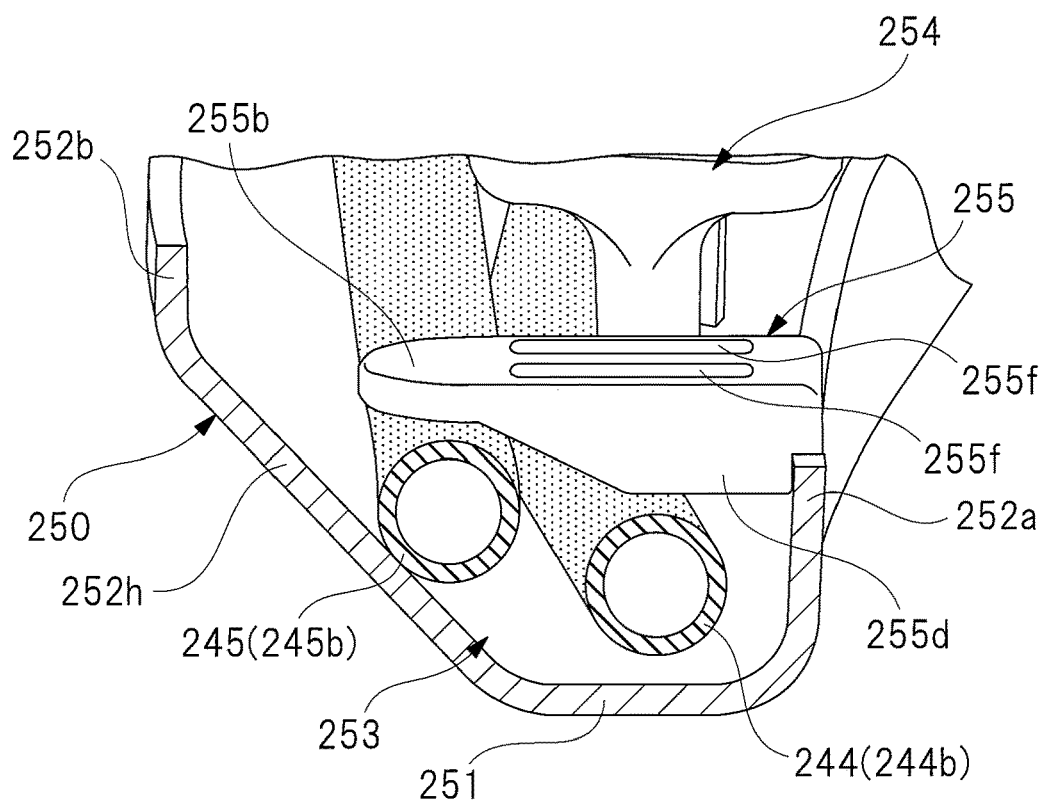

FIG. 28 is a cross-sectional view taken along the line H-H of FIG. 27.

FIGS. 29($a$) and 29($b$) are perspective views of a second holder.

Figure 30:
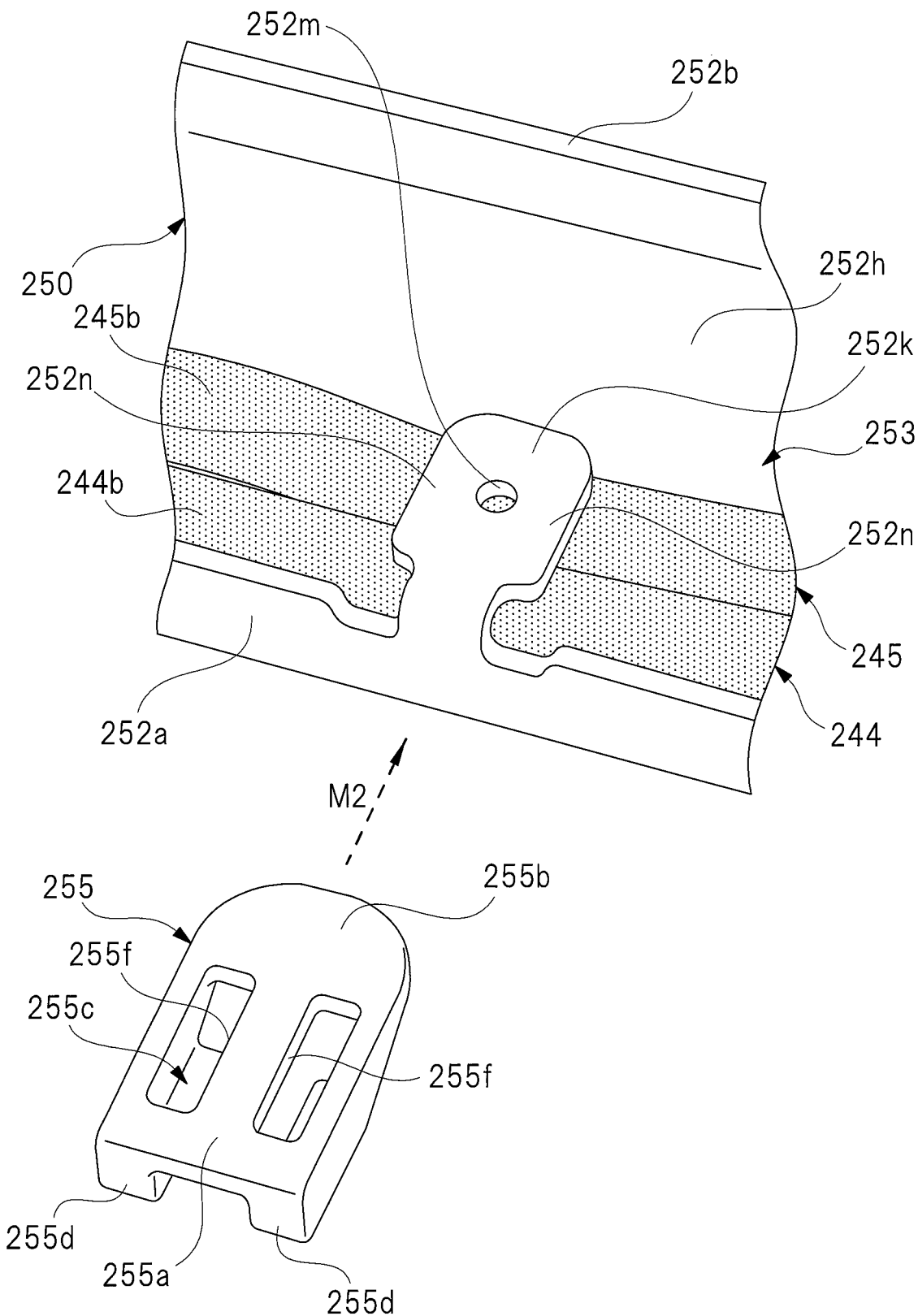

FIG. 30 is a view illustrating a fitting procedure of the second holder to the arm shank.

FIGS. 31($a$) and 31($b$) are views according to a sixth embodiment, which correspond to FIG. 21.

Figure 32:
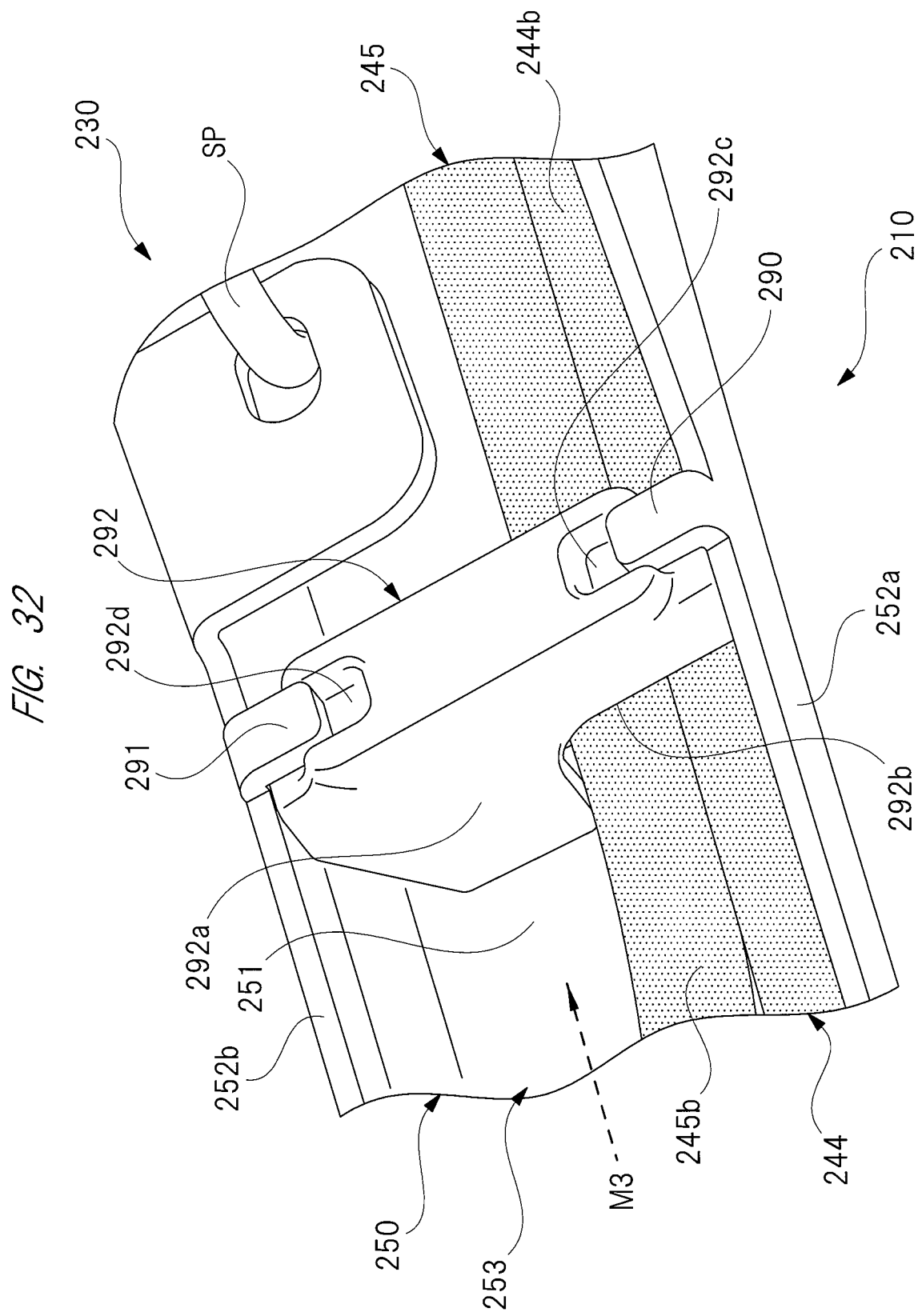

FIG. 32 is a perspective view illustrating a first holder according to a seventh embodiment.

FIGS. 33($a$) and 33($b$) are perspective views illustrating a first holder according to an eighth embodiment.

FIG. 34 is a perspective view illustrating a first holder according to a ninth embodiment.

DETAILED DESCRIPTION

Hereinafter, a first embodiment of the present invention will be described in detail with reference to the drawings.

Figure 1:
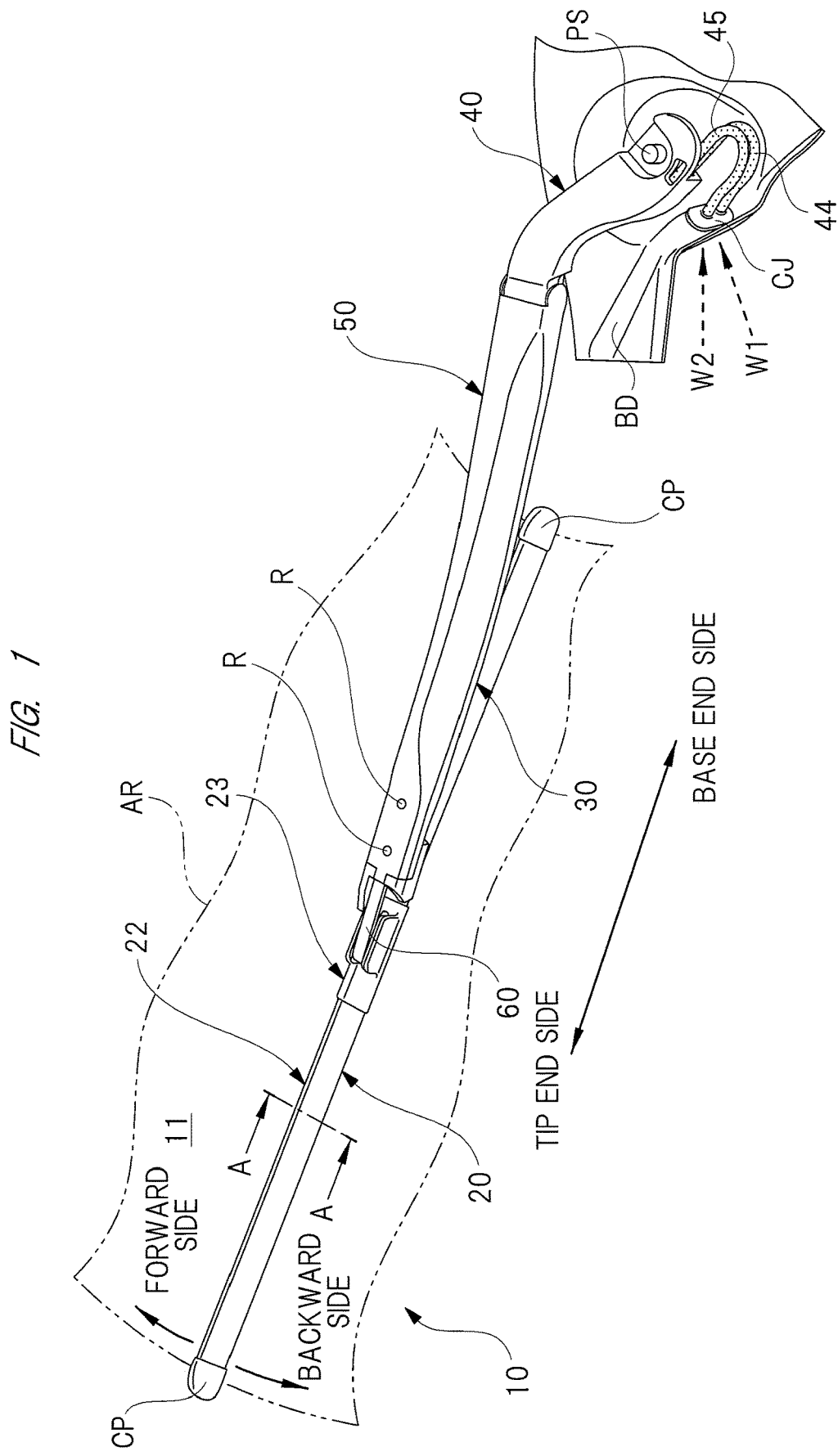
FIG. 1 is a perspective view illustrating a wiper device according to the present invention.
Figure 2:
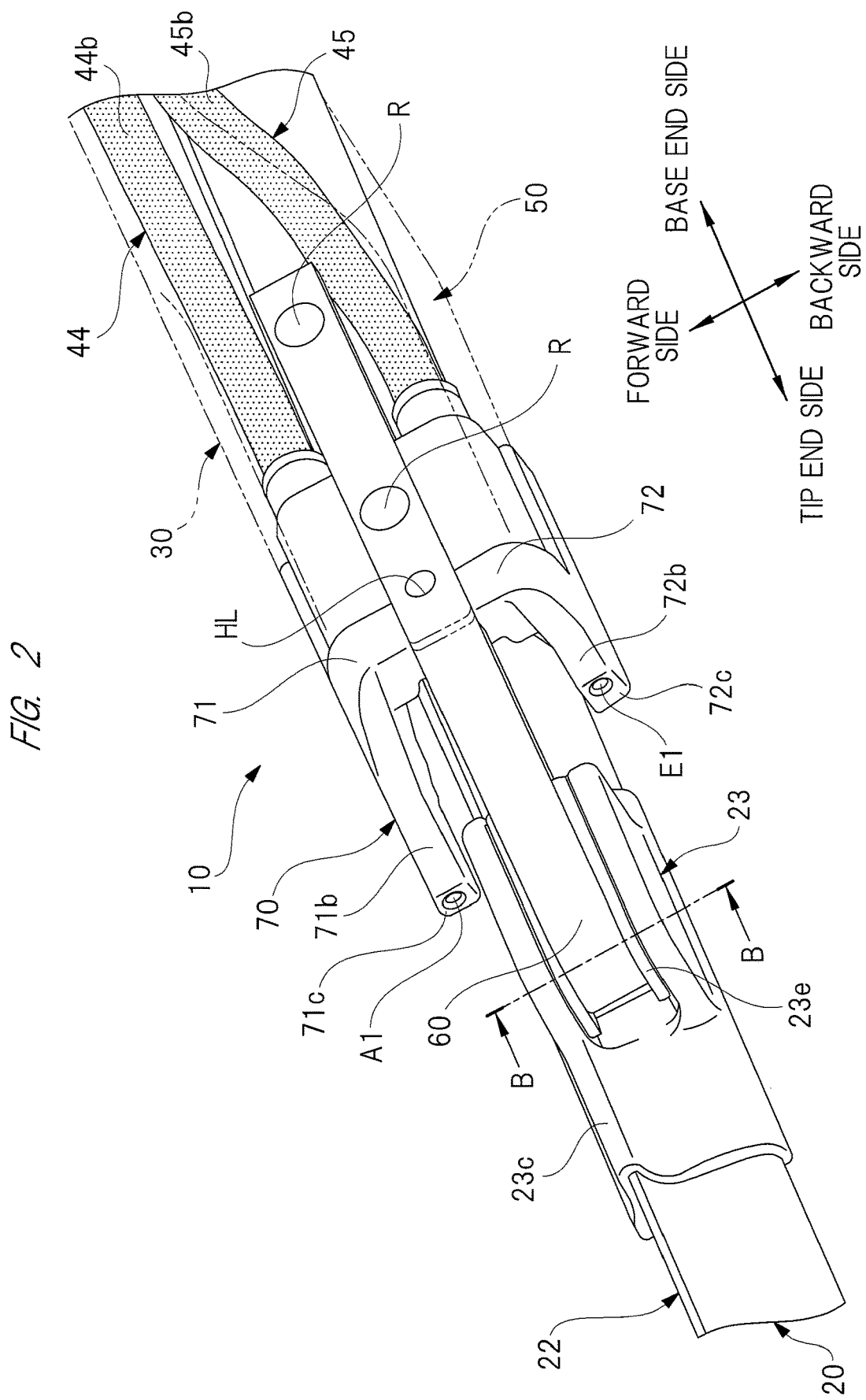
FIG. 2 is an enlarged perspective view of a periphery of a nozzle unit when viewed from a front side thereof.
Figure 3:
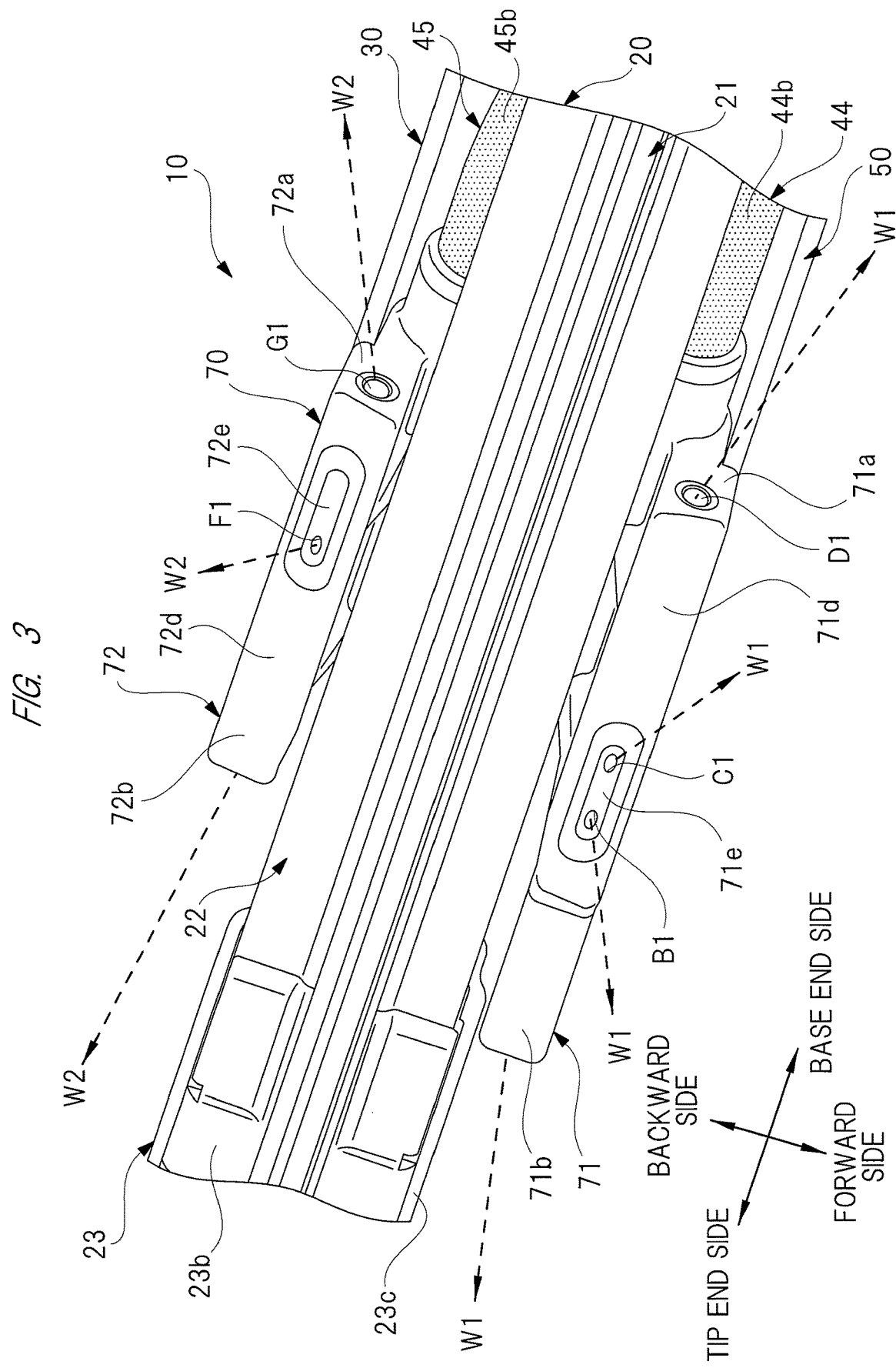
FIG. 3 is an enlarged perspective view of the periphery of the nozzle unit when viewed from a back side thereof.
Figure 4:
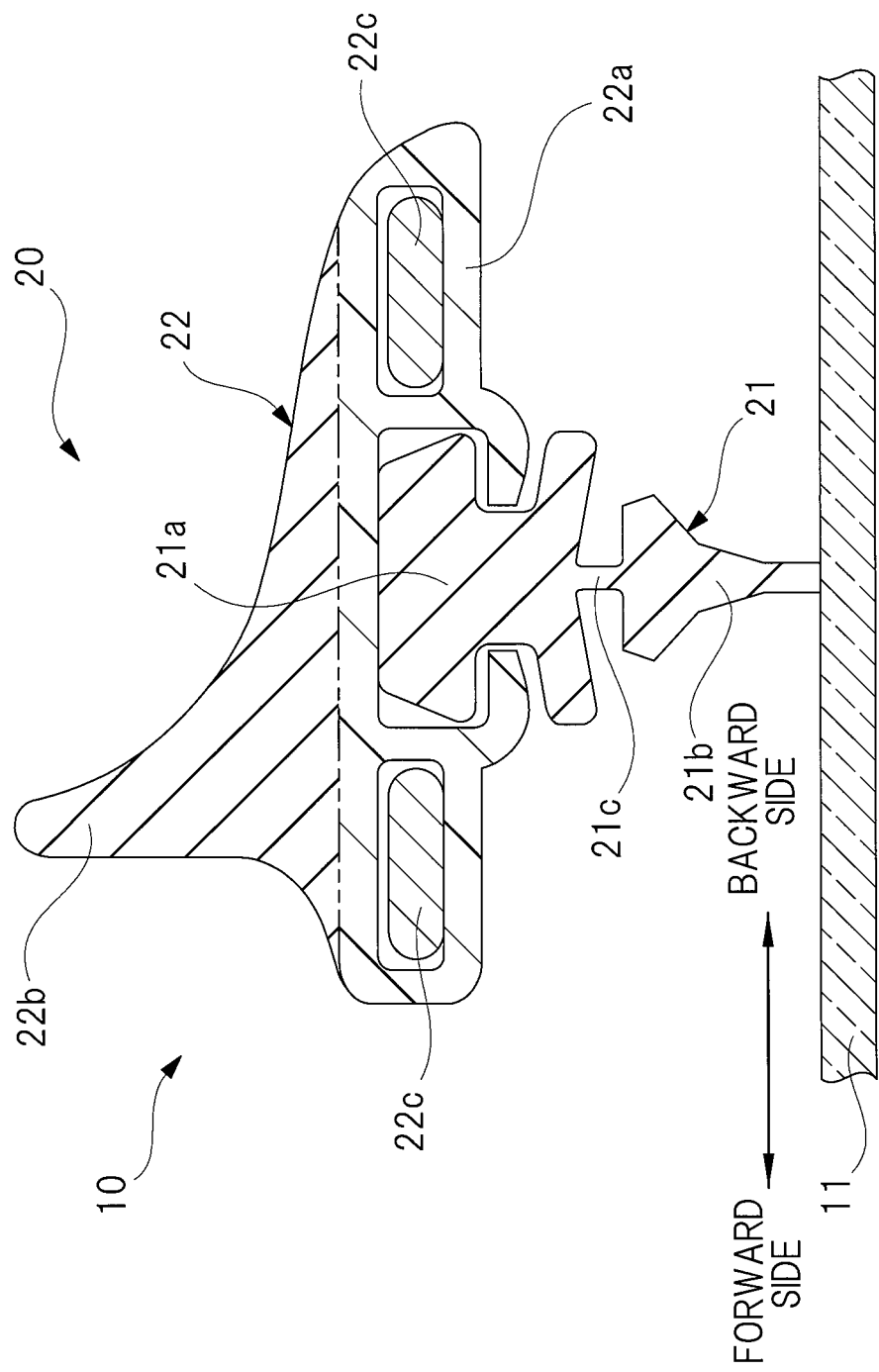
FIG. 4 is a cross-sectional view taken along the line A-A of FIG. 1.
Figure 5:
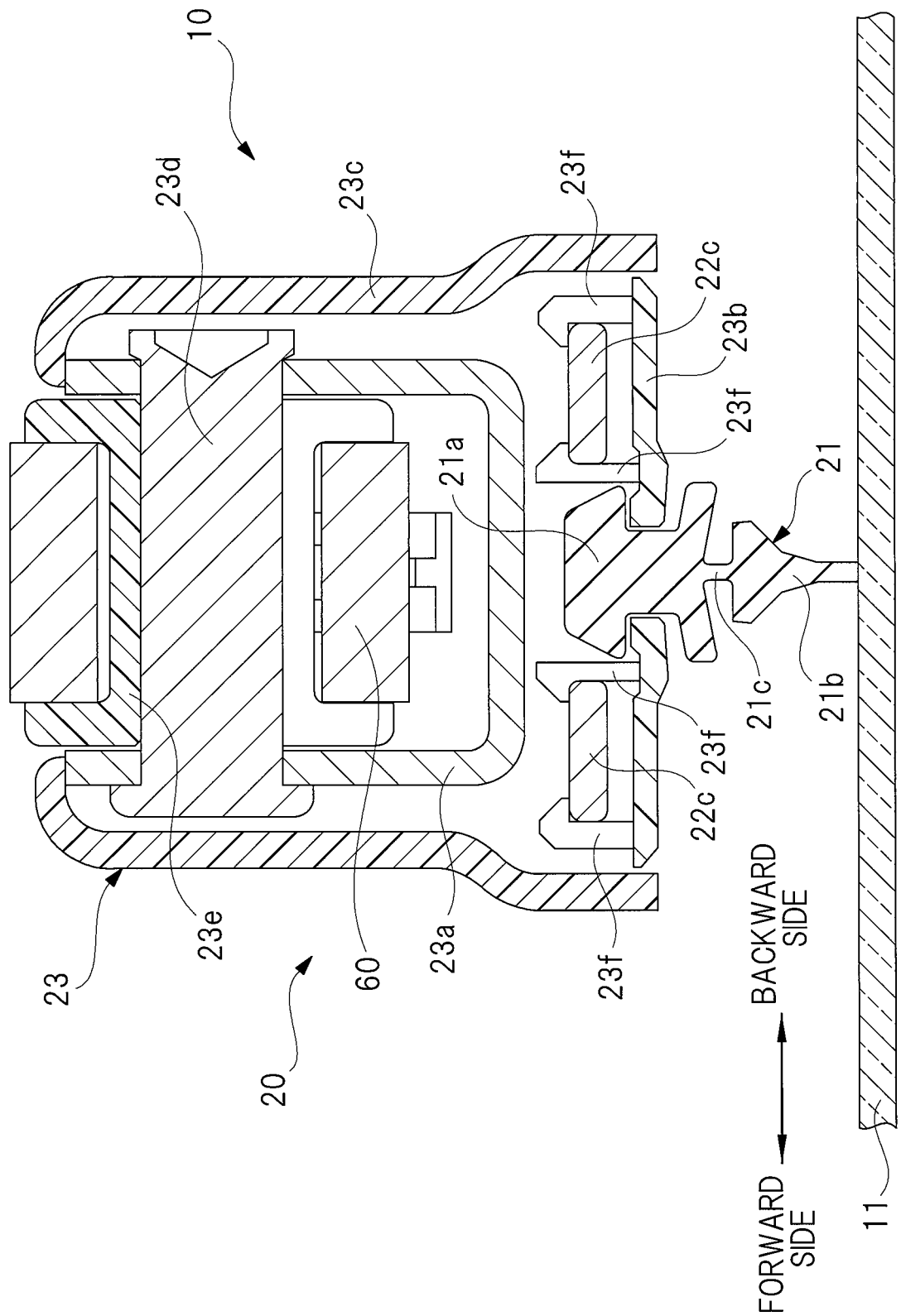
FIG. 5 is a cross-sectional view taken along the line B-B of FIG. 2.
Figure 6:
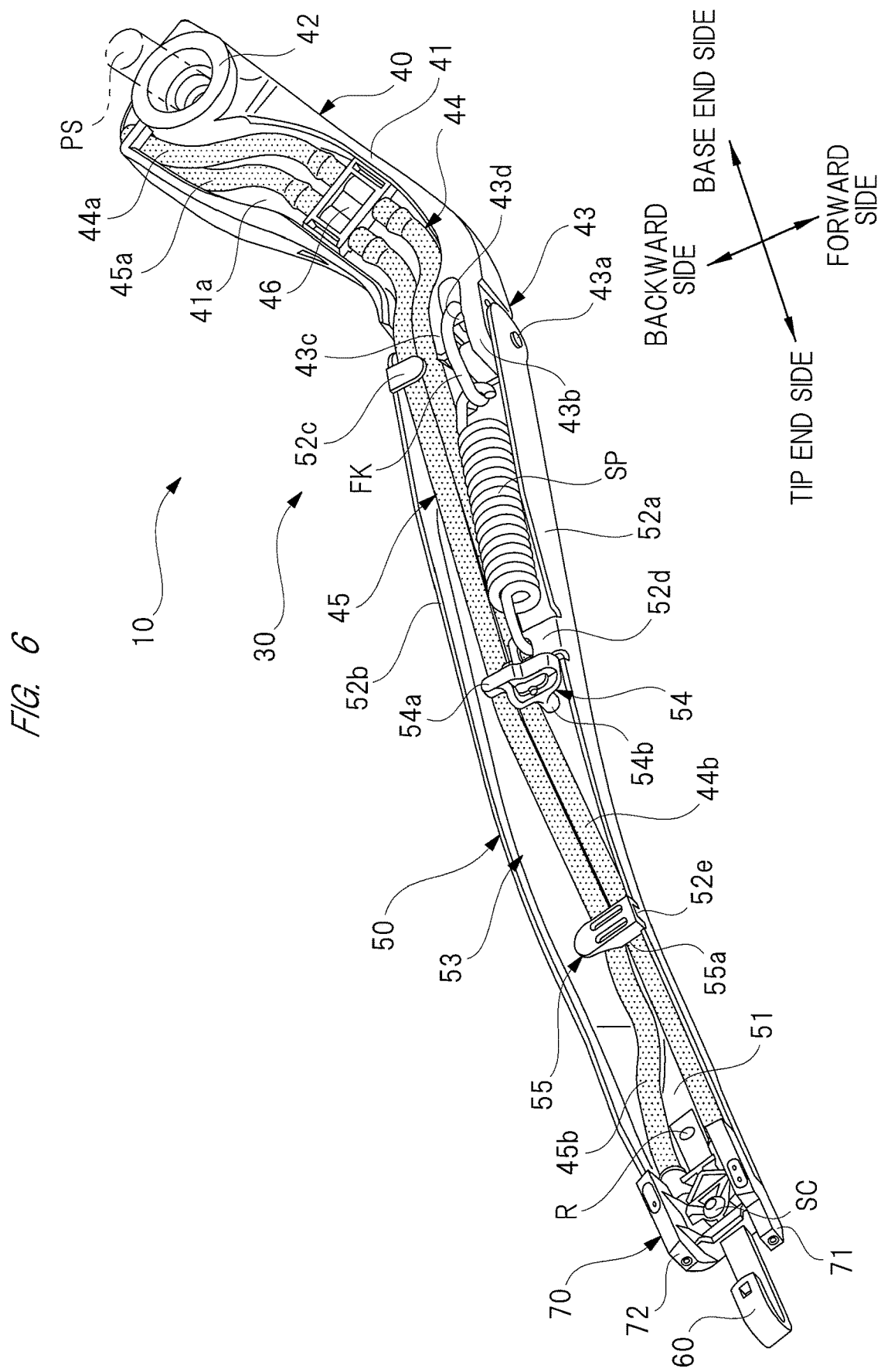
FIG. 6 is a perspective view of a wiper arm when viewed from a back side thereof.

FIG. 1 is a perspective view illustrating a wiper device according to the present invention. FIG. 2 is an enlarged perspective view of a periphery of a nozzle unit when viewed from a front side thereof. FIG. 3 is an enlarged perspective view of the periphery of the nozzle unit when viewed from a back side thereof. FIG. 4 is a cross-sectional view taken along the line A-A of FIG. 1. FIG. 5 is a cross-sectional view taken along the line B-B of FIG. 2. FIG. 6 is a perspective view of a wiper arm when viewed from a back side thereof.

As shown in FIG. 1, a wiper device 10 includes a wiper blade 20 and a wiper arm 30. The wiper blade 20 is rotatably fitted to the wiper arm 30 on a tip end side thereof, and is in sliding contact with a windshield (surface to be wiped) 11 on a front side of a vehicle such as an automobile. A base end side of the wiper arm 30 is fitted to a swinging shaft PS on the front side of the vehicle. By turning on a wiper switch (not shown in the drawings) in a vehicle interior to rotate a wiper motor (not shown in the drawings), the swinging shaft PS is caused to swing. Thus, the wiper device 10 performs a reciprocating wiping operation toward a forward side and a backward side within a predetermined wiping range AR formed on the windshield 11 as indicated with arrows in the drawing.

As shown in FIGS. 1 to 5, the wiper blade 20 includes a blade rubber 21, a holder member 22, and a coupling portion 23. The blade rubber 21 is in contact with the windshield 11. The holder member 22 holds the blade rubber 21. The coupling portion 23 is provided at a middle portion of the holder member 22 in a longitudinal direction thereof. In this regard, a pair of end caps CP is fitted to both end portions of the holder member 22 in the longitudinal direction thereof. This prevents the blade rubber 21, which is held by the holder member 22, from coming off.

As shown in FIGS. 4 and 5, the blade rubber 21 includes a main body portion 21a, a lip portion 21b, and a neck portion 21c. The main body portion 21a is held by the holder member 22. The lip portion 21b is caused to be in contact with the windshield 11. The neck portion 21c couples the main body portion 21a to the lip portion 21b. In this regard, the blade rubber 21 is formed into a long shape by extrusion molding of an elastic material such as rubber, and a cross-sectional shape thereof is a uniform shape across an entire region in the longitudinal direction thereof.

A thickness dimension of the neck portion 21c in an operation direction of the blade rubber 21 (a horizontal direction in the drawing) is set to a thickness dimension smaller than any of thickness dimensions of the main body portion 21a and the lip portion 21b, whereby the neck portion 21c is elastically deformed easily. Thus, when the wiper blade 20 moves toward the forward side and the backward side on the windshield 11, the lip portion 21b is allowed to incline so that a tip end portion of the lip portion 21b can smoothly follow the wiper blade 20 in a moving direction thereof. Therefore, it is possible to surely wipe off an adhesive substance such as dust and rainwater (not shown in the drawings) attached onto the windshield 11.

As shown in FIG. 4, the holder member 22 includes a holder main body 22a and a fin portion 22b. The holder main body 22a and the fin portion 22b are integrally formed by two-color molding of different materials having different hardness from each other, and are formed into a long shape in the same manner as the blade rubber 21.

The holder main body 22a is formed of a resin material such as plastic having flexibility in order to be capable of following a curved surface shape (not shown in the drawings) of the windshield 11 while securing sufficient strength to hold the main body portion 21a of the blade rubber 21. On the other hand, the fin portion 22b is formed of an elastic material such as rubber having hardness lower than hardness of the holder main body 22a. When a travelling wind hits the fin portion 22b, downforce is generated by the wiper blade 20, whereby wiping performance of the blade rubber 21 is well maintained.

A pair of vertebrae 22c is provided inside the holder main body 22a at a predetermined interval. Each of the vertebrae 22c is formed of a steel plate having a spring property, and is arranged in a mirror-image symmetrical manner so as to sandwich the main body portion 21a of the blade rubber 21 from both of the forward side and the backward side. Each of the vertebrae 22c is curved with a curvature larger than a curvature of the windshield 11 in a natural state where no external force is applied thereto, and causes the holder member 22 and the blade rubber 21 to be elastically deformed in accordance with the curvature of the windshield 11. This causes the entire region of the lip portion 21b in the longitudinal direction to be stuck onto the windshield 11.

As shown in FIG. 1 and FIG. 5, the coupling portion 23 is provided at a middle portion of the holder member 22 in the longitudinal direction thereof. The coupling portion 23 includes a coupling main body 23a, a base plate 23b, and a cover member 23c. The coupling main body 23a is formed so that a cross section thereof has a substantially U shape by pressing or the like of a steel plate, and is crimped and fixed to each of the vertebrae 22c by means of a fixed leg portion (not shown in the drawings) that is integrally provided thereto.

A columnar pin 23d made of a steel material is crimped and fixed to the coupling main body 23a, and a hook fixing member 23e formed of a resin material such as plastic is rotatably fitted to the columnar pin 23d. Here, an arm piece 60 (see FIG. 2), which is fixed to the tip end side of the wiper arm 30, is coupled to the hook fixing member 23e by one touch operation. In this regard, the columnar pin 23d and the hook fixing member 23e also constitute the coupling portion 23.

The base plate 23b is formed into a plate shape by a resin material such as plastic. The base plate 23b is fitted to each of the vertebrae 22c by means of a fixed leg portion 23f that is integrally provided thereto. Here, the coupling main body 23a is disposed on a fin portion 22b side (front side) of the holder member 22, and the base plate 23b is disposed on a holder main body 22a side (back side) of the holder member 22.

The cover member 23c is formed into a substantially box shape by a resin material such as plastic. The cover member 23c is fitted to the outside of the coupling main body 23a by means of a plurality of engaging claws (not shown in the drawings) that is integrally provided thereto. The cover member 23c covers and hides a side portion and the like of the coupling main body 23a, and this makes it possible to improve appearance of the wiper blade 20.

As shown in FIGS. 1 and 6, the wiper arm 30 includes an arm head 40, an arm shank 50, and the arm piece 60.

Figure 7:
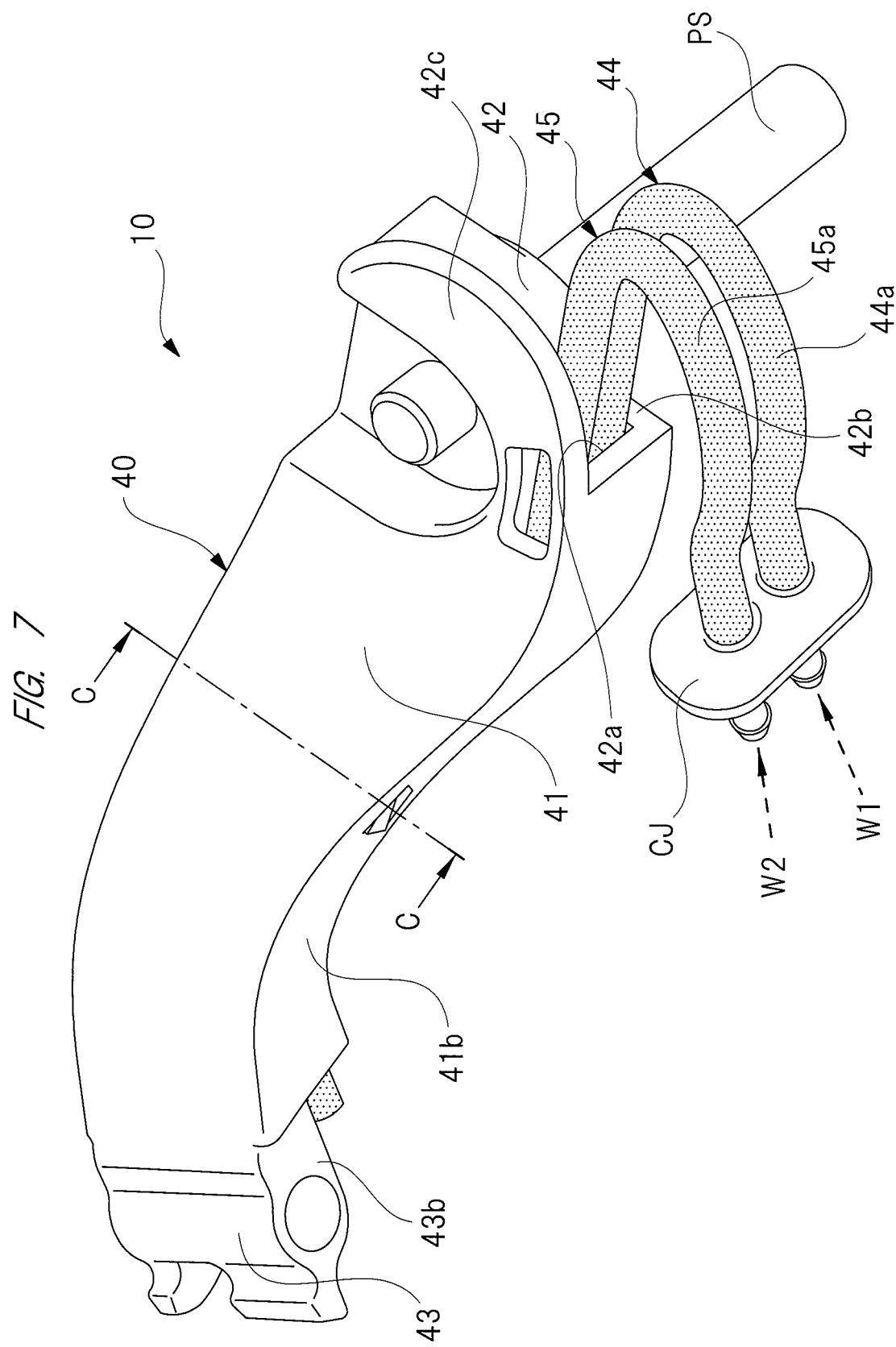
FIG. 7 is a perspective view of a periphery of a shaft fixing portion of the arm head when viewed from a front side thereof.
Figure 8:
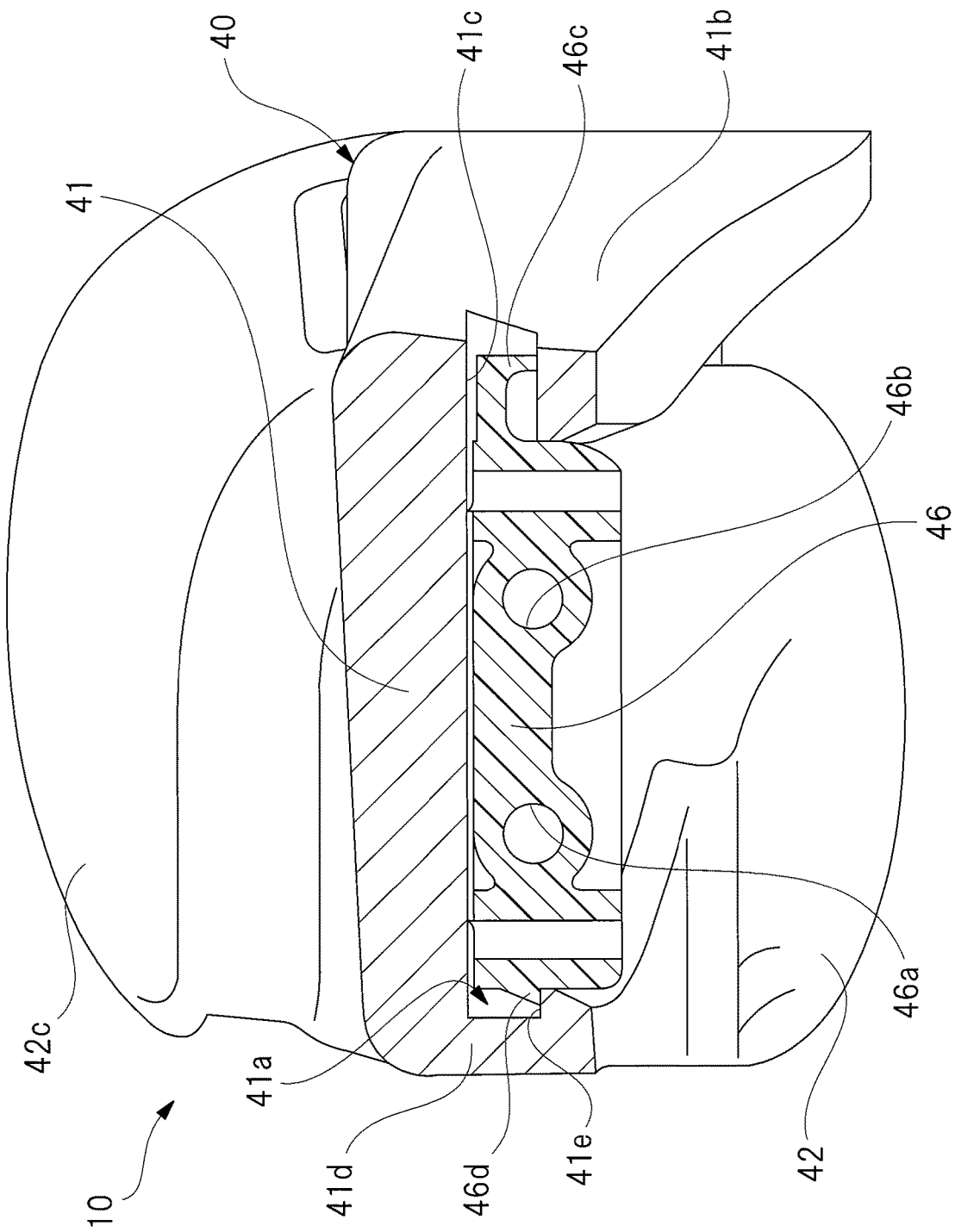
FIG. 8 is a cross-sectional view taken along the line C-C of FIG. 7.
Figure 9:
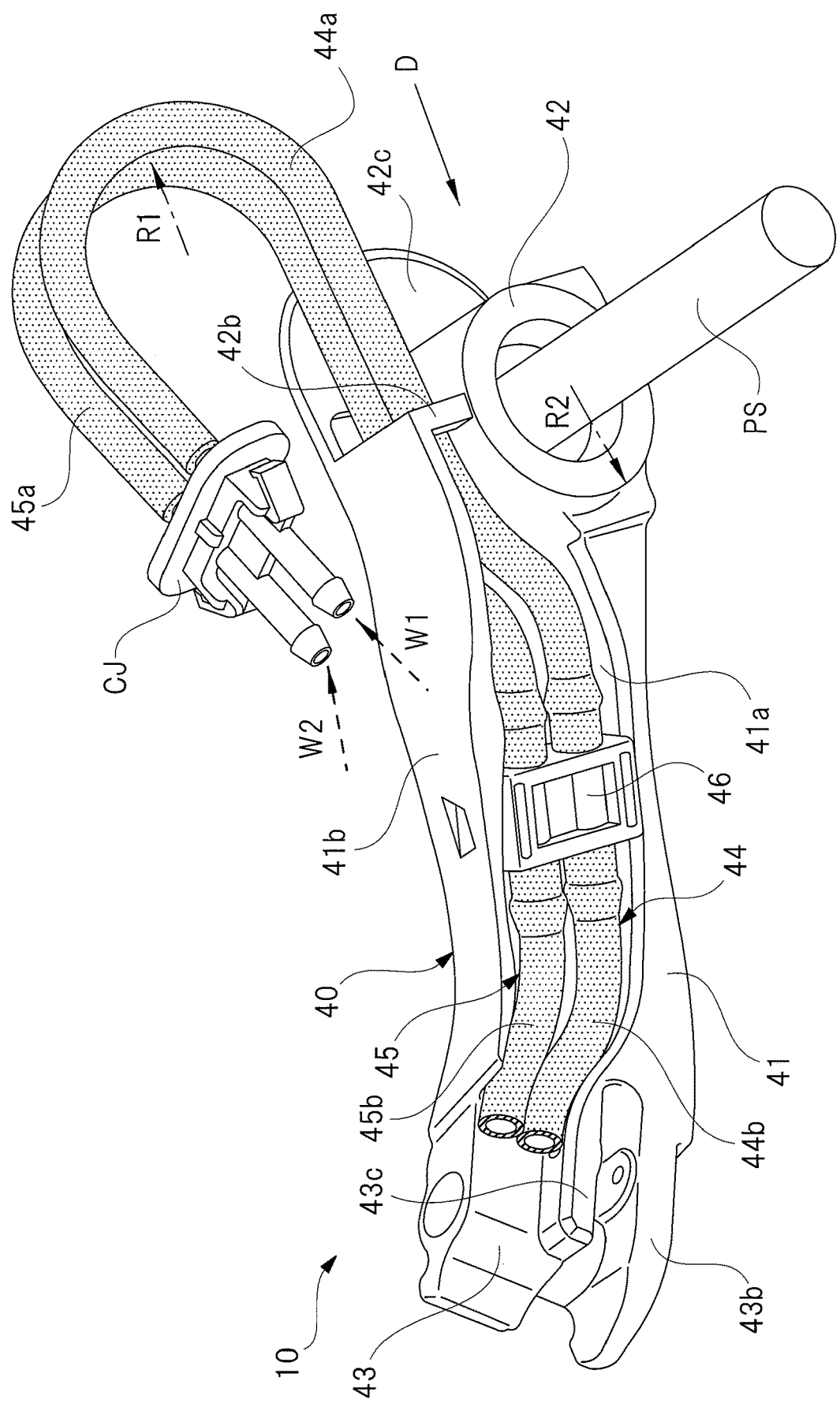
FIG. 9 is a perspective view of the periphery of the shaft fixing portion of the arm head when viewed from the back side thereof.

FIG. 7 is a perspective view of a periphery of a shaft fixing portion of the arm head when viewed from a front side thereof. FIG. 8 is a cross-sectional view taken along the line C-C of FIG. 7. FIG. 9 is a perspective view of the periphery of the shaft fixing portion of the arm head when viewed from the back side thereof. FIG. 10(a) is a view when viewed in a direction of an arrow D in FIG. 9, and FIG. 10(b) is a view illustrating a modified example of a holding hole, which corresponds to FIG. 10(a). FIGS. 11(a) and 11(b) are explanatory drawings for explaining a state of each of pipes wound around the shaft fixing portion.

As shown in FIGS. 6, 7, and 9, the arm head 40 is formed into a bar shape by cast-molding and the like of an aluminum material. The arm head 40 includes a head main body 41, a shaft fixing portion 42, and a shank fitting portion 43. The head main body 41 is curved into a substantially J shape. The shaft fixing portion 42 is provided at one end portion (a right side in the drawing) of the head main body 41 and fixed to the swinging shaft PS. The shank fitting portion 43 is provided at the other end portion (a left side in the drawing) of the head main body 41, and one end portion of the arm shank 50 is fitted to the shank fitting portion 43.

As shown in FIGS. 6 and 9, a head side pipe housing portion 41a opened toward a windshield 11 side is provided at the windshield 11 side (near side in the drawing) of the head main body 41. The head side pipe housing portion 41a is provided across an entire region in a longitudinal direction of the arm head 40 so as to match a shape of the arm head 40. Thus, a cross-sectional shape of the arm head 40 in the short direction thereof is formed into a substantially U shape.

A forward side washer tube (forward side pipe) 44 and a backward side washer tube (backward side pipe) 45 are housed inside the head side pipe housing portion 41a. Here, in order to readily understand an arrangement structure of each of the washer tubes 44, 45, each of the washer tubes 44, 45 is indicated with half-tone dot meshing in the drawing.

As shown with arrows each indicated by a broken line in FIGS. 1, 7, and 9, a forward side washer fluid (cleaning fluid) W1 and a backward side washer fluid (cleaning fluid) W2 are respectively supplied from a washer pump (not shown in the drawings) to the washer tubes 44, 45. Here, a vehicle body side connecting member CJ fixed to a vehicle body BD (see FIG. 1) is connected to a base end side of each of the washer tubes 44, 45. The washer pump is connected to a side of the vehicle body side connecting member CJ opposite to each of the washer tubes 44, 45 through a pair of washer tubes (not shown in the drawings).

The washer tubes 44, 45 respectively feed the washer fluids W1 and W2 to a nozzle unit 70 (will be described later). As shown in FIGS. 6 and 9, the forward side washer tube 44 is constituted of a vehicle side tube (upstream pipe) 44a and a nozzle side tube (downstream pipe) 44b. Further, the backward side washer tube 45 is constituted of a vehicle side tube (upstream pipe) 45a and a nozzle side tube (downstream pipe) 45b.

The vehicle side tube 44a and the vehicle side tube 45a are respectively connected to the nozzle side tube 44b and the nozzle side tube 45b with a wiper side connecting member (connecting member) 46 that is fixed to the inside of the head side pipe housing portion 41a.

As shown in FIG. 8, flow channels 46a and 46b, through which the washer fluids W1 and W2 respectively flow, are formed inside the wiper side connecting member 46. Further, a first engaging claw 46c and a second engaging claw 46d are integrally provided on the wiper side connecting member 46 so as to face each other across the pair of flow channels 46a and 46b. The first engaging claw 46c having a large projection height is caused to engage with an engaging recessed portion 41c provided on a side wall 41b that is provided at the backward side (a right side in the drawing) of the head main body 41. The second engaging claw 46d having a small projection height is caused to engage with an engaging recessed portion 41e provided on a side wall 41d that is provided at the forward side (a left side in the drawing) of the head main body 41.

Here, in order to fix the wiper side connecting member 46 to the inside of the head side pipe housing portion 41a, the wiper side connecting member 46 is first tilted with respect to the head side pipe housing portion 41a so as to face each other, and the first engaging claw 46c is caused to engage with the engaging recessed portion 41c under such a condition. Subsequently, the wiper side connecting member 46 is brought into a condition parallel to the head side pipe housing portion 41a, and the second engaging claw 46d is caused to engage with the engaging recessed portion 41e. Thus, the wiper side connecting member 46 is fixed to the inside of the head side pipe housing portion 41a without any wobbling.

By fixing the wiper side connecting member 46 to the inside of the head side pipe housing portion 41a in this manner, it is possible to prevent each of the washer tubes 44, 45 from slacking in a portion of the arm head 40. Further, by respectively dividing the washer tubes 44, 45 into the vehicle side tubes 44a, 45a and the nozzle side tubes 44b, 45b with the wiper side connecting member 46 as a boundary, it is possible to easily assemble the vehicle side tubes 44a, 45a and the nozzle side tubes 44b, 45b to the arm head 40 and the arm shank 50, respectively. Moreover, for example, even in a case where tension acts on each of the nozzle side tubes 44b, 45b, it is possible to prevent the tension from acting on each of the vehicle side tubes 44a, 45a.

As shown in FIGS. 7 and 9, the base end side of each of the washer tubes 44, 45 that are housed in the head side pipe housing portion 41a, that is, each of the vehicle side tubes 44a, 45a is drawn out together from a position avoiding the shaft fixing portion 42 to the outside of the arm head 40. Specifically, each of the vehicle side tubes 44a, 45a is drawn out from the head side pipe housing portion 41a to the outside under a condition that the vehicle side tubes 44a, 45a are arranged in an axial direction of the swinging shaft PS.

As shown in FIG. 10(a), a holding hole 42a formed into a substantially vertically-long rectangular shape is provided at a part of a periphery of the shaft fixing portion 42 of the arm head 40 and on the backward side of the arm head 40. The holding hole 42a is formed by cutting out a part of the side wall 41b that is positioned at the backward side (a left side in the drawing) of the head main body 41. A bridging portion 42b that forms the holding hole 42a is provided at the windshield 11 side (a lower side in the drawing) of the holding hole 42a. Each of the vehicle side tubes 44a, 45a is inserted through the holding hole 42a. The holding hole 42a holds each of the vehicle side tubes 44a, 45a in a state where the vehicle side tubes 44a, 45a are arranged side by side in the axial direction of the swinging shaft PS (see FIGS. 7 and 9).

Here, as shown in FIG. 10(a), a width dimension of the holding hole 42a is larger than a diameter dimension of each of the vehicle side tubes 44a, 45a. Thus, a clearance S is formed between the holding hole 42a and each of the vehicle side tubes 44a, 45a under a condition where each of the vehicle side tubes 44a, 45a is brought near a shaft fixing portion 42 side. Therefore, it is possible to easily insert each of the vehicle side tubes 44a, 45a into the holding hole 42a at the time of assembling of the wiper device 10.

However, as shown in FIG. 10(b), it is also possible to provide an opening portion 42d in the bridging portion 42b, and it is possible to dispose each of the vehicle side tubes 44a, 45a in the holding hole 42a via the opening portion 42d. In this case, in order to prevent the vehicle side tubes 44a, 45a from coming off from the holding hole 42a while facilitating arrangement of each of the vehicle side tubes 44a, 45a in the holding hole 42a, a width dimension t of the opening portion 42d is slightly smaller than a diameter dimension d of each of the vehicle side tubes 44a, 45a (t<d). Further, a tapered surface TS for facilitating arrangement of each of the vehicle side tubes 44a, 45a to the holding hole 42a is provided in the opening portion 42d.

By holding each of the vehicle side tubes 44a, 45a by the holding hole 42a in this manner in a state where the vehicle side tubes 44a, 45a are arranged side by side in the axial direction of the swinging shaft PS, it is possible to surely prevent the arrangement of each of the vehicle side tubes 44a, 45a from being displaced. Further, it is also possible to suppress the periphery of the shaft fixing portion 42 of the arm head 40 from becoming wide and increasing in size. Moreover, as shown in FIG. 11, each of the vehicle side tubes 44a, 45a is wound around the periphery of the shaft fixing portion 42 with the same radius of curvature during swinging of the arm head 40. For this reason, it is possible to reduce a load applied onto the swinging shaft PS, that is, a load on an electric motor.

As shown in FIG. 7, a guide wall 42c that protrudes outward in a radial direction of the shaft fixing portion 42 is integrally provided at a side opposite to the windshield 11 side along the axial direction of the shaft fixing portion 42 (an upper side in the drawing). The guide wall 42c extends along a plane perpendicular to the axial direction of the swinging shaft PS, and protrudes to a side of the arm head 40 opposite to an arm shank 50 side (a right side in the drawing). Thus, when each of the vehicle side tubes 44a, 45a is inserted into the holding hole 42a at the time of assembling of the wiper device 10, the guide wall 42c may be used as a guide. This makes it possible to easily assemble the wiper device 10.

As shown in FIG. 11, the guide wall 42c guides each of the vehicle side tubes 44a, 45a so as to be wound orderly around the periphery of the shaft fixing portion 42 when the arm head 40 is caused to swing in one direction. Namely, the guide wall 42c has a function to place each of the vehicle side tubes 44a, 45a along an outer periphery of the shaft fixing portion 42. This makes it possible to surely prevent the arrangement of each of the vehicle side tubes 44a, 45a from being displaced in the middle of winding the vehicle side tubes 44a, 45a around the shaft fixing portion 42.

Each of the vehicle side tubes 44a, 45a is drawn out from the head side pipe housing portion 41a to the outside through the holding hole 42a, and a portion of each of the vehicle side tubes 44a, 45a that is drawn out to the outside is curved toward a side opposite to the shaft fixing portion 42 side as shown in FIGS. 7, 9, 11. Namely, as shown in FIG. 11(a), each of the vehicle side tubes 44a, 45a is not in a condition of being wound around the shaft fixing portion 42 in a condition where the wiper device 10 is stopped. Further, as shown in FIGS. 9 and 11, the shaft fixing portion 42 is formed into a substantially cylindrical shape, and a radius of curvature R1 of a curved portion of each of the vehicle side tubes 44a, 45a is set to be substantially the same value as a radius R2 of the shaft fixing portion 42 (R1≈R2). Accordingly, when each of the vehicle side tubes 44a, 45a is in contact with an outer peripheral surface of the substantially-cylindrical shaft fixing portion 42 and is wound therearound, a central axis of the curved portion of each of the vehicle side tubes 44a, 45a and a central axis of the shaft fixing portion 42 are coaxial. Therefore, when each of the vehicle side tubes 44a, 45a is wound around the shaft fixing portion 42 or is separated from the shaft fixing portion 42, it is possible to prevent it from being largely deformed exceeding the radius of curvature R1 and the radius R2.

Here, a winding operation of each of the vehicle side tubes 44a, 45a by the shaft fixing portion 42 will be described with reference to FIG. 11.

When the wiper motor is caused to rotate by turning on the wiper switch, the swinging shaft PS is caused to swing. Then, the wiper device 10 starts a wiping operation toward the forward side from a stopped state shown in FIG. 11(a). Specifically, the arm head 40 swings toward the forward side centering on the swinging shaft PS. Thus, the wiper device 10 changes from the condition shown in FIG. 11(a) to a condition shown in FIG. 11(b).

At this time, each of the vehicle side tubes 44a, 45a is moved as shown with an arrow M indicated by a broken line in FIG. 11(b), and is gradually wound up by the shaft fixing portion 42 in association with swinging of the shaft fixing portion 42. At that time, each of the vehicle side tubes 44a, 45a is curved toward a side opposite to the shaft fixing portion 42 side, and the radius of curvature R1 of the curved portion is substantially the same value as the radius R2 of the shaft fixing portion 42. For this reason, no excessive load (high tension) is applied to each of the vehicle side tubes 44a, 45a. More specifically, after each of the vehicle side tubes 44a, 45a extends toward a side of the arm head 40 opposite to the arm shank 50 side, each of the vehicle side tubes 44a, 45a is curved toward a side opposite to the shaft fixing portion 42 side. Then, each of the vehicle side tubes 44a, 45a further extends in a direction to approach the shaft fixing portion 42. Namely, a vehicle body side connecting member CJ (see FIG. 1) side of each of the vehicle side tubes 44a, 45a is away from the shaft fixing portion 42, and makes a U-turn to return to the shaft fixing portion 42.

Therefore, it is possible to suppress each of the vehicle side tubes 44a, 45a, which may be deformed in each time during an operation of the wiper device 10, from being early deteriorated. In addition, since a load on the wiper motor can also be reduced, a smooth operation of the wiper device 10 can be achieved.

Contrary to the case described above, in a case where the wiper device 10 performs the wiping operation toward the backward side, each of the vehicle side tubes 44a, 45a, which has been wound around the shaft fixing portion 42, is gradually separated from the shaft fixing portion 42, and each of the vehicle side tubes 44a, 45a becomes a state shown in FIG. 11(a). In this case, no excessive load is applied to each of the vehicle side tubes 44a, 45a, and the load on the wiper motor is reduced as well.

As shown in FIG. 6, a support pin (rotary shaft) 43a that rotatably supports one end portion of the arm shank 50 is provided in the shank fitting portion 43. The support pin 43a is formed of a cylindrical steel material, and extends in a direction intersecting an extending direction of the swinging shaft PS. Thus, the arm shank 50 is rotatably coupled to the arm head 40 without any wobbling, and is capable of being easily locked back.

Further, as shown in FIGS. 7 and 9, a pair of pin fitting walls 43b, 43c are provided in the shank fitting portion 43, and a hook pin 43d to which a hook FK is hooked is provided between the pin fitting walls 43b, 43c. The hook pin 43d is provided so as to extend in the same direction as that of the support pin 43a. The hook pin 43d is formed of a cylindrical steel material as well as the support pin 43a.

Here, the pin fitting wall 43c of the pair of pin fitting walls 43b, 43c is disposed at a substantially central portion along a short direction of the arm head 40. Thus, a spring SP to which the hook FK is hooked is disposed near one side (a lower side in the drawing) along a short direction of the arm shank 50. In this manner, the hook pin 43d supports an end portion of the spring SP via the hook FK.

An arm shank 50 side of each of the washer tubes 44, 45 housed in the head side pipe housing portion 41a, that is, each of the nozzle side tubes 44b, 45b is drawn out together from a position avoiding the pin fitting wall 43c to the outside of the arm head 40. Specifically, in a portion where the support pin 43a exists, each of the nozzle side tubes 44b, 45b housed in the head side pipe housing portion 41a is drawn out from the head side pipe housing portion 41a to the outside in a state where they are arranged in the axial direction of the support pin 43a, that is, in a wiping direction of the wiper blade 20 (see FIG. 1).

As shown in FIGS. 6 and 9, this makes it possible to dispose each of the nozzle side tubes 44b, 45b near the other side (an upper side in the drawing) of the arm shank 50 along the short direction thereof. Further, when the arm shank 50 is locked back relative to the arm head 40, each of the nozzle side tubes 44*b*, 45*b* is deformed at the same radius of curvature. For this reason, it is possible to apply substantially the same load to both of the nozzle side tubes 44*b*, 45*b*. This makes it possible to suppress a defect such as early deterioration of either of the nozzle side tubes 44*b*, 45*b* from occurring.

As shown in FIG. 6, the arm shank 50 is formed into a long bar shape that is substantially straight so that a cross section thereof is formed into a substantially U shape by pressing and the like of a steel plate. One end portion of the arm shank 50 (a right side in the drawing) is rotatably fitted to the shank fitting portion 43 of the arm head 40, and the wiper blade 20 (see FIG. 1) is fitted to the other end portion of the arm shank 50 (a left side in the drawing) via the arm piece 60. Here, in the present embodiment, the wiper blade 20 is directly fitted to the other end portion of the arm shank 50 via the arm piece 60. However, the present invention also includes an embodiment in which the wiper blade 20 is directly fitted to the other end portion of the arm shank 50. Namely, the embodiment in which a wiper blade fixing portion, which is formed into the similar shape to that of the arm piece 60, is integrally provided to the other end portion of the arm shank 50 is also included.

Further, the nozzle unit 70 that is configured to spray each of the washer fluids W1 and W2 (see FIG. 3) toward the windshield 11 is fitted onto a side of the other end portion of the arm shank 50 in the longitudinal direction thereof, that is, on the tip end side of the wiper arm 30.

The arm shank 50 includes a bottom wall 51 and a pair of side walls 52*a*, 52*b*. The pair of side walls 52*a*, 52*b* is erected at substantially a right angle relative to the bottom wall 51. A portion surrounded by the bottom wall 51 and the pair of side walls 52*a*, 52*b* constitutes a shank side pipe housing portion 53. Each of the nozzle side tubes 44*b*, 45*b* is housed in the shank side pipe housing portion 53, and the shank side pipe housing portion 53 is continued to the head side pipe housing portion 41*a* provided in the arm head 40. Namely, the shank side pipe housing portion 53 is provided along the longitudinal direction of the arm shank 50, and is opened toward the windshield 11.

Further, the spring SP is housed in the shank side pipe housing portion 53 so as to be parallel to each of the nozzle side tubes 44*b*, 45*b*. The spring SP is configured to generate elastic force to press the wiper blade 20 toward the windshield 11.

As shown in FIG. 6, a projecting piece 52*c* is provided at a side of the one end portion of the arm shank 50 in the longitudinal direction thereof, that is, at the base end side of the wiper arm 30. The projecting piece 52*c* is integrally provided on the side wall 52*b*, which is placed at the backward side of the arm shank 50, when the arm shank 50 is pressed. This causes the projecting piece 52*c* to protrude from the side wall 52*b* in the wiping direction toward the forward side of the wiper blade 20 (see FIG. 1).

The projecting piece 52*c* faces the hook FK from the short direction of the arm shank 50, and the projecting piece 52*c* is provided at a position corresponding to one end side of the spring SP in the arm shank 50, that is, in the vicinity of the one end side of the spring SP. Together with the pin fitting wall 43*c*, the projecting piece 52*c* holds each of the nozzle side tubes 44*b*, 45*b* by bringing them near the other side of the arm shank (an upper left side in the drawing) in the short direction thereof in a state where the nozzle side tubes 44*b*, 45*b* are gathered.

In this manner, together with the pin fitting wall 43*c*, the projecting piece 52*c* holds each of the nozzle side tubes 44*b*, 45*b* in parallel to the spring SP at one end side of the spring SP. Further, in this port, each of the nozzle side tubes 44*b*, 45*b* is disposed apart from a side portion of the spring SP so as to become a non-contact state with the spring SP. Therefore, each of the nozzle side tubes 44*b*, 45*b* and the spring SP are not rubbed against each other.

As shown in FIG. 6, a supporting piece 52*d* and a first holder 54 fitted to the supporting piece 52*d* are provided at a substantially central portion of the arm shank 50 in the longitudinal direction thereof. The supporting piece 52*d* is integrally provided with the side wall 52*a* when the arm shank 50 is pressed. The supporting piece 52*d* protrudes from the side wall 52*a* in the wiping direction toward the backward side of the wiper blade 20 (see FIG. 1). The other end side of the spring SP is hooked to the supporting piece 52*d*.

In this manner, the one end side of the spring SP is hooked to the hook pin 43*d* of the arm head 40 via the hook FK, and the other end side of the spring SP is hooked to the supporting piece 52*d* of the arm shank 50. Thus, elastic force of the spring SP acts so as to press the wiper blade 20 toward the windshield 11 (see FIG. 1).

The first holder 54, which is fitted to the supporting piece 52*d*, is formed into a predetermined shape by a resin material such as plastic. A projecting piece 54*a* that protrudes toward the side wall 52*b* and a projecting piece 54*b* that protrudes toward the bottom wall 51 are provided in the first holder 54. Each of the nozzle side tubes 44*b*, 45*b* is disposed at a side wall 52*b* side by bringing them near a bottom wall 51 side by means of the projecting pieces 54*a* and 54*b*.

The supporting piece 52*d* and the first holder 54 are provided at a position corresponding to the other end side of the spring SP in the arm shank 50, that is, in the vicinity of the other end side of the spring SP. Namely, the supporting piece 52*d* and the first holder 54 hold each of the nozzle side tubes 44*b*, 45*b* in parallel to the spring SP at the other end side of the spring SP. Further, in this portion, each of the nozzle side tubes 44*b*, 45*b* is disposed apart from the side portion of the spring SP so as to be in a non-contact state with the spring SP. Therefore, each of the nozzle side tubes 44*b*, 45*b* and the spring SP are not rubbed against each other.

Here, a distance between a position where the projecting piece 52*c* and the pin fitting wall 43*c* are disposed and a position where the supporting piece 52*d* and the first holder 54 are disposed is substantially the same as a length dimension of the spring SP. Further, the length dimension of the spring SP is substantially one third of a length dimension of the arm shank 50. This makes it possible to dispose each of the nozzle side tubes 44*b*, 45*b* in parallel to the spring SP in a non-contact state apart from the spring SP, and to prevent each of the nozzle side tubes 44*b*, 45*b* from becoming slack and protruding from the shank side pipe housing portion 53 to the outside.

A supporting piece 52*e* (not shown in the drawings in detail) and a second holder 55 fitted to the supporting piece 52*e* are provided between the first holder 54 and the nozzle unit 70 along the longitudinal direction of the arm shank 50. The supporting piece 52*e* and the second holder 55 are arranged in a substantially middle portion between the first holder 54 and the nozzle unit 70 along the longitudinal direction of the arm shank 50.

In the similar manner to that of the supporting piece 52*d*, the supporting piece 52*e* is integrally provided with the side wall 52*a* when the arm shank 50 is pressed, and the supporting piece 52e protrudes from the side wall 52a in the wiping direction toward the backward side of the wiper blade 20 (see FIG. 1). On the other hand, the second holder 55, which is fitted to the supporting piece 52e, is formed into a substantially rectangular parallelepiped shape by a resin material such as plastic. The second holder 55 includes a support surface 55a that is caused to face toward the bottom wall 51. Each of the nozzle side tubes 44b, 45b is pressed toward the bottom wall 51 by means of the support surface 55a of the second holder 55.

Thus, a length dimension between the second holder 55 and the first holder 54 and a length dimension between the second holder 55 and the nozzle unit 70 are substantially the same dimension as the length dimension of the spring SP. In the same manner as that between the projecting piece 52c and the first holder 54, it is possible to prevent each of the nozzle side tubes 44b, 45b from becoming slack and protruding from the shank side pipe housing portion 53 to the outside.

As shown in FIG. 6, the arm piece 60 fixed to a tip end side of the arm shank 50 is formed into a predetermined shape by pressing and the like of a steel material. A tip end side of the arm piece 60 is formed into a substantially U shape. A tip end portion of the arm piece 60 is to be coupled to the hook fixing member 23e (see FIG. 5) by one touch operation. Further, a base end side of the arm piece 60 is fixed to the inside of a tip end portion of the arm shank 50 by means of a pair of rivets R (see FIG. 2). By riveting the arm shank 50 made of a steel plate and the arm piece 60 made of a steel material together in this manner, the arm shank 50 and the arm piece 60 are firmly fixed without any wobbling.

The nozzle unit 70 is fixed to the arm piece 60 by means of a fixing screw SC (see FIG. 6). Here, the fixing screw SC is configured to be screwed from a lower side of the drawing to a screw hole HL shown in FIG. 2, that is, from a wiper blade 20 side. A part of the arm piece 60 including the screw hole HL and the nozzle unit 70 is covered with the tip end side of the arm shank 50. This makes it possible to clarify and improve appearance of a periphery of the nozzle unit 70 of the wiper device 10.

By fixing the nozzle unit 70 to the arm piece 60, which is to be fitted to the hook fixing member 23e, in this manner, the nozzle unit 70 is disposed so as to approach the hook fixing member 23e. Further, the nozzle unit 70 is firmly fixed to the arm piece 60 near the hook fixing member 23e by means of the fixing screw SC. For that reason, a positional displacement of the nozzle unit 70 relative to the wiper blade 20 can be suppressed to the minimum.

As shown in FIGS. 2 and 3, the nozzle unit 70 is formed of a resin material such as plastic by injection molding so that a cross-sectional shape thereof in a direction intersecting the longitudinal direction of the arm shank 50 (short direction) becomes substantially a U shape. The nozzle unit 70 includes a forward side block 71 and a backward side block 72.

A forward side first wall portion 71a, which is caused to face the base end side of the wiper blade 20 in the longitudinal direction thereof, is provided at the base end side of the forward side block 71. The other end side of the nozzle side tube 44b is connected to the forward side first wall portion 71a side of the forward side block 71. On the other hand, a forward side arm portion 71b having a shape gradually tapered toward the tip end side thereof is integrally provided at a tip end side of the forward side block 71. A forward side second wall portion 71c, which is caused to face the tip end side of the wiper blade 20 in the longitudinal direction thereof, is provided in the forward side arm portion 71b.

Further, a forward side facing surface 71d that faces the windshield 11 is formed between the forward side first wall portion 71a and the forward side second wall portion 71c of the forward side block 71. A forward side nozzle cap 71e is provided at a portion near the forward side second wall portion 71c of the forward side facing surface 71d.

A forward side first spraying nozzle A1 is provided on the forward side second wall portion 71c. The forward side first spraying nozzle A1 is caused to face toward a tip end side of the wiper blade 20 in the longitudinal direction thereof. This makes it possible to wet the forward side of the windshield 11 (see FIG. 1) at the tip end side of the wiper blade 20 in the longitudinal direction thereof during the wiping operation of the wiper blade 20 toward the forward side thereof.

Here, the forward side first spraying nozzle A1 adopts an eyeball type nozzle capable of varying a sprayed position of the forward side washer fluid W1. Specifically, by stabbing a wire or the like in the nozzle and rotating the nozzle, it is possible to adjust the sprayed position of the forward side first spraying nozzle A1. This makes it possible to optimize the sprayed position of the forward side first spraying nozzle A1 so as to correspond to specifications, such as a difference in length, of the wiper blade 20 fitted to the wiper arm 30.

A forward side second spraying nozzle B1 and a forward side third spraying nozzle C1 are provided on the forward side nozzle cap 71e. Each of the forward side second spraying nozzle B1 and the forward side third spraying nozzle C1 is a nozzle having a fixed sprayed position for the forward side washer fluid W1. The forward side washer fluid W1 that has been sprayed from the forward side second spraying nozzle B1 and the forward side third spraying nozzle C1 wets the vicinity of a central portion of the blade rubber 21 in a longitudinal direction thereof and on the forward side thereof.

A forward side fourth spraying nozzle D1 is provided on the forward side first wall portion 71a. The forward side fourth spraying nozzle D1 is caused to face the base end side of the wiper blade 20 in the longitudinal direction thereof. This makes it possible to wet the forward side of the windshield 11 (see FIG. 1) at the base end side of the wiper blade 20 in the longitudinal direction thereof during the wiping operation of the wiper blade 20 toward the forward side thereof.

Here, in the similar manner to that in the forward side first spraying nozzle A1, the forward side fourth spraying nozzle D1 also adopts an eyeball type nozzle capable of varying a sprayed position of the forward side washer fluid W1. Therefore, it is possible to optimize the sprayed position of the forward side fourth spraying nozzle D1 in accordance with specifications of the wiper blade 20.

A backward side first wall portion 72a that is caused to face the base end side of the wiper blade 20 in the longitudinal direction thereof is provided at the base end side of the backward side block 72. The other end side of the nozzle side tube 45b is connected to a backward side first wall portion 72a side of the backward side block 72. On the other hand, a backward side arm portion 72b having a shape gradually tapered toward a tip end side thereof is integrally provided at the tip end side of the backward side block 72. A backward side second wall portion 72c, which is caused to face the tip end side of the wiper blade 20 in the longitudinal direction thereof, is provided on the backward side arm portion 72b. Here, a length dimension of the backward side arm portion 72b is shorter than a length dimension of the forward side arm portion 71b.

Further, a backward side facing surface 72d that faces the windshield 11 is formed between the backward side first wall portion 72a and the backward side second wall portion 72c of the backward side block 72. A backward side nozzle cap 72e is provided at a portion near the backward side first wall portion 72a of the backward side facing surface 72d.

A backward side first spraying nozzle E1 is provided on the backward side second wall portion 72c. The backward side first spraying nozzle E1 is caused to face toward a tip end side in the longitudinal direction of the wiper blade 20. This makes it possible to wet the backward side of the windshield 11 (see FIG. 1) at the tip end side of the wiper blade 20 in the longitudinal direction thereof during the wiping operation of the wiper blade 20 toward the backward side thereof.

Here, the backward side first spraying nozzle E1 adopts an eyeball type nozzle capable of varying a sprayed position of the backward side washer fluid W2. Specifically, it is possible to adjust the sprayed position thereof in the similar manner to that of the forward side first spraying nozzle A1 as described above. This makes it possible to optimize the sprayed position of the backward side first spraying nozzle E1 so as to correspond to specifications, such as a difference in length, of the wiper blade 20 fitted to the wiper arm 30.

A backward side second spraying nozzle F1 is provided on the backward side nozzle cap 72e. The backward side second spraying nozzle F1 is a nozzle having a fixed sprayed position of the backward side washer fluid W2. The backward side washer fluid W2 that has been sprayed from the backward side second spraying nozzle F1 wets the vicinity of a central portion of the blade rubber 21 in the longitudinal direction thereof and on the backward side thereof.

A backward side third spraying nozzle G1 is provided on the backward side first wall portion 72a. The backward side third spraying nozzle G1 is caused to face toward the base end side in the longitudinal direction of the wiper blade 20. This makes it possible to wet the backward side of the windshield 11 (see FIG. 1) at the base end side of the wiper blade 20 in the longitudinal direction thereof during the wiping operation of the wiper blade 20 toward the backward side thereof.

Here, in the similar manner to that in the backward side first spraying nozzle E1, the backward side third spraying nozzle G1 also adopts an eyeball type nozzle capable of varying a sprayed position of the backward side washer fluid W2. Therefore, it is possible to optimize the sprayed position of the backward side third spraying nozzle G1 in accordance with specifications of the wiper blade 20.

In this regard, in the present embodiment, the sprayed position of the forward side washer fluid W1 from each of the forward side spraying nozzles A1 to D1 onto the windshield 11 and the sprayed position of the backward side washer fluid W2 from each of the backward side spraying nozzles E1 to G1 onto the windshield 11 are adjusted in accordance with the following criteria.

Here, in a case where the sprayed position of each of the washer fluids W1 and W2 is near the blade rubber 21, each of the washer fluids W1 and W2 that has been sprayed does not block a field of view of a driver, but each of the washer fluids W1 and W2 that has been sprayed is wiped off immediately after being sprayed. For that reason, the dust and the like attached onto the windshield 11 are not melted and may be left unwiped (deterioration of washing performance).

On the contrary, in a case where the sprayed position of each of the washer fluids W1 and W2 is far from the blade rubber 21, it is possible to allow the dust and the like attached onto the windshield 11 to be surely melted and cleanly wiped off without leaving any unwiped dust. However, each of the washer fluids W1 and W2 that has been sprayed may block the field of view of the driver (blocking of the field of view).

For that reason, in a case where a peripheral velocity of the blade rubber 21 is referred to as [v], a melting time of an adhesive substance is referred to as [t], and a distance from the blade rubber 21 to the sprayed position of each of the washer fluids W1 and W2, that is, a spraying distance is referred to as [L], the spraying distance [L] is adjusted so as to satisfy a formula [L=v×t]. This makes it possible to achieve contrary phenomena of improvement of the washing performance against the adhesive substance and suppression of blocking of the field of view with a good balance. In this regard, in the present embodiment, the spraying distance [L] is set to a spraying distance of about 15 mm.

However, with respect to the peripheral velocity [v] of the blade rubber 21, a peripheral velocity [v1] at the tip end side (outer peripheral side) of the blade rubber 21 is different from a peripheral velocity [v2] at the base end side (inner peripheral side) of the blade rubber 21 (v1>v2). For this reason, an average value of the peripheral velocity [v1] and the peripheral velocity [v2] is used. Further, the peripheral velocity [v] is usually set to a moving speed of the blade rubber 21 during a [Low] operation of the wiper switch, which is frequently used.

Next, a flow of the forward side washer fluid W1 and the backward side washer fluid W2 will be described with reference to the drawings.

By operating a washer switch (not shown in the drawings), the washer pump (not shown in the drawings) is driven. As shown with arrows each indicated by a broken line in FIG. 1, the washer fluids W1 and W2 are supplied to the forward side washer tube 44 and the backward side washer tube 45, respectively. Then, as shown in FIG. 3, the washer fluids W1 and W2 enter into the forward side block 71 and the backward side block 72, respectively. Thus, as shown with arrows each indicated by a broken line in FIG. 3, the washer fluids W1 and W2 are sprayed from each of the forward side spraying nozzles A1 to D1 and each of the backward side spraying nozzles E1 to G1, respectively.

Here, a driving direction of the washer pump is switched in accordance with switching of a moving direction of the blade rubber 21. More specifically, the forward side washer fluid W1 is supplied only to the forward side block 71 during the wiping operation of the wiper blade 20 toward the forward side thereof. On the other hand, the backward side washer fluid W2 is supplied only to the backward side block 72 during the wiping operation of the wiper blade 20 toward the backward side thereof.

As described above in detail, according to the wiper device 10 of the present embodiment, the base end sides of the forward side washer tube 44 and the backward side washer tube 45 are arranged in the axial direction of the swinging shaft PS at one end portion of the arm head 40. The base end sides of the forward side washer tube 44 and the backward side washer tube 45 are drawn out from the head side pipe housing portion 41a so as to curve toward a side opposite to the shaft fixing portion 42 side. This causes the base end side of each of the washer tubes 44, 45 to be wound around a periphery of the shaft fixing portion 42 during swinging of the arm head 40 without applying any load to the swinging shaft PS. At this time, no tension acts on each of the washer tubes 44, 45, and each of the washer tubes 44, 45 and the shaft fixing portion 42 are not rubbed against each other. For this reason, deterioration of each of the washer tubes 44, 45 is suppressed.

Further, the base end sides of the washer tubes 44, 45 are arranged in the axial direction of the swinging shaft PS. For this reason, when the washer tubes 44, 45 are wound around the periphery of the shaft fixing portion 42, it is possible to suppress the periphery of the shaft fixing portion 42 from swelling outward in a radial direction thereof. Therefore, it is possible to prevent a fixing portion of the arm head 40 to the swinging shaft PS from increasing in size.

Moreover, according to the wiper device 10 of the present embodiment, the holding hole 42a configured to hold the washer tubes 44, 45 so as to be arranged side by side in the axial direction of the swinging shaft PS is provided at the one end portion of the arm head 40. For this reason, it is possible to surely prevent the arrangement of each of the vehicle side tubes 44a, 45a from being displaced during swinging and the like of the swinging shaft PS.

Further, according to the wiper device 10 of the present embodiment, the guide wall 42c configured to place each of the washer tubes 44, 45 along the outer periphery of the shaft fixing portion 42 during swinging of the shaft fixing portion 42 in one direction is provided at the one end portion of the arm head 40. Therefore, it is possible to surely prevent the arrangement of each of the washer tubes 44, 45 from being displaced in the middle of winding each of the washer tubes 44, 45 around the shaft fixing portion 42.

Further, according to the wiper device 10 of the present embodiment, the washer tubes 44, 45 include the vehicle side tubes 44a, 45a and the nozzle side tubes 44b, 45b, respectively, and the wiper side connecting member 46 that respectively connects the vehicle side tubes 44a, 45a and the nozzle side tubes 44b, 45b is provided in the head side pipe housing portion 41a.

This makes it possible to prevent each of the washer tubes 44, 45 from becoming slack in the portion of the arm head 40. Further, it is also possible to easily assemble each of the washer tubes 44, 45 to the arm head 40 and the arm shank 50. Moreover, for example, even in a case where tension acts on each of the nozzle side tubes 44b, 45b, it is possible to avoid the tension from acting on each of the vehicle side tubes 44a, 45a.

Moreover, according to the wiper device 10 of the present embodiment, the shank side pipe housing portion 53 configured to house each of the washer tubes 44, 45 is provided in the arm shank 50 so as to extend along the longitudinal direction of the arm shank 50 and be opened toward the windshield 11 side. This makes it possible to avoid each of the washer tubes 44, 45 from being exposed to the outside of the wiper arm 30, and to improve appearance of the wiper device 10.

Further, according to the wiper device 10 of the present embodiment, the one end portion of the arm shank 50 is rotatably provided via the support pin 43a extending in a direction intersecting the swinging shaft PS with respect to the other end portion of the arm head 40, and the washer tubes 44, 45 are arranged in the wiping direction of the wiper blade 20 in the portion of the support pin 43a. This makes it possible to apply substantially the same load to both of the washer tubes 44, 45 when the arm shank 50 is locked back relative to the arm head 40. Therefore, it is possible to suppress a defect such as early deterioration of either of the washer tubes 44, 45 from occurring.

Next, a second embodiment of the present invention will be described in detail with reference to the drawings. In this regard, portions each having the similar function to that of the first embodiment described above is denoted by the same reference numeral, and detailed description thereof is omitted.

FIG. 12 is a perspective view illustrating a wiper side connecting member according to the second embodiment.

As shown in FIG. 12, in the second embodiment, only a structure of a wiper side connecting member (connecting member) 80 is different from that of the first embodiment. Specifically, a first elastic claw 81 and a second elastic claw 82 are integrally provided in the wiper side connecting member 80 so as to face to each other interposing a pair of flow channels (not shown in the drawings) provided inside of the wiper side connecting member 80. The first elastic claw 81 and the second elastic claw 82 are configured to be elastically deformable in a direction to approach each other by applying force in this direction. The first elastic claw 81 is caused to engage with the engaging recessed portion 41c provided in the side wall 41b of the head main body 41, and the second elastic claw 82 is caused to engage with the engaging recessed portion 41e provided in the side wall 41d of the head main body 41.

According to the second embodiment formed as described above, it is also possible to achieve the similar functions and effects to those in the first embodiment described above. In addition, in the second embodiment, the first elastic claw 81 and the second elastic claw 82 are configured to be elastically deformable in the direction to approach each other. For this reason, as shown with arrows M1 each indicated by a broken line in FIG. 12, it is possible to simultaneously cause the first elastic claw 81 and the second elastic claw 82 to engage with the engaging recessed portion 41c and the engaging recessed portion 41e, respectively. Therefore, it is possible to fit the wiper side connecting member 80 to the head side pipe housing portion 41a while maintaining a parallel state. This makes it possible to improve assemble workability of the wiper device 10.

Next, a third embodiment of the present invention will be described in detail with reference to the drawings. In this regard, portions each having the similar function to that of the first embodiment described above is denoted by the same reference numeral, and detailed description thereof is omitted.

FIG. 13 is a perspective view illustrating a wiper side connecting member according to the third embodiment.

As shown in FIG. 13, in the third embodiment, only a structure for fixing a wiper side connecting member (connecting member) 90 to the arm head 40 is different from the first embodiment. Specifically, a cylindrical projection 91 projecting toward an opening side (an upper side in the drawing) of the head side pipe housing portion 41a is provided in the head side pipe housing portion 41a of the arm head 40. Further, a pair of cutout portions 92 (only one is illustrated in the drawing), which extends in the longitudinal direction of the arm head 40, is provided on the tip end side of the cylindrical projection 91 thereof.

On the other hand, a guide recessed portion 93 into which the cylindrical projection 91 is inserted by sliding is formed between a pair of flow channels (not shown in the drawings) provided inside the wiper side connecting member 90. The guide recessed portion 93 extends in a direction in which the pair of flow channels extends, and a cross-sectional shape thereof is substantially the same as a shape of the cylindrical projection 91 when viewed from the longitudinal direction of the arm head 40. Namely, a pair of guide rail portions 94 that is respectively to be inserted into the cutout portions 92 provided in the cylindrical projection 91 is provided inside the guide recessed portion 93. Thus, as shown with an arrow M2 indicated by a broken line in the drawing, by putting the cylindrical projection 91 into the guide recessed portion 93, the wiper side connecting member 90 is fixed to the arm head 40 without any wobbling.

According to the third embodiment formed as described above, it is also possible to achieve the similar functions and effects to those in the first embodiment described above. In addition, in the third embodiment, since it is possible to simplify a shape of an arm head 40 side in particular, it is possible to reduce a manufacturing cost of the arm head 40.

Next, a fourth embodiment of the present invention will be described in detail with reference to the drawings. In this regard, portions each having the similar function to that of the first embodiment described above is denoted by the same reference numeral, and detailed description thereof is omitted.

FIG. 14 is a perspective view illustrating a wiper side connecting member according to the fourth embodiment.

As shown in FIG. 14, in the fourth embodiment, only a structure for fixing a wiper side connecting member (connecting member) 100 to the arm head 40 is different from the first embodiment. Specifically, a positioning projection 101 that projects toward an opening side (an upper side in the drawing) of the head side pipe housing portion 41a is provided in the head side pipe housing portion 41a of the arm head 40. Further, four through holes 102 (only three are illustrated in the drawing), which penetrate the head main body 41 are provided in a periphery of the positioning projection 101. The through holes 102 are provided at equal intervals (90 degrees intervals) along a peripheral direction of the positioning projection 101.

A pair of engaging claws 103 (only one is illustrated in the drawing) is provided at a head side pipe housing portion 41a side of the wiper side connecting member 100. The engaging claws 103 are arranged so as to face each other from the short direction of the arm head 40 centering on the positioning projection 101. The engaging claws 103 respectively penetrate through the through holes 102 so as to be exposed to the outside of a side of the head main body 41 opposite to the head side pipe housing portion 41a side.

Further, a pair of engaging recessed portions 104 (only one is illustrated in the drawing) is provided in the wiper side connecting member 100. The engaging recessed portions 104 are arranged so as to face each other in the longitudinal direction of the arm head 40 centering on the positioning projection 101. Engaging claws 106 of a stopper member 105 are configured to engage with the engaging recessed portions 104, respectively.

The stopper member 105 formed into a substantially disk shape is fitted to the head main body 41 from the outside on a side of the head main body 41 opposite to the head side pipe housing portion 41a side. The pair of engaging claws 106 is provided at an arm head 40 side of the stopper member 105. The engaging claws 106 are arranged so as to face each other in the longitudinal direction of the arm head 40 by centering on the positioning projection 101. Each of the engaging claws 106 penetrates through the through holes 102 and is exposed to a side of the head side pipe housing portion 41a of the head main body 41.

Further, a pair of engaging recessed portions 107 is provided on the stopper member 105. The engaging recessed portions 107 are arranged so as to face each other from the short direction of the arm head 40 centering on the positioning projection 101. The engaging claws 103 of the wiper side connecting member 100 is configured to engage with the engaging recessed portions 107, respectively.

As shown with an arrow M3 indicated by a broken line in the drawing, the engaging claws 103 of the wiper side connecting member 100 are respectively inserted through the through holes 102 while positioning the wiper side connecting member 100 to the positioning projection 101. Subsequently, as shown with an arrow M4 indicated by a broken line, the engaging claws 106 of the stopper member 105 are inserted through the through holes 102, respectively. Then, by pressing the wiper side connecting member 100 and the stopper member 105 so as to approach them each other, the engaging claws 106 are respectively caused to engage with the engaging recessed portions 104, and the engaging claws 103 are respectively caused to engage with the engaging recessed portions 107. Thus, the wiper side connecting member 100 is fixed to the head side pipe housing portion 41a.

In the third embodiment formed as described above, it is possible to achieve the similar functions and effects to those in the first embodiment described above.

The present invention is not limited to each of the embodiments described above, and it goes without saying that the present invention may be modified into various forms without departing from the substance thereof. For example, in each of the embodiments described above, the case where the nozzle unit 70 is provided on the arm shank 50 has been described. However, the present invention is not limited to this. For example, a nozzle unit may be provided along a longitudinal direction of a wiper blade.

Further, in each of the embodiments described above, the wiper device 10 that wipes the windshield 11 on the front side of the vehicle has been described. However, the present invention is not limited to this, and it is also possible to apply the present invention to a wiper device that wipes a windshield on a rear side of the vehicle. Moreover, the present invention is not limited to a vehicle such as an automobile, and it is also possible to apply the present invention to a wiper device of a railway vehicle, an aircraft, a ship, and the like.

Hereinafter, a fifth embodiment of the present invention will be described in detail with reference to the drawings.

FIG. 15 is a perspective view illustrating a wiper device according to the fifth embodiment. FIG. 16 is an enlarged perspective view illustrating a periphery of a nozzle unit when viewed from a front side thereof. FIG. 17 is an enlarged perspective view illustrating the periphery of the nozzle unit when viewed from a back side thereof. FIG. 18 is a cross-sectional view taken along the line A-A of FIG. 15. FIG. 19 is a cross-sectional view taken along the line B-B of FIG. 16. FIG. 20 is a perspective view illustrating a wiper arm when viewed from a back side thereof.

As shown in FIG. 15, a wiper device 210 includes a wiper blade 220 and a wiper arm 230. The wiper blade 220 is rotatably fitted to the wiper arm 230 on a tip end side thereof, and is in sliding contact with a windshield (surface to be wiped) 211 on a front side of a vehicle such as an automobile. A base end side of the wiper arm 230 is fitted to a swinging shaft PS on the front side of the vehicle. By turning on a wiper switch (not shown in the drawings) in a vehicle interior to rotate a wiper motor (not shown in the drawings), the swinging shaft PS is caused to swing. Thus, the wiper device 210 performs a reciprocating wiping operation toward a forward side and a backward side within a predetermined wiping range AR formed on the windshield 211 as indicated with arrows in the drawing.

As shown in FIGS. 15 to 19, the wiper blade 220 includes a blade rubber 221, a holder member 222, and a coupling portion 223. The blade rubber 221 is in contact with the windshield 211. The holder member 222 holds the blade rubber 221. The coupling portion 223 is provided at a middle portion of the holder member 222 in a longitudinal direction thereof. In this regard, a pair of end caps CP is fitted to both end portions of the holder member 222 in the longitudinal direction thereof. This prevents the blade rubber 221, which is held by the holder member 222, from coming off.

As shown in FIGS. 18 and 19, the blade rubber 221 includes a main body portion 221a, a lip portion 221b, and a neck portion 221c. The main body portion 221a is held by the holder member 222. The lip portion 221b is caused to be in contact with the windshield 211. The neck portion 221c couples the main body portion 221a to the lip portion 221b. In this regard, the blade rubber 221 is formed into a long shape by extrusion molding of an elastic material such as rubber, and a cross-sectional shape thereof is a uniform shape across an entire region in the longitudinal direction thereof.

A thickness dimension of the neck portion 221c in an operation direction of the blade rubber 221 (a horizontal direction in the drawing) is set to a thickness dimension smaller than any of thickness dimensions of the main body portion 221a and the lip portion 221b, whereby the neck portion 221c is elastically deformed easily. Thus, when the wiper blade 220 moves toward the forward side and the backward side on the windshield 211, the lip portion 221b is allowed to incline so that a tip end portion of the lip portion 221b can smoothly follow the wiper blade 220 in a moving direction thereof. Therefore, it is possible to surely wipe off an adhesive substance such as dust and rainwater (not shown in the drawings) attached onto the windshield 211.

As shown in FIG. 18, the holder member 222 includes a holder main body 222a and a fin portion 222b. The holder main body 222a and the fin portion 222b are integrally formed by two-color molding of different materials having different hardness from each other, and are formed into a long shape in the same manner as the blade rubber 221.

The holder main body 222a is formed of a resin material such as plastic having flexibility so as to be capable of following a curved shape (not shown in the drawings) of the windshield 211 while securing sufficient strength to hold the main body portion 221a of the blade rubber 221. On the other hand, the fin portion 222b is formed of an elastic material such as rubber having hardness lower than hardness of the holder main body 222a. When a traveling wind hits the fin portion 222b, downforce is generated by the wiper blade 220, whereby wiping performance of the blade rubber 221 is well maintained.

A pair of vertebrae 222c is provided inside the holder main body 222a at a predetermined interval. Each of the vertebrae 222c is formed of a steel plate having a spring property, and is arranged in a mirror-image symmetrical manner so as to sandwich the main body portion 221a of the blade rubber 221 from both of the forward side and the backward side. Each of the vertebrae 222c is curved with a curvature larger than a curvature of the windshield 211 in a natural state where no external force is applied thereto, and causes the holder member 222 and the blade rubber 221 to be elastically deformed in accordance with the curvature of the windshield 211. This causes the entire region of the lip portion 221b in the longitudinal direction to be stuck onto the windshield 211.

As shown in FIGS. 15 and 19, the coupling portion 223 is provided at a middle portion of the holder member 222 in the longitudinal direction thereof. The coupling portion 223 includes a coupling main body 223a, a base plate 223b, and a cover member 223c. The coupling main body 223a is formed so that a cross section thereof has a substantially U shape by pressing or the like of a steel plate, and is crimped and fixed to each of the vertebrae 222c by means of a fixed leg portion (not shown in the drawings) that is integrally provided thereto.

A columnar pin 223d made of a steel material is crimped and fixed to the coupling main body 223a, and a hook fixing member 223e formed of a resin material such as plastic is rotatably fitted to the columnar pin 223d. Here, an arm piece 260 (see FIG. 16), which is fixed to the tip end side of the wiper arm 230, is coupled to the hook fixing member 223e by one touch operation. In this regard, the columnar pin 223d and the hook fixing member 223e also constitute the coupling portion 223.

The base plate 223b is formed into a plate shape by a resin material such as plastic. The base plate 223b is fitted to each of the vertebrae 222c by means of a fixed leg portion 223f that is integrally provided thereto. Here, the coupling main body 223a is disposed on a fin portion 222b side (front side) of the holder member 222, and the base plate 223b is disposed on a holder main body 222a side (back side) of the holder member 222.

The cover member 223c is formed into a substantially box shape by a resin material such as plastic. The cover member 223c is fitted to the outside of the coupling main body 223a by means of a plurality of engaging claws (not shown in the drawings) that is integrally provided thereto. The cover member 223c covers and hides a side portion and the like of the coupling main body 223a, and this makes it possible to improve appearance of the wiper blade 220.

As shown in FIGS. 15 and 20, the wiper arm 230 includes an arm head 240, an arm shank 250, and the arm piece 260.

The arm head 240 is formed into a bar shape curved into a substantially J shape by cast-molding and the like of an aluminum material. A shaft fixing portion 241 fitted to the swinging shaft PS is provided at one end portion of the arm head 240 (a right side in the drawing). On the other hand, a shank fitting portion 242 to which one end portion of the arm shank 250 is rotatably fitted is provided at the other end portion of the arm head 240 (a left side in the drawing).

As shown in FIG. 20, a support pin 242a that rotatably supports the one end portion of the arm shank 250 is provided in the shank fitting portion 242. The support pin 242a is formed of a cylindrical steel material, and extends in a direction intersecting an extending direction of the swinging shaft PS. Thus, the arm shank 250 is rotatably fitted to the arm head 240 without any wobbling, and is capable of being easily locked back.

Further, a pair of pin fitting walls 242b, 242c is provided in the shank fitting portion 242, and a hook pin 242d to which the hook FK is hooked is provided between the pin fitting walls 242b, 242c. The hook pin 242d constitutes a pin of the present invention. The hook pin 242d extends in the same direction as that of the support pin 242a, and is formed of a cylindrical steel material in the same manner as that of the support pin 242a.

Here, the pin fitting wall 242c of the pair of pin fitting walls 242b, 242c is disposed at a substantially central portion along a short direction of the arm head 240. Thus, a spring SP to which the hook FK is hooked is disposed near one side (a lower side in the drawing) along a short direction of the arm shank 250. In this manner, the hook pin 242d supports an end portion of the spring SP via the hook FK.

A head side pipe housing portion 243 opened toward a windshield 211 side is provided at the windshield 211 side (near side in the drawing) of the arm head 240. The head side pipe housing portion 243 is provided across an entire region in a longitudinal direction of the arm head 240 so as to match a shape of the arm head 240. Namely, a cross-sectional shape of the arm head 240 in the short direction thereof is formed into a substantially U shape.

A forward side washer tube (pipe) 244 and a backward side washer tube (pipe) 245 are housed in the head side pipe housing portion 243. Here, in order to readily understand an arrangement structure of each of the washer tubes 244, 245, each of the washer tubes 244, 245 is indicated with half-tone dot meshing in the drawing.

As shown with arrows each indicated by a broken line in FIG. 15, a forward side washer fluid (cleaning fluid) W1 and a backward side washer fluid (cleaning fluid) W2 are respectively supplied from a washer pump (not shown in the drawings) to the washer tubes 244, 245. Here, the washer tubes 244, 245 respectively feed the washer fluids W1 and W2 to a nozzle unit 270 (will be described later). As shown in FIG. 20, the forward side washer tube 244 is constituted of a vehicle side tube 244a and a nozzle side tube 244b. Further, the backward side washer tube 245 is constituted of a vehicle side tube 245a and a nozzle side tube 245b.

The vehicle side tube 244a and the vehicle side tube 245a are respectively coupled to the nozzle side tube 244b and the nozzle side tube 245b with a joint member 246 that is fixed to the inside of the head side pipe housing portion 243. By fixing the joint member 246 to the inside of the head side pipe housing portion 243 in this manner, it is possible to prevent each of the washer tubes 244, 245 from slacking in a portion of the arm head 240. Further, by respectively dividing the washer tubes 244, 245 into the vehicle side tubes 244a, 245a and the nozzle side tubes 244b, 245b with the joint member 246 as a boundary, it is possible to easily assemble the vehicle side tubes 244a, 245a and the nozzle side tubes 244b, 245b to the arm head 240 and the arm shank 250, respectively.

As shown in FIG. 20, a swinging shaft PS side of each of the washer tubes 244, 245 that are housed in the head side pipe housing portion 243 is drawn out together from a position avoiding the shaft fixing portion 241 to the outside of the arm head 240. Specifically, the swinging shaft PS side of each of the washer tubes 244, 245 is drawn out to the outside of the arm head 240 under a condition that the washer tubes 244, 245 are arranged in an extending direction (axial direction) of the swinging shaft PS.

Thus, it is possible to suppress a periphery of the shaft fixing portion 241 of the arm head 240 from becoming wide and increasing in size. Further, during swinging of the arm head 240, each of the washer tubes 244, 245 is elastically deformed along the periphery of the shaft fixing portion 241 with the same radius of curvature. For this reason, it is possible to reduce a load applied onto the swinging shaft PS on a driving side (wiper motor).

On the other hand, each of the washer tubes 244, 245 on an arm shank 250 side thereof that is housed in the head side pipe housing portion 243 is drawn out together from a position avoiding the pin fitting wall 242c to the outside of the arm head 240. Specifically, the arm shank 250 side of each of the washer tubes 244, 245 that are housed in the head side pipe housing portion 243 is drawn out to the outside of the arm head 240 under a state where they are arranged in an extending direction (axial direction) of the hook pin 242d.

As shown in FIG. 20, this makes it possible to dispose each of the washer tubes 244, 245 near the other side (an upper side in the drawing) of the arm shank 250 in the short direction thereof. Further, when the arm shank 250 is locked back relative to the arm head 240, each of the washer tubes 244, 245 is elastically deformed at the same radius of curvature. For this reason, it is possible to apply substantially the same load to both of the washer tubes 244, 245. This makes it possible to suppress a defect such as early deterioration of either of the washer tubes 244, 245 from occurring.

As shown in FIG. 20, the arm shank 250 is formed into a long bar shape that is substantially straight so that a cross section thereof is formed into a substantially U shape by pressing and the like of a steel plate. One end portion of the arm shank 250 (a right side in the drawing) is rotatably fitted to the shank fitting portion 242 of the arm head 240, and the wiper blade 220 (see FIG. 15) is fitted to the other end portion of the arm shank 250 (a left side in the drawing) via the arm piece 260. Here, in the present embodiment, the wiper blade 220 is directly fitted to the other end portion of the arm shank 250 via the arm piece 260. However, the present invention also includes an embodiment in which the wiper blade 220 is directly fitted to the other end portion of the arm shank 250. Namely, the embodiment in which a wiper blade fixing portion, which is formed into the similar shape to that of the arm piece 260, is integrally provided to the other end portion of the arm shank 250 is also included.

Further, the nozzle unit 270 that is configured to spray each of the washer fluids W1 and W2 (see FIG. 17) toward the windshield 211 is fitted onto a side of the other end portion of the arm shank 250 in the longitudinal direction thereof, that is, onto the tip end side of the wiper arm 230a.

The arm shank 250 includes a bottom wall 251 and a pair of side walls 252a, 252b. The pair of side walls 252a, 252b is erected at substantially a right angle relative to the bottom wall 251. A portion surrounded by the bottom wall 251 and the pair of side walls 252a, 252b constitutes a shank side pipe housing portion 253. Each of the washer tubes 244, 245 is housed in the shank side pipe housing portion 253, and the shank side pipe housing portion 253 is continued to the head side pipe housing portion 243 provided in the arm head 240. Namely, the shank side pipe housing portion 253 is provided along the longitudinal direction of the arm shank 250, and is opened toward the windshield 211.

Further, the spring SP is housed in the shank housing portion 253 so as to be parallel to each of the washer tubes 244, 245. The spring SP is configured to generate elastic force to press the wiper blade 220 toward the windshield 211.

FIG. 21 is an enlarged view of a circle C indicated by a broken line in FIG. 20. FIGS. 22(a) and 22(b) are cross-sectional views taken along the line D-D of FIG. 21.

As shown in FIGS. 21, 22(a) and 22(b), a projecting piece 252c as a first pipe holding portion is provided at a side of the one end portion of the arm shank 250 in the longitudinal direction thereof, that is, at the base end side of the wiper arm 230. The projecting piece 252c is integrally provided on the side wall 252b, which is placed at the backward side of the arm shank 250. Specifically, the projecting piece 252c protrudes toward the side wall 252a that is placed at the forward side of the arm shank 250, and extends in parallel to the bottom wall 251. Namely, the projecting piece 252c protrudes from the side wall 252b in the wiping direction toward the forward side of the wiper blade 220 (see FIG. 15) and is also extended in parallel to the windshield 211. In this regard, the projecting piece 252c is integrally provided on the side wall 252b when the arm shank 250 is pressed.

Further, as shown in FIG. 21, an amount of protrusion of the projecting piece 252c from the side wall 252b is an amount of protrusion by which it is possible to form a gap S with a dimension La between a tip end portion of the projecting piece 252c and the pin fitting wall 242c provided in the arm head 240. Here, the dimension La of the gap S is variable. Specifically, as shown in FIG. 21, the dimension La of the gap S is smaller than a diameter dimension r (see FIG. 22(b)) of each of the washer tubes 244, 245 (La<r) in a state where the wiper blade 220 is inclined toward the windshield 211. This makes it possible to surely prevent each of the washer tubes 244, 245 from protruding or coming off from the shank side pipe housing portion 253 during the operation of the wiper device 210.

In contrast, in a case where the arm shank 250 is rotated in a direction of an arrow R1 indicated by a broken line in FIG. 21 with respect to the arm head 240, that is, in a case where the arm shank 250 is rotated in a direction opposite to a direction to lock back the arm head 240, the wiper device 210 becomes a state shown in FIG. 22(b). Specifically, a dimension Lb of the gap S is slightly larger than the diameter dimension r of each of the washer tubes 244, 245 (Lb>r). This makes it possible to easily assemble each of the washer tubes 244, 245 to both of the head side pipe housing portion 243 and the shank side pipe housing portion 253 in a state before mounting the wiper device 210 on the vehicle, that is, in a state where the wiper device 210 is in a single body state.

As shown in FIG. 21, the projecting piece 252c faces the hook FK from the short direction of the arm shank 250. In this manner, the projecting piece 252c is provided at a position corresponding to one end side of the spring SP in the arm shank 250, that is, in the vicinity of the one end side of the spring SP. As shown in FIG. 22, together with the pin fitting wall 242c, the projecting piece 252c holds each of the washer tubes 244, 245 by bringing them near the other side of the arm shank 250 (an upper left side in the drawing) in the short direction thereof in a state where the washer tubes 244, 245 are gathered.

In this manner, together with the pin fitting wall 242c, the projecting piece 252c has a function to hold each of the washer tubes 244, 245 side by side with respect to the spring SP at one end side of the spring SP. Here, each of the washer tubes 244, 245 is disposed apart from a side portion of the spring SP without being in contact with the spring SP. Therefore, each of the washer tubes 244, 245 and the spring SP are not rubbed against each other. In this manner, together with the pin fitting wall 242c, the projecting piece 252c holds each of the washer tubes 244, 245 in a non-contact state with the spring SP.

FIG. 23 is an enlarged view of a circle E indicated by a broken line in FIG. 20. FIG. 24 is a cross-sectional view taken along the line F-F of FIG. 23. FIGS. 25(a) and 25(b) are perspective views illustrating a first holder. FIG. 26 is a view illustrating a fitting procedure of the first holder to an arm shank.

As shown in FIGS. 23 and 24, a supporting piece 252d and a first holder 254 fitted to the supporting piece 252d are provided at a substantially central portion of the arm shank 250 in the longitudinal direction thereof. The supporting piece 252d and the first holder 254 are disposed at the other end side along the longitudinal direction of the arm shank 250 with respect to a position where the projecting piece 252c is disposed, and constitute a second pipe holding portion of the present invention. Further, the first holder 254 constitutes a holding piece according to the present invention.

As shown in FIG. 26, the supporting piece 252d is integrally provided on the side wall 252a at the forward side of the arm shank 250. Specifically, the supporting piece 252d protrudes toward the side wall 252b at the backward side of the arm shank 250. Namely, the supporting piece 252d protrudes from the side wall 252a in the wiping direction toward the backward side of the wiper blade 220 (see FIG. 15). Further, the supporting piece 252d is formed into a substantially L shape, and a tip end portion of the supporting piece 252d also extends to the tip end side of the wiper arm 230. In this regard, the supporting piece 252d is integrally provided on the side wall 252a when the arm shank 250 is pressed.

A hook hole 252e to which the other end side of the spring SP is hooked is provided at the tip end portion of the supporting piece 252d. The hook hole 252e is a long hole extending in the longitudinal direction of the arm shank 250 so that the other end side of the spring SP can be easily hooked. In this manner, the one end side of the spring SP is hooked to the hook pin 242d (see FIG. 21) of the arm head 240 via the hook FK, and the other end side of the spring SP is hooked to the hook hole 252e of the arm shank 250. Thus, elastic force of the spring SP acts so as to press the wiper blade 220 toward the windshield 211 (see FIG. 15).

Further, a fitting main body 252f to which the first holder 254 is to be fitted is provided at a tip end side of the supporting piece 252d and at a nozzle unit 270 side (a left side in the drawing) opposite to a spring SP side. An engaging recessed portion 252g is provided at a side of the fitting main body 252f opposite to a hook hole 252e side. One of a pair of positioning projected portions 254d provided in the first holder 254 is configured to engage with the engaging recessed portion 252g. In this regard, the other of the positioning projected portions 254d provided in the first holder 254 is configured to engage with an arc-shaped portion of the hook hole 252e. This makes it possible to surely fit the first holder 254 to the supporting piece 252d without any wobbling.

As shown in FIG. 25, the first holder 254 is formed into a predetermined shape by a resin material such as plastic, and includes a main body portion 254a fitted to the fitting main body 252f. Further, an insertion hole 254b into which the fitting main body 252f is inserted is provided on the main body portion 254a. A pressing projection 254c (see FIG. 25(b)) is provided inside the insertion hole 254b. The pressing projection 254c is to be pressed toward the fitting main body 252f in a state where the first holder 254 is fitted to the fitting main body 252f. This makes it possible to prevent wobbling of the first holder 254.

Further, the positioning projected portion 254d formed into a substantially cylindrical shape is provided at one opening side portion and the other opening side portion of the insertion hole 254b on the main body portion 254a. As shown in FIG. 24, a projection height of the positioning projected portion 254d is substantially the same as a projection height of the pressing projection 254c. Specifically, the projection height of each of the positioning projected portion 254d and the pressing projection 254c is 2.0 mm, for example, so as not to obstruct insertion of the fitting main body 252f into the insertion hole 254b. One of the positioning projected portions 254d is caused to engage with the engaging recessed portion 252g and the other of the positioning projected portions 254d is caused to engage with the arc-shaped portion of the hook hole 252e in a state where the first holder 254 is fitted to the fitting main body 252f.

As shown in FIG. 23, a first tube holding portion 254e that holds the backward side washer tube 245 is provided at the side wall 252b side of the main body portion 254a (backward side) in a state where the first holder 254 is fitted to the fitting main body 252f. Further, a second tube holding portion 254f that holds the forward side washer tube 244 is provided at a bottom wall 251 side of the main body portion 254a.

As shown in FIGS. 24 and 25, the first tube holding portion 254e includes a support surface 254h of a projecting piece 254g and a side surface 254k. The projecting piece 254g protrudes toward the side wall 252b from the main body portion 254a. The side surface 254k is caused to face the side wall 252b of the main body portion 254a. An inclined wall 252h inclined about 45 degrees is provided between the bottom wall 251 and the side wall 252b of the arm shank 250. The backward side washer tube 245 is held among the inclined wall 252h, the support surface 254h, and the side surface 254k. Since the backward side washer tube 245 is supported at three points in this manner, wobbling thereof can be effectively suppressed.

The second tube holding portion 254f includes a support surface 254n of each of a pair of projecting pieces 254m and a bottom surface 254p. Each of the projecting pieces 254m protrudes toward the bottom wall 251 from the main body portion 254a. The bottom surface 254p is caused to face the bottom wall 251 of the main body portion 254a. The forward side washer tube 244 is held among the inclined wall 252h, the support surfaces 254n, and the bottom surface 254p. Since the forward side washer tube 244 is also supported at three points in this manner, it is possible to effectively suppress wobbling thereof.

As shown in FIG. 23, the supporting piece 252d and the first holder 254 are provided at a position corresponding to the other end side of the spring SP in the arm shank 250, that is, in the vicinity of the other end side of the spring SP. As shown in FIG. 23, the supporting piece 252d and the first holder 254 hold each of the washer tubes 244, 245 by bringing them near the other side of the arm shank 250 (an upper side in the drawing) in the short direction thereof in a state where the washer tubes 244, 245 are gathered.

In this manner, the supporting piece 252d and the first holder 254 have a function to hold each of the washer tubes 244, 245 side by side with respect to the spring SP at the other end side of the spring SP. Here, each of the washer tubes 244, 245 is disposed apart from the side portion of the spring SP without being in contact with the spring SP. Therefore, each of the washer tubes 244, 245 and the spring SP are not rubbed against each other. In this manner, the supporting piece 252d and the first holder 254 hold each of the washer tubes 244, 245 in a non-contact state with the spring SP.

In order to fit the first holder 254 to the fitting main body 252f, as shown with an arrow M1 indicated by a broken line in FIG. 26, the first holder 254 is first caused to face the fitting main body 252f from the tip end side of the arm shank 250 in the longitudinal direction thereof. Then, the first holder 254 is slightly inclined with respect to the fitting main body 252f, and an engaging recessed portion 252g side of the fitting main body 252f is inserted between the positioning projected portions 254d and the pressing projection 254c (see FIG. 25(b)). Then, an insertion operation of the fitting main body 252f to the engaging recessed portion 252g side is continued so as to cause the first holder 254 to be in parallel to the fitting main body 252f. Thus, the pair of positioning projected portions 254d is caused to engage with the arc-shaped portion of the hook hole 252e and the engaging recessed portion 252g, respectively, whereby fitting of the first holder 254 to the fitting main body 252f is completed.

Here, as shown in FIG. 20, a separation distance L1 between a position where the projecting piece 252c and the pin fitting wall 242c are disposed and a position where the supporting piece 252d and the first holder 254 are disposed is substantially the same as a length dimension of the spring SP. Moreover, the separation distance L1 is substantially one third of a length dimension of the arm shank 250. This makes it possible to arrange the washer tubes 244, 245 side by side with respective to the spring SP in a non-contact state where each of the washer tubes 244, 245 is apart from the spring SP, and to shorten the separation distance L1 to the degree of the length dimension of the spring SP. Therefore, it is possible to surely prevent each of the washer tubes 244, 245 from becoming slack and protruding from the shank side pipe housing portion 253 to the outside.

FIG. 27 is an enlarged view of a circle G indicated by a broken line in FIG. 20. FIG. 28 is a cross-sectional view taken along the line H-H of FIG. 27. FIGS. 29(a) and 29(b) are perspective views of a second holder. FIG. 30 is a view illustrating a fitting procedure of the second holder to the arm shank.

As shown in FIGS. 27 and 28, a supporting piece 252k and a second holder 255 fitted to the supporting piece 252k are provided between the first holder 254 and the nozzle unit 270 along the longitudinal direction of the arm shank 250. The supporting piece 252k and the second holder 255 are provided between the supporting piece 252d and the first holder 254, which are placed at a side of the other end portion of the spring SP, and the other end portion of the arm shank 250, and constitute a third pipe holding portion of the present invention.

As shown in FIG. 30, the supporting piece 252k is integrally provided on the side wall 252a that is placed at the forward side of the arm shank 250. Specifically, the supporting piece 252k protrudes toward the side wall 252b that is placed at the backward side of the arm shank 250. Namely, the supporting piece 252k protrudes from the side wall 252a in the wiping direction toward the backward side of the wiper blade 220 (see FIG. 15). In this regard, the supporting piece 252k is integrally provided on the side wall 252a when the arm shank 250 is pressed.

A fitting hole 252m penetrating through the supporting piece 252k in a thickness direction thereof is provided at a substantially central portion of the supporting piece 252k. An engagement projection 255e (see FIG. 29(b)) of the second holder 255 is inserted and is fitted to the fitting hole 252m. Here, a diameter dimension of the fitting hole 252m is slightly larger than a diameter dimension of the engagement projection 255e. This makes it possible to easily and surely fit the supporting piece 252k to the second holder 255, and to suppress wobbling of the second holder 255 with respect to the supporting piece 252k.

As shown in FIG. 29, the second holder 255 is formed into a substantially rectangular shape by a resin material such as plastic, and is fitted to the supporting piece 252k. The second holder 255 includes a main body portion 255a, and a claw portion 255b formed into a substantially arc shape is integrally provided at a tip end side of the main body portion 255a in the longitudinal direction thereof. Further, thick portions 255d are provided at both sides of the main body portion 255a in a short direction thereof, respectively. Each of the thick portions 255d is formed to be thicker than the main body portion 255a, and has a slide groove 255c on the inside thereof. A side portion 252n (see FIG. 30) of the supporting piece 252k is to be inserted into the slide groove 255c. Namely, the thin claw portion 255b is provided at a tip end side of the second holder 255, and the pair of thick portions 255d each of which is thicker than the claw portion 255b is provided at a base end side of the second holder 255.

Thus, the second holder 255 has a stepped shape along the longitudinal direction thereof.

Further, the engagement projection 255e formed into a substantially cylindrical shape is provided at a thick portions 255d side of the main body portion 255a. The engagement projection 255e is fitted to the fitting hole 252m of the supporting piece 252k in a state where the second holder 255 is fitted to the supporting piece 252k. Here, a projection height of the engagement projection 255e is set to a projection height smaller than a thickness of the supporting piece 252k (for example, 1.5 mm). This makes it possible to prevent the engagement projection 255e from obstructing fitting of the second holder 255 to the supporting piece 252k.

Further, a pair of through holes 255f each of which extends in the longitudinal direction of the second holder 255 is provided in the main body portion 255a. Thus, rigidity around the engagement projection 255e of the main body portion 255a is reduced. This makes it possible to easily perform fitting of the second holder 255 to the supporting piece 252k.

As shown in FIG. 28, the claw portion 255b presses the backward side washer tube 245 toward the inclined wall 252h of the arm shank 250 in a state where the second holder 255 is fitted to the supporting piece 252k. In contrast, the pair of thick portions 255d presses the forward side washer tube 244 toward the bottom wall 251 of the arm shank 250.

By forming the second holder 255 into the stepped shape in this manner, the backward side washer tube 245 and the forward side washer tube 244 are pressed toward the inclined wall 252h and the bottom wall 251, respectively. This makes it possible to effectively suppress each of the washer tubes 244, 245 from wobbling inside the arm shank 250, and to surely prevent each of the washer tubes 244, 245 from becoming slack and protruding from the shank side pipe housing portion 253 to the outside.

In order to fit the second holder 255 to the supporting piece 252k, as shown with an arrow M2 indicated by a broken line in FIG. 30, the claw portion 255b of the second holder 255 is first caused to face the supporting piece 252k from a side wall 252a side along the short direction of the arm shank 250. Then, the side portions 252n of the supporting piece 252k are inserted to the slide grooves 255c of the thick portions 255d (see FIG. 29(b)), respectively. Then, by further inserting the second holder 255 into the supporting piece 252k, the engagement projection 255e of the second holder 255 (see FIG. 29(b)) enters the fitting hole 252m of the supporting piece 252k. Thus, fitting of the second holder 255 to the supporting piece 252k is completed.

Here, as shown in FIG. 20, with respect to the longitudinal direction of the arm shank 250, the second holder 255 is disposed at a substantially central position between a position where the first holder 254 is disposed and a position where the nozzle unit 270 is disposed. Specifically, a separation distance L2 between the second holder 255 and the first holder 254 is substantially the same as a separation distance L3 between the second holder 255 and the nozzle unit 270 (L2≈L3).

Further, the separation distance L1 between the projecting piece 252c and the first holder 254, the separation distance L2 between the second holder 255 and the first holder 254, and the separation distance L3 between the second holder 255 and the nozzle unit 270 are substantially equal to each other (L1≈L2≈L3). Thus, in the same manner as that between the projecting piece 252c and the first holder 254, it is possible to surely prevent each of the washer tubes 244, 245 from become slack and protruding from the shank side pipe housing portion 253 to the outside even between the second holder 255 and the first holder 254 and between the second holder 255 and the nozzle unit 270.

As shown in FIG. 20, the arm piece 260 fixed to a tip end side of the arm shank 250 is formed into a predetermined shape by pressing and the like of a steel material. A tip end side of the arm piece 260 is formed into a substantially U shape. A tip end portion of the arm piece 260 is to be coupled to the hook fixing member 223e (see FIG. 19) by one touch operation. Further, a base end side of the arm piece 260 is fixed to the inside of a tip end portion of the arm shank 250 by means of a pair of rivets R (see FIG. 16). By riveting the arm shank 250 made of a steel plate and the arm piece 260 made of a steel material together in this manner, the arm shank 250 and the arm piece 260 are firmly fixed without any wobbling.

The nozzle unit 270 is fixed to the arm piece 260 by means of a fixing screw SC (see FIG. 20). Here, the fixing screw SC is configured to be screwed from a lower side of the drawing to a screw hole HL shown in FIG. 16, that is, from a wiper blade 20 side. A part of the arm piece 260 including the screw hole HL and the nozzle unit 270 is covered with the tip end side of the arm shank 250. This makes it possible to clarify and improve appearance of a periphery of the nozzle unit 270 of the wiper device 210.

By fixing the nozzle unit 270 to the arm piece 260, which is to be fitted to the hook fixing member 223e, in this manner, the nozzle unit 270 is disposed so as to approach the hook fixing member 223e. Further, the nozzle unit 270 is firmly fixed to the arm piece 260 near the hook fixing member 223e by means of the fixing screw SC. For that reason, a positional displacement of the nozzle unit 270 relative to the wiper blade 220 can be suppressed to the minimum.

As shown in FIGS. 16 and 17, the nozzle unit 270 is formed of a resin material such as plastic by injection molding so that a cross-sectional shape thereof in a direction intersecting the longitudinal direction of the arm shank 250 (short direction) becomes substantially a U shape. The nozzle unit 270 includes a forward side block 271 and a backward side block 272.

A forward side first wall portion 271a, which is caused to face the base end side of the wiper blade 220 in the longitudinal direction thereof, is provided at the base end side of the forward side block 271. The other end side of the forward side washer tube 244 is connected to the forward side first wall portion 271a side of the forward side block 271. On the other hand, a forward side arm portion 271b having a shape gradually tapered toward the tip end side thereof is integrally provided at a tip end side of the forward side block 271. A forward side second wall portion 271c, which is caused to face the tip end side of the wiper blade 220 in the longitudinal direction thereof, is provided in the forward side arm portion 271b.

Further, a forward side facing surface 271d that faces the windshield 211 is formed between the forward side first wall portion 271a and the forward side second wall portion 271c of the forward side block 271. A forward side nozzle cap 271e is provided at a portion near the forward side second wall portion 271c of the forward side facing surface 271d.

A forward side first spraying nozzle A1 is provided on the forward side second wall portion 271c. The forward side first spraying nozzle A1 is caused to face toward a tip end side of the wiper blade 220 in the longitudinal direction thereof. This makes it possible to wet the forward side of the windshield 211 (see FIG. 15) at the tip end side of the wiper blade 220 in the longitudinal direction thereof during the wiping operation of the wiper blade 220 toward the forward side thereof.

Here, the forward side first spraying nozzle A1 adopts an eyeball type nozzle capable of varying a sprayed position of the forward side washer fluid W1. Specifically, by stabbing a wire or the like in the nozzle and rotating the nozzle, it is possible to adjust the sprayed position of the forward side first spraying nozzle A1. This makes it possible to optimize the sprayed position of the forward side first spraying nozzle A1 so as to correspond to specifications, such as a difference in length, of the wiper blade 220 fitted to the wiper arm 230.

A forward side second spraying nozzle B1 and a forward side third spraying nozzle C1 are provided on the forward side nozzle cap 271e. Each of the forward side second spraying nozzle B1 and the forward side third spraying nozzle C1 is a nozzle having a fixed sprayed position for the forward side washer fluid W1. The forward side washer fluid W1 that has been sprayed from the forward side second spraying nozzle B1 and the forward side third spraying nozzle C1 wets the vicinity of a central portion of the blade rubber 221 in a longitudinal direction thereof and on the forward side thereof.

A forward side fourth spraying nozzle D1 is provided on the forward side first wall portion 271a. The forward side fourth spraying nozzle D1 is caused to face the base end side of the wiper blade 220 in the longitudinal direction thereof. This makes it possible to wet the forward side of the windshield 211 (see FIG. 15) at the base end side of the wiper blade 220 in the longitudinal direction thereof during the wiping operation of the wiper blade 220 toward the forward side thereof.

Here, in the similar manner to that in the forward side first spraying nozzle A1, the forward side fourth spraying nozzle D1 also adopts an eyeball type nozzle capable of varying a sprayed position of the forward side washer fluid W1. Therefore, it is possible to optimize the sprayed position of the forward side fourth spraying nozzle D1 in accordance with specifications of the wiper blade 220.

A backward side first wall portion 272a, which is caused to face the base end side of the wiper blade 220 in the longitudinal direction thereof, is provided at the base end side of the backward side block 272. The other end side of the backward side washer tube 245 is connected to a backward side first wall portion 272a side of the backward side block 272. On the other hand, a backward side arm portion 272b having a shape gradually tapered toward a tip end side thereof is integrally provided at the tip end side of the backward side block 272. A backward side second wall portion 272c, which is caused to face the tip end side of the wiper blade 220 in the longitudinal direction thereof, is provided on the backward side arm portion 272b. Here, a length dimension of the backward side arm portion 272b is shorter than a length dimension of the forward side arm portion 271b.

Further, a backward side facing surface 272d that faces the windshield 211 is formed between the backward side first wall portion 272a and the backward side second wall portion 272c of the backward side block 272. A backward side nozzle cap 272e is provided at a portion near the backward side first wall portion 272a of the backward side facing surface 272d.

A backward side first spraying nozzle E1 is provided on the backward side second wall portion 272c. The backward side first spraying nozzle E1 is caused to face toward a tip end side of the wiper blade 220 in the longitudinal direction thereof. This makes it possible to wet the backward side of the windshield 211 (see FIG. 15) at the tip end side of the wiper blade 220 in the longitudinal direction thereof during the wiping operation of the wiper blade 220 toward the backward side thereof.

Here, the backward side first spraying nozzle E1 adopts an eyeball type nozzle capable of varying a sprayed position of the backward side washer fluid W2. Specifically, it is possible to adjust the sprayed position thereof in the similar manner to that of the forward side first spraying nozzle A1 as described above. This makes it possible to optimize the sprayed position of the backward side first spraying nozzle E1 so as to correspond to specifications, such as a difference in length, of the wiper blade 220 fitted to the wiper arm 230.

A backward side second spraying nozzle F1 is provided on the backward side nozzle cap 272e. The backward side second spraying nozzle F1 is a nozzle having a fixed sprayed position of the backward side washer fluid W2. The backward side washer fluid W2 that has been sprayed from the backward side second spraying nozzle F1 wets the vicinity of a central portion of the blade rubber 221 in the longitudinal direction thereof and on the backward side thereof.

A backward side third spraying nozzle G1 is provided on the backward side first wall portion 272a. The backward side third spraying nozzle G1 is caused to face toward the base end side of the wiper blade 220 in the longitudinal direction thereof. This makes it possible to wet the backward side of the windshield 211 (see FIG. 15) at the base end side of the wiper blade 220 in the longitudinal direction thereof during the wiping operation of the wiper blade 220 toward the backward side thereof.

Here, in the similar manner to that in the backward side first spraying nozzle E1, the backward side third spraying nozzle G1 also adopts an eyeball type nozzle capable of varying a sprayed position of the backward side washer fluid W2. Therefore, it is possible to optimize the sprayed position of the backward side third spraying nozzle G1 in accordance with specifications of the wiper blade 220.

In this regard, in the present embodiment, the sprayed position of the forward side washer fluid W1 from each of the forward side spraying nozzles A1 to D1 onto the windshield 211 and the sprayed position of the backward side washer fluid W2 from each of the backward side spraying nozzles E1 to G1 onto the windshield 211 are adjusted in accordance with the following criteria.

Here, in a case where the sprayed position of each of the washer fluids W1 and W2 is near the blade rubber 221, each of the washer fluids W1 and W2 that has been sprayed does not block a field of view of a driver, but each of the washer fluids W1 and W2 that has been sprayed is wiped off immediately after being sprayed. For that reason, the dust and the like attached onto the windshield 211 are not melted and may be left unwiped (deterioration of washing performance).

On the contrary, in a case where the sprayed position of each of the washer fluids W1 and W2 is far from the blade rubber 21, it is possible to allow the dust and the like attached onto the windshield 211 to be surely melted and cleanly wiped off without leaving any unwiped dust. However, each of the washer fluids W1 and W2 that has been sprayed may block the field of view of the driver (blocking of the field of view).

For that reason, in a case where a peripheral velocity of the blade rubber 221 is referred to as [v], a melting time of an adhesive substance is referred to as [t], and a distance from the blade rubber 221 to the sprayed position of each of the washer fluids W1 and W2, that is, a spraying distance is referred to as [L], the spraying distance [L] is adjusted so as to satisfy a formula [L=v×t]. This makes it possible to achieve contrary phenomena of improvement of the washing performance against the adhesive substance and suppression of blocking of the field of view with a good balance. In this regard, in the present embodiment, the spraying distance [L] is set to a spraying distance of about 15 mm.

However, with respect to the peripheral velocity [v] of the blade rubber 221, a peripheral velocity [v1] at the tip end side (outer peripheral side) of the blade rubber 221 is different from a peripheral velocity [v2] at the base end side (inner peripheral side) of the blade rubber 221 (v1>v2). For this reason, an average value of the peripheral velocity [v1] and the peripheral velocity [v2] is used. Further, the peripheral velocity [v] is usually set to a moving speed of the blade rubber 221 during a [Low] operation of the wiper switch, which is frequently used.

Next, a flow of the forward side washer fluid W1 and the backward side washer fluid W2 will be described with reference to the drawings.

By operating a washer switch (not shown in the drawings), the washer pump (not shown in the drawings) is driven. As shown with arrows each indicated by a broken line in FIG. 15, the washer fluids W1 and W2 are supplied to the forward side washer tube 244 and the backward side washer tube 245, respectively. Then, as shown in FIG. 17, the washer fluids W1 and W2 enter into the forward side block 271 and the backward side block 272, respectively. Thus, as shown with arrows each indicated by a broken line in FIG. 17, the washer fluids W1 and W2 are sprayed from each of the forward side spraying nozzles A1 to D1 and each of the backward side spraying nozzles E1 to G1, respectively.

Here, a driving direction of the washer pump is switched in accordance with switching of a moving direction of the blade rubber 221. More specifically, the forward side washer fluid W1 is supplied only to the forward side block 271 during the wiping operation of the wiper blade 220 toward the forward side thereof. On the other hand, the backward side washer fluid W2 is supplied only to the backward side block 272 during the wiping operation of the wiper blade 220 toward the backward side thereof.

As described above in detail, according to the wiper device 210 of the present embodiment, the arm shank 250 is configured to include the projecting piece 252c, the supporting piece 252d and the first holder 254 so as to hold the washer tubes 244, 245 side by side with respect to the spring SP at both end sides of the spring SP. For this reason, it is possible to shorten the length dimension L1 between the projecting piece 252c and the supporting piece 252d and the first holder 254 to the degree of the length dimension of the spring SP. This makes it possible to prevent a defect such as protrusion of each of the washer tubes 244, 245 from the arm shank 250 and rubbing of them against the windshield 211 from occurring. Further, since application of tension to each of the washer tubes 244, 245 can be avoided, it is possible to prevent each of the washer tubes 244, 245 from being in contact with the spring SP, and to surely prevent each of the washer tubes 244, 245 from being early deteriorated.

Further, according to the wiper device 210 of the present embodiment, the projecting piece 252c, the supporting piece 252d and the first holder 254 hold each of the washer tubes 244, 245 in a non-contact state with the spring SP. For this reason, it is possible to surely protect each of the washer tubes 244, 245 from irregular wear due to rubbing and the like, and this makes it possible to extend life of the wiper device 210.

Moreover, according to the wiper device 210 of the present embodiment, the head side pipe housing portion 243 configured to house each of the washer tubes 244, 245 is provided in the arm head 240 so as to extend along the longitudinal direction of the arm head 240 and be opened toward the windshield 211 side. This makes it possible to prevent each of the washer tubes 244, 245 from being exposed to the outside continuously from the arm shank 250 side even to a portion of the arm head 240 side. Therefore, it is possible to improve appearance of the wiper device 210.

Further, according to the wiper device 210 of the present embodiment, the pin fitting wall 242c to which the hook pin 242d for supporting the one end portion of the spring SP is fitted is provided at the other end portion of the arm head 24; and the projecting piece 252c that protrudes from the side wall 252b of the arm shank 250 in the wiping direction of the wiper blade 220 is provided at the one end portion side of the spring SP, whereby each of the washer tubes 244, 245 is held by the pin fitting wall 242c and the projecting piece 252c. This makes it possible to easily dispose each of the washer tubes 244, 245 between the pin fitting wall 242c and the projecting piece 252c by rotating the arm shank 250 relative to the arm head 240. Therefore, assemble workability of the wiper device 210 can be improved.

Moreover, according to the wiper device 210 of the present embodiment, the supporting piece 252d that extends from the side wall 252a of the arm shank 250 in the wiping direction of the wiper blade 220 and the first holder 254 fitted to the supporting piece 252d are provided at the other end portion side of the spring SP. Thus, by fitting the first holder 254 to the supporting piece 252d after each of the washer tubes 244, 245 is housed in the shank side pipe housing portion 253, it is possible to surely prevent each of the washer tubes 244, 245 from becoming slack from the shank side pipe housing portion 253. Therefore, the assemble workability of the wiper device 210 can be improved.

Further, according to the wiper device 210 of the present embodiment, the supporting piece 252k and the second holder 255, which hold each of the washer tubes 244, 245 between the supporting piece 252d and the first holder 254 that are placed at the other end portion side of the spring SP and the other end portion of the arm shank 250, is provided in the arm shank 250. This makes it possible to surely prevent the slack of each of the washer tubes 244, 245 even in a portion where the spring SP is not disposed in the shank side pipe housing portion 253. Further, since the second holder 255 is fitted to the supporting piece 252k after each of the washer tubes 244, 245 is housed in the shank side pipe housing portion 253, the assemble workability of the wiper device 210 can be improved.

Next, a sixth embodiment of the present invention will be described in detail with reference to the drawings. In this regard, portions each having the similar function to that of the fifth embodiment described above is denoted by the same reference numeral, and detailed description thereof is omitted.

FIGS. 31(a) and 31(b) are views according to the sixth embodiment, which correspond to FIG. 21. Further, FIG. 31(a) is a view illustrating a state before a forward side washer tube 244 and a backward side washer tube 245 are assembled.

As shown in FIG. 31(a), in the sixth embodiment, a structure of a first pipe holding portion is different from that of the fifth embodiment. In the fifth embodiment, as shown in FIG. 21, the first pipe holding portion is formed by a projecting piece 252c provided to a side wall 252b of an arm shank 250, and a forward side washer tube 244 and a backward side washer tube 245 are held by a projecting piece 252c and a pin fitting wall 242c provided in an arm head 240.

In contrast, the first pipe holding portion according to the sixth embodiment is constituted of a tube enclosing portion 280, whose cross-section is a substantially U shape, provided at one end portion of the arm shank 250 in the longitudinal direction thereof, that is, at the base end side of the wiper arm 230. The tube enclosing portion 280 is constituted of a first extending portion 281 that extends from the side wall 252a of the arm shank 250 in the wiping direction of the wiper blade 220 (see FIG. 15), and a second extending portion 282 that extends from the first extending portion 281 to a side opposite to the windshield 211 side. In this regard, the tube enclosing portion 280 is integrally provided on the side wall 252a when the arm shank 250 is pressed.

The second extending portion 282 is rotatably connected to one end portion of the arm head 240 by means of the support pin 242a. Here, a jig insertion hole 283 is provided at a portion of the side wall 252a that faces the second extending portion 282 from an axial direction of the support pin 242a. A support jig (not shown in the drawings) for supporting an end portion of the support pin 242a is to be inserted into the jig insertion hole 283 at the time of assembling of the wiper device 210. As shown in FIG. 31(b), after the assembling of the wiper device 210, the jig insertion hole 283 is closed by means of a rubber cap RC. This makes it possible to improve the appearance of the wiper device 210. In this regard, each of the washer tubes 244, 245 is inserted into the inside of the tube enclosing portion 280 from the longitudinal direction of the arm shank 250 at the time of the assembling of the wiper device 210.

According to the wiper device 210 of the sixth embodiment formed as described above, it is also possible to achieve the similar functions and effects to those of the wiper device 210 according to the fifth embodiment described above.

Next, a seventh embodiment of the present invention will be described in detail with reference to the drawings. In this regard, portions each having the similar function to that of the fifth embodiment described above is denoted by the same reference numeral, and detailed description thereof is omitted.

FIG. 32 is a perspective view illustrating a first holder according to the seventh embodiment.

As shown in FIG. 32, in the seventh embodiment, a structure of a second pipe holding portion is different from that of the fifth embodiment. In the fifth embodiment, as shown in FIG. 23, the second pipe holding portion is constituted of the supporting piece 252d provided on the side wall 252a of the arm shank 250, and the first holder 254 fitted to the supporting piece 252d.

In contrast, the second pipe holding portion according to the seventh embodiment is constituted of a pair of supporting pieces 290, 291 and a first holder (holding piece) 292. The pair of supporting pieces 290, 291 is provided in the vicinity of the other end side of the spring SP, and the pair of supporting pieces 290, 291 is provided to the side walls 252a, 252b of the arm shank 250, respectively. The first holder (holding piece) 292 is to be supported by the supporting pieces 290, 291. The pair of supporting pieces 290, 291 respectively protrudes from the side walls 252a, 252b in a direction to face each other, and extends in the wiping direction of the wiper blade 220 (see FIG. 15). In this regard, the pair of supporting pieces 290, 291 is integrally provided on the side walls 252a, 252b, respectively, when the arm shank 250 is pressed.

The first holder 292 is formed of a resin material such as plastic into a substantially flat plate shape and is provided with a main body portion 292a that is inserted into the shank side pipe housing portion 253 of the arm shank 250. Then, in a state where the first holder 292 is supported by each of the supporting pieces 290, 291, on a side of the bottom wall 251 and on a side of the side wall 252a of the main body portion 292a, there is provided a tube insertion recessed portion 292b into which each of the washer tubes 244, 245 is inserted. Further, on a side of the main body portion 292a opposite to the side of the bottom wall 251, there is provided a pair of engaging recessed portions 292c and 292d with which a tip end portion of each of the supporting pieces 290, 291 is caused to engage.

In order to fit the first holder 292 to each of the supporting pieces 290, 291, the first holder 292 is caused to face each of the supporting pieces 290, 291 from a direction of an arrow M3 indicated by a broken line in the drawing, and the one engaging recessed portion 292c is first caused to engage with the one supporting piece 290. Subsequently, the other engaging recessed portion 292d is caused to engage with the other supporting piece 291 such that the first holder 292 puts in the arm shank 250. Thus, fitting of the first holder 292 to each of the supporting pieces 290, 291 is completed. In this regard, contrary to the above, the supporting piece 291 may first be caused to engage with the engaging recessed portion 292d.

According to the wiper device 210 of the seventh embodiment formed as described above, it is also possible to achieve the similar functions and effects to those of the wiper device 210 according to the fifth embodiment described above.

Next, an eighth embodiment of the present invention will be described in detail with reference to the drawings. In this regard, portions each having the similar function to that of the seventh embodiment described above is denoted by the same reference numeral, and detailed description thereof is omitted.

FIGS. 33(a) and 33(b) are perspective views illustrating a first holder according to the eighth embodiment.

As shown in FIG. 33, in the eighth embodiment, a structure of a first holder (holding piece) 2100 is different from that of the seventh embodiment. The first holder 2100 according to the eighth embodiment includes a main body portion 2101 that is formed into a substantially rectangular parallelepiped shape by a resin material such as plastic. A pair of supporting piece fitting grooves 2101a, 2101b is provided at both end sides of the main body portion 2101 in a longitudinal direction thereof. The pair of supporting pieces 290, 291 is inserted into the pair of supporting piece fitting grooves 2101a, 2101b, respectively.

In a state where the first holder 2100 is supported by each of the supporting pieces 290, 291, the supporting piece fitting groove 2101a corresponding to the supporting piece 290 is opened toward a tip end side of the arm shank 250 (a left side in the drawing), and the supporting piece fitting groove 2101b corresponding to the supporting piece 291 is opened toward a base end side of the arm shank 250 (a right side in the drawing).

A retaining projection T (only one is illustrated) is provided inside each of the supporting piece fitting grooves 2101a, 2101b. The retaining projection T is pressed toward each of the supporting pieces 290, 291 in a state where the supporting pieces 290, 291 are respectively inserted into the supporting piece fitting grooves 2101a, 2101b. This makes it possible to prevent the first holder 2100 from coming off from the supporting pieces 290, 291.

In the state where the first holder 2100 is supported by each of the supporting pieces 290, 291, a projecting piece 2101c is integrally provided on a bottom wall 251 side of the main body portion 2101. Each of the washer tubes 244, 245 is held together by means of a support surface 2101d of the projecting piece 2101c and a bottom surface 2101e of the main body portion 2101.

In order to fit the first holder 2100 to each of the supporting pieces 290, 291, first, as shown in FIG. 33(b), the first holder 2100 is disposed between the supporting pieces 290, 291 in a state where the first holder 2100 is inclined relative to each of the supporting pieces 290, 291. Subsequently, the first holder 2100 is rotated in a direction of an arrow R2 indicated by a broken line (a clockwise direction) in the drawing between the supporting pieces 290, 291. This causes the supporting pieces 290, 291 to be inserted into the supporting piece fitting grooves 2101a, 2101b, respectively. Thus, fitting of the first holder 2100 to each of the supporting pieces 290, 291 is completed. Here, the retaining projection T provided in each of the supporting piece fitting grooves 2101a, 2101b is pressed by each of the supporting pieces 290, 291. For this reason, the first holder 2100 does not come off from each of the supporting pieces 290, 291 due to vibration and the like.

According to the wiper device 210 of the eighth embodiment formed as described above, it is also possible to achieve the similar functions and effects to those of the wiper device 210 according to the fifth embodiment described above.

Next, a ninth embodiment of the present invention will be described in detail with reference to the drawings. In this regard, portions each having the similar function to that of the fifth embodiment described above is denoted by the same reference numeral, and detailed description thereof is omitted.

FIG. 34 is a perspective view illustrating a first holder according to the ninth embodiment.

As shown in FIG. 34, in the ninth embodiment, a structure of a second pipe holding portion is different from that of the fifth embodiment. In the fifth embodiment, as shown in FIG. 23, the second pipe holding portion is constituted of the supporting piece 252d provided on the side wall 252a of the arm shank 250, and the first holder 254 fitted to the supporting piece 252d.

In contrast, the second pipe holding portion according to the ninth embodiment is constituted of a supporting piece 2110 and a first holder (holding piece) 2120. The supporting piece 2110 is provided in the vicinity of the other end side of the spring SP and on the side wall 252b of the arm shank 250. The first holder 2120 is supported by the supporting piece 2110. The supporting piece 2110 protrudes from the side wall 252b toward the side wall 252a, and extends in the wiping direction of the wiper blade 220 (see FIG. 15). In this regard, the supporting piece 2110 is integrally provided with the side wall 252b when the arm shank 250 is pressed.

A hook hole 252e provided in the supporting piece 2110 is provided by bringing it near the base end portion side of the arm shank 250 in the longitudinal direction thereof (a right side in the drawing), and a portion where nothing is formed is provided at a side of the supporting piece 2110 opposite to the hook hole 252e. The first holder 2120 is to be fitted to the portion where nothing is formed.

The first holder 2120 is formed into a substantially L shape by a resin material such as plastic, and includes a main body portion 2121 that is formed into a substantially rectangular parallelepiped shape. In a state where the first holder 2120 is supported by the supporting piece 2110, a supporting piece fitting groove 2121a is provided at a side wall 252b side of the main body portion 2121. The supporting piece 2110 is to be inserted into the supporting piece fitting groove 2121a. The supporting piece 2110 is fitted to the supporting piece fitting groove 2121a by press-fitting. Thus, the first holder 2120 fitted to the supporting piece 2110 does not come off due to vibration and the like generated during an operation of the wiper device 210.

Further, in a state where the first holder 2120 is supported by the supporting piece 2110, a protrusion 2121b that protrudes toward the bottom wall 251 is integrally provided at the side wall 252b side of the main body portion 2121. Each of the washer tubes 244, 245 is held together by a support surface 2121c of the protrusion 2121b and a bottom surface 2121d of the main body portion 2121.

In order to fit the first holder 2120 to the supporting piece 2110, the first holder 2120 is caused to face the supporting piece 2110 from a direction of an arrow M4 indicated by a broken line in the drawing, and the supporting piece 2110 is pressed and fitted into the supporting piece fitting groove 2121a. Thus, the supporting piece 2110 is fixed inside the supporting piece fitting groove 2121a, whereby fitting of the supporting piece 2110 to the first holder 2120 is completed.

According to the wiper device 210 of the ninth embodiment formed as described above, it is also possible to achieve the similar functions and effects to those of the wiper device 210 according to the fifth embodiment described above.

The present invention is not limited to each of the embodiments described above, and it goes without saying that the present invention may be modified into various forms without departing from the substance thereof. For example, in each of the embodiments described above, the case where the nozzle unit 270 is provided on the arm shank 250 has been described. However, the present invention is not limited to this. For example, a nozzle unit may be provided along a longitudinal direction of a wiper blade.

Further, in each of the embodiments described above, the wiper device 210 that wipes the windshield 211 on the front side of the vehicle has been described. However, the present invention is not limited to this, and it is also possible to apply the present invention to a wiper device that wipes a windshield on a rear side of the vehicle. Moreover, the present invention is not limited to a vehicle such as an automobile, and it is also possible to apply the present invention to a wiper device of a railway vehicle, an aircraft, a ship, and the like.

INDUSTRIAL APPLICABILITY

The wiper device is installed in a vehicle such as an automobile, and is used to ensure good field of view by wiping off an adhesive substance such as rainwater attached onto a surface to be wiped.

What is claimed is:

1. A wiper device provided with a wiper blade configured to wipe a surface to be wiped, the wiper device comprising:
   an arm head provided with a shaft fixing portion to be fixed to a swinging shaft, the shaft fixing portion being provided at one end portion of the arm head;
   an arm shank having one end portion and the other end portion, the one end portion being fitted to the other end portion of the arm head, the other end portion being fitted to the wiper blade;

a nozzle unit provided on the arm shank or the wiper blade, the nozzle unit being configured to spray a cleaning fluid toward the surface to be wiped;
a head side pipe housing portion provided in the arm head along a longitudinal direction thereof, the head side pipe housing portion being opened toward the surface to be wiped; and
a forward side pipe and a backward side pipe housed in the head side pipe housing portion, a tip end side of each of the forward side pipe and the backward side pipe being connected to the nozzle unit,
wherein base end sides of the forward side pipe and the backward side pipe are arranged in an axial direction of the swinging shaft at one end portion of the arm head, and the base end sides are drawn out from the head side pipe housing portion so as to curve toward a side opposite to a side of the shaft fixing portion.

2. The wiper device according to claim 1,
wherein a holding hole is provided at one end portion of the arm head, the holding hole being configured to hold the forward side pipe and the backward side pipe so as to be arranged side by side in the axial direction of the swinging shaft.

3. The wiper device according to claim 1,
wherein a guide wall is provided at one end portion of the arm head, the guide wall being configured to place the forward side pipe and the backward side pipe along an outer periphery of the shaft fixing portion during swinging of the shaft fixing portion in one direction.

4. The wiper device according to claim 1,
wherein each of the forward side pipe and the backward side pipe includes an upstream pipe and a downstream pipe, and a connecting member is provided in the head side pipe housing portion, the connecting member being configured to connect the upstream pipe to the corresponding downstream pipe.

5. The wiper device according to claim 1,
wherein a shank side pipe housing portion is provided in the arm shank so as to extend along a longitudinal direction of the arm shank and be opened toward a side of the surface to be wiped, the shank side pipe housing portion being configured to house the forward side pipe and the backward side pipe therein.

6. The wiper device according to claim 1,
wherein one end portion of the arm shank is provided rotatably via a rotary shaft with respect to the other end portion of the arm head, the rotary shaft extending in a direction intersecting the swinging shaft, and
wherein the forward side pipe and the backward side pipe are arranged in a wiping direction of the wiper blade in a portion of the rotary shaft.

7. A wiper device provided with a wiper blade configured to wipe a surface to be wiped, the wiper device comprising:
an arm head, one end portion of the arm head being fitted to a swinging shaft;
an arm shank having one end portion and the other end portion, the one end portion being fitted to the other end portion of the arm head, the other end portion being fitted to the wiper blade;
a nozzle unit provided on the arm shank or the wiper blade, the nozzle unit being configured to spray a cleaning fluid toward the surface to be wiped;
a shank side pipe housing portion provided in the arm shank along a longitudinal direction thereof, the shank side pipe housing portion being opened toward the surface to be wiped;
a pipe housed in the shank side pipe housing portion near a forward side of the shank side pipe housing portion in a wiping direction of the wiper device, the pipe being configured to feed the cleaning fluid to the nozzle unit; and
a spring housed in the shank side pipe housing portion, the spring being configured to generate elastic force to press the wiper blade toward the surface to be wiped,
wherein a first pipe holding portion and a second pipe holding portion are respectively provided at both end sides of the spring in the arm shank, each of the first and second pipe holding portions being configured to hold the pipe side by side with respect to the spring.

8. The wiper device according to claim 7,
wherein the first pipe holding portion and the second pipe holding portion hold the pipe in a non-contact state with the spring.

9. The wiper device according to claim 7,
wherein a head side pipe housing portion configured to house the pipe is provided in the arm head so as to extend along a longitudinal direction of the arm head, the head side pipe housing portion being opened toward the surface to be wiped.

10. The wiper device according to claim 7,
wherein a pin fitting wall is provided at the other end portion of the arm head, a pin for supporting one end portion of the spring being fitted to the pin fitting wall,
wherein the first pipe holding portion provided at the one end portion of the spring is constituted of a projecting piece, the projecting piece projecting from a side wall of the arm shank in a wiping direction of the wiper blade, and
wherein the pipe is held by the pin fitting wall and the projecting piece.

11. The wiper device according to claim 10,
wherein a dimension of a gap formed between the projecting piece and the pin fitting wall is larger than a diameter dimension of the pipe when the arm shank is rotated relative to the arm head in a direction opposite to a direction of locking back.

12. The wiper device according to claim 7,
wherein the first pipe holding portion provided at a side of the one end portion of the spring is constituted of a first extending portion and a second extending portion, the first extending portion extending from a side wall of the arm shank in a wiping direction of the wiper blade, the second extending portion extending from the first extending portion toward a side opposite to a side of the surface to be wiped.

13. The wiper device according to claim 7,
wherein the second pipe holding portion provided on a side of the other end portion of the spring is constituted of a supporting piece and a holding piece, the supporting piece extending from a side wall of the arm shank in a wiping direction of the wiper blade, the holding piece being fitted to the supporting piece.

14. The wiper device according to claim 7,
wherein a third pipe holding portion configured to hold the pipe is provided in the arm shank between the second pipe holding portion provided at the other end portion side of the spring and the other end portion of the arm shank.

* * * * *